(12) United States Patent
Yonemoto et al.

(10) Patent No.: US 9,946,110 B2
(45) Date of Patent: Apr. 17, 2018

(54) LIQUID CRYSTAL DISPLAY

(71) Applicant: FUJIFILM Corporation, Tokyo (JP)

(72) Inventors: Takashi Yonemoto, Kanagawa (JP);
Hiromichi Furukawa, Kanagawa (JP);
Takahiro Ohno, Kanagawa (JP);
Megumi Sekiguchi, Kanagawa (JP);
Mitsuo Osato, Kanagawa (JP); Kenichi Fukuda, Kanagawa (JP); Daiki Wakizaka, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 476 days.

(21) Appl. No.: 14/683,414

(22) Filed: Apr. 10, 2015

(65) Prior Publication Data
US 2015/0212368 A1    Jul. 30, 2015

Related U.S. Application Data

(63) Continuation of application No. PCT/JP2013/077384, filed on Oct. 8, 2013.

(30) Foreign Application Priority Data

Oct. 12, 2012 (JP) ................. 2012-227510
Feb. 6, 2013 (JP) ................. 2013-021838
Mar. 12, 2013 (JP) ................. 2013-049449

(51) Int. Cl.
*G02F 1/1335* (2006.01)
*G02B 5/30* (2006.01)
*G02F 1/1333* (2006.01)

(52) U.S. Cl.
CPC ..... *G02F 1/133528* (2013.01); *G02B 5/3025* (2013.01); *G02F 1/1336* (2013.01);
(Continued)

(58) Field of Classification Search
CPC .................................. G02F 1/133528
See application file for complete search history.

(56) References Cited

U.S. PATENT DOCUMENTS

| 4,592,623 A | 6/1986 | Yamamoto et al. |
| 7,359,021 B2 * | 4/2008 | Ota ................ G02F 1/133305 |
| | | 349/137 |

(Continued)

FOREIGN PATENT DOCUMENTS

| EP | 1925439 A2 | 5/2008 |
| JP | 2002-006133 A | 1/2002 |

(Continued)

OTHER PUBLICATIONS

Decision of Refusal issued by the Japanese Patent Office on Sep. 6, 2016, in connection with Japanese Patent Application No. 2014-540855.

(Continued)

*Primary Examiner* — Wen-Ying P Chen
(74) *Attorney, Agent, or Firm* — Edwards Neils LLC; Jean C. Edwards, Esq.

(57) ABSTRACT

There is provided a liquid crystal display including: a liquid crystal cell in which a liquid crystal layer is installed between two glass substrates; polarizing plates on both surfaces of the liquid crystal cell; and a backlight at a rear side of the liquid crystal cell, which is a non-visual side, wherein in a polarizing plate at a front side of the liquid crystal cell, which is a visual side, a difference in a moisture content of the polarizing plate at the front side under a specific condition in elapse of time is 0.01% or more and 3.0% or less.

19 Claims, 1 Drawing Sheet

(52) U.S. Cl.
CPC ............ *G02F 2001/133311* (2013.01); *G02F 2201/54* (2013.01)

(56) References Cited

U.S. PATENT DOCUMENTS

| | | |
|---|---|---|
| 2003/0151706 A1 | 8/2003 | Sugino et al. |
| 2007/0184212 A1* | 8/2007 | Nimura ................ G02B 5/3033 428/1.31 |
| 2009/0053496 A1 | 2/2009 | Arita et al. |
| 2013/0100378 A1 | 4/2013 | Murata et al. |
| 2016/0084996 A1 | 3/2016 | Kitagawa et al. |

FOREIGN PATENT DOCUMENTS

| | | |
|---|---|---|
| JP | 2003-084136 A | 3/2003 |
| JP | 2006-267272 A | 10/2006 |
| JP | 2007-047776 A | 2/2007 |
| JP | 2008-040275 A | 2/2008 |
| JP | 2008-230036 A | 10/2008 |
| JP | 2009-157140 A | 7/2009 |
| JP | 2010-240986 A | 10/2010 |
| JP | 2011-248363 A | 12/2011 |
| JP | 2012-103657 A | 5/2012 |
| JP | 5251827 B2 | 7/2013 |
| JP | 5871408 B1 | 3/2016 |
| JP | 5948870 B2 | 7/2016 |
| KR | 2008-0045607 A | 5/2008 |
| WO | WO-2007/077871 A1 | 7/2007 |
| WO | 2011/145495 A1 | 11/2011 |
| WO | WO-2011/162198 A1 | 12/2011 |

OTHER PUBLICATIONS

International Preliminary Report on Patentablity (IPRP) issued by WIPO dated Apr. 23, 2015 in connection with International Application No. PCT/JP2013/077384.
International Search Report and Written Opinion of the ISA issued by WIPO dated Dec. 24, 2013 in connection with International Application No. PCT/JP2013/077384.
Notification of Reasons for Refusal, issued by the Japanese Patent Office (JPO) dated Mar. 22, 2016, in connection with corresponding Japanese Patent Application No. 2014-540855.
Notice of Grounds for Rejection, issued by the Korean Intellectual Property Office (KIPO) dated Jul. 1, 2016, in connection with corresponding Korean Patent Application No. 2015-7009380.
Notification of Reasons for Refusal issued by the Japanese Patent Office on Oct. 3, 2017, in connection with Japanese Patent Application No. 2016-236258.

* cited by examiner

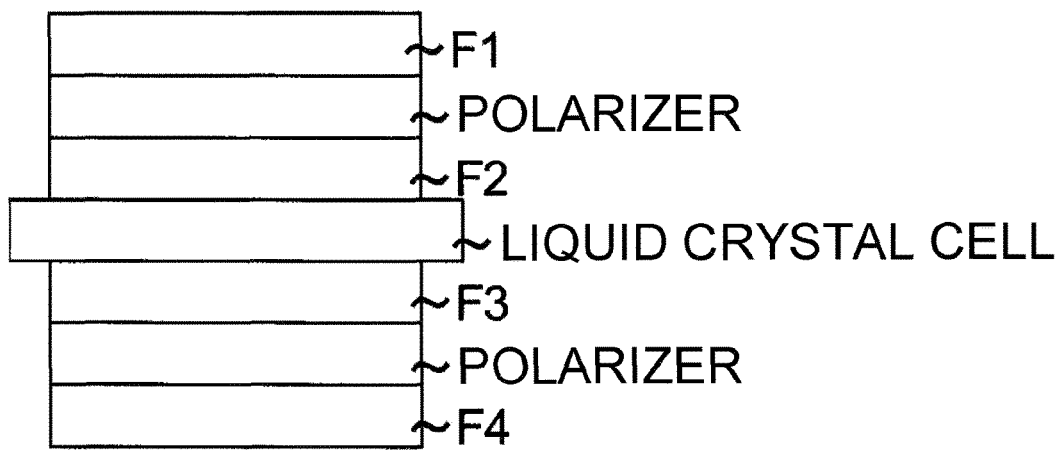

LIQUID CRYSTAL DISPLAY

CROSS REFERENCE TO RELATED APPLICATION(S)

This is a continuation of International Application No. PCT/JP2013/077384 filed on Oct. 8, 2013, which was published under PCT Article 21(2) in Japanese, and claims priority from Japanese Patent Application Nos. 2012-227510 filed on Oct. 12, 2012, 2013-021838 filed on Feb. 6, 2013, and 2013-049449 filed on Mar. 12, 2013, the entire disclosures of all of which are incorporated herein by reference in their entirety.

BACKGROUND

1. Technical Field

The present invention relates to a liquid crystal display device, and more particularly, to a liquid crystal display device capable of solving a problem such as light leakage after storing under a high-moisture environment that is actualized in a liquid crystal display device using a thin glass substrate.

2. Background Art

A liquid crystal display device is a space-saving image display device with low electric power consumption, and its use is being expanded year by year. In the related art, the liquid crystal display device has a large disadvantage that the display image has large dependency on a viewing angle, but a wide-viewing angle liquid crystal mode such as a VA mode and an IPS mode has been commercialized, and as a result, the demand for the liquid crystal display device has been rapidly expanded even in a market in which a high-quality image is required, such as in the television.

The basic configuration of the liquid crystal display device is to dispose polarizing plates on both sides of a liquid crystal cell. The polarizing plate serves to transmit only light of a polarized plane in a predetermined direction, and the performance of the liquid crystal display device greatly depends on the performance of the polarizing plate. The VA mode or the IPS mode is used as a normal black (displayed by black when voltage between electrodes in the liquid crystal cell is 0), and in this case, optical absorption axes of the polarizing plates at both sides of the liquid crystal cell are orthogonal to each other. Non-polarized light emitted from a light source transmits only polarization in a predetermined direction in the polarizing plate at the light source side, transmits the polarizing plate while the polarization state is not changed when passing through the liquid crystal cell, and is absorbed by a polarizing plate at a viewer side of which the optical absorption axis is orthogonal to the polarizing plate at the light source side. Therefore, the black display may be implemented.

The polarizing plate of the liquid crystal display device generally has a structure in which a polarizer is constituted of a polyvinyl alcohol film and the like, on which iodine or a dye is adsorbed and oriented and transparent protective films are attached on inner and outer sides of the polarizer. A cellulose acylate-based polarizing plate protective film typically of cellulose acetate has high transparency and may readily secure adhesiveness to polyvinyl alcohol used in a polarizer, and thus has been widely used as a polarizing plate protective film.

Meanwhile, recently, the usage of acryl resin has been continuously increased as the polarizing plate protective film. The background thereof is to ensure adhesion with polyvinyl alcohol by improving an adhesive technology.

In recent years, with extension of a purpose of the liquid crystal display, a large size and a high-definition texture have been required with respect to the liquid crystal display. In order to decrease a weight of a large-sized liquid crystal display, the thicknesses of various members decrease and the thickness of a glass substrate among the various members has been decreased to 0.5 mm or less from 0.7 mm in the related art. Further, in recent years, it is examined that the thickness is 0.3 mm, and the like. Further, a part corresponding to a frame such as a bezel is formed on the periphery of a screen and the width of the part decreases in order to achieve the high-definition texture.

In Japanese Patent Application Laid-Open No. 2002-6133 and Japanese Patent Application Laid-Open No. 2003-84136, color unevenness or discoloring when a polarizing plate is located under a high-temperature environment is examined and it is disclosed that the color unevenness can be enhanced by decreasing contractile force of a polarizer constituting the polarizing plate.

However, in Japanese Patent Application Laid-Open No. 2002-6133 and Japanese Patent Application Laid-Open No. 2003-84136, an enhancement of the color unevenness of the polarizing plate positioned under the high-temperature environment within a short time is proposed, while it is not noted a problem in occurrence of warp unevenness (light leakage of four corners of the panel) based on bending of a panel caused after a liquid crystal display using a liquid crystal cell, in which a glass thickness is 0.5 mm or less is positioned under a high-humidity environment for a long time.

An object solved by the present invention is to provide a liquid crystal display that can resolve a problem in warp unevenness based on bending of a panel which occurs during turn-on after storage under a high-humidity environment, which is actualized as a liquid crystal display in which the thickness of a glass substrate constituting a liquid crystal cell is smaller (for example, large size (for example, 32 inches or more) in which the thickness of the glass substrate is 0.5 mm or less).

The panel of the liquid crystal display includes the liquid crystal cell and two polarizing plates on both sides of the liquid crystal cell. When the liquid crystal display is positioned under the high-humidity environment (for example, 48 hours at 60° C. and a relative humidity of 90% and 72 hours at 50° C. and a relative humidity of 80%), any one polarizing plate of front and rear polarizing plates is also hydrated and swelled. Thereafter, when the liquid crystal display is left alone and dried, the hydrated and swelled polarizing plate is dried and contracted. Herein, from the reason that the rear polarizing plate is positioned under an environment having higher airtightness than the front polarizing plate, the front polarizing plate is more rapidly dried, and as a result, larger contractile force is generated, while the rear polarizing plate is slowly dried and small contractile force is generated. The present inventors have discovered that the panel is bent due to a difference between the contractile force of the front polarizing plate and the rear polarizing plate, and as a result, four corners of the panel contacts the bezel, thereby causing the warp unevenness (light leakage at four corners of the panel).

Therefore, the present inventors have discovered that as a result of closely examining suppression of the occurrence of the warp unevenness by decreasing the difference between the contractile force of the front polarizing plate and the contractile force of the rear polarizing plate, considering that a change in moisture content of the front polarizing plate is larger than a change in moisture content of the rear polarizing plate which is slowly dried when the liquid crystal display positioned under the high-humidity environment is dried, a moisture content just after a high-temperature high-humidity environment time elapses and just after a time elapses under a low-humidity after the high-temperature high-humidity environment time elapses is set within a predetermined range (dehydration suppression) to suppress the bending of the panel, thereby suppressing the occurrence of the warp unevenness of the front polarizing plate.

The present invention has been completed based on these findings.

SUMMARY OF INVENTION

That is, the above object may be solved by the following configuration.

[1] A liquid crystal display including:

a liquid crystal cell in which a liquid crystal layer is installed between two glass substrates;

polarizing plates on both surfaces of the liquid crystal cell; and a backlight at a rear side of the liquid crystal cell, which is a non-visual side, wherein in a polarizing plate at a front side of the liquid crystal cell, which is a visual side, a difference in a moisture content of the polarizing plate at the front side just after a time under a condition (A) elapses and a moisture content of the polarizing plate at the front side just after a time under a condition (B) elapses is 0.01% or more and 3.0% or less, wherein Condition (A): Left alone for 48 hours under an environment of 60° C. and the relative humidity of 90%, and Condition (B): Left alone for 6 hours under an environment of 25° C. and the relative humidity of 10% after being left alone for 48 hours under an environment of 60° C. and the relative humidity of 90%.

[2] The liquid crystal display according to [1], wherein in the polarizing plate at the front side of the liquid crystal cell, which is the visual side, a difference in a moisture content of the polarizing plate at the front side just after a time under a condition (C) elapses and a moisture content of the polarizing plate at the front side just after a time under a condition (D) elapses is 0.01% or more and 3.0% or less, wherein Condition (C): Left alone for 120 hours under an environment of 60° C. and the relative humidity of 90%, and Condition (D): Left alone for 6 hours under an environment of 25° C. and the relative humidity of 10% after being left alone for 120 hours under an environment of 60° C. and the relative humidity of 90%.

[3] The liquid crystal display according to [1] or [2], wherein the polarizing plate at the front side includes a polarizing plate protective film F1 disposed on a surface of a polarizer at the front side, and the polarizing plate protective film F1 has a moisture permeability of 200 g/m$^2$/day or less and includes a thermoplastic resin film and a low moisture-permeable layer laminated on the thermoplastic resin film, provided that the moisture permeability is a value after 24 hours elapse under conditions of 40° C. and 90% RH, obtained by a manner in accordance with JIS Z-0208.

[4] The liquid crystal display according to [3], wherein at least one low moisture-permeable layer in the polarizing plate protective film F1 satisfies Equation (1):

$$A/B \leq 0.9 \qquad \text{Equation (1):}$$

wherein, in Equation (1), A represents a moisture permeability of a film in which the at least one low moisture-permeable layer is laminated on the thermoplastic resin film, and B represents a moisture permeability of the thermoplastic resin film, provided that moisture permeability is a value after 24 hours elapse under conditions of 40° C. and 90% RH, obtained by a manner in accordance with JIS Z-0208.

[5] The liquid crystal display according to [3] or [4], wherein a thermoplastic resin included in the thermoplastic resin film is a (meth) acrylic resin, an olefin-based resin, a cellulous-based resin, a polycarbonate-based resin, a polystyrene-based resin, a polyester-based resin, and a mixed resin of multiple kinds of resins selected therefrom.

[6] The liquid crystal display according to [1], wherein the polarizing plate at the front side includes a polarizing plate protective film F1 disposed on a surface of the polarizer at the front side, and the polarizing plate protective film F1 satisfies Equations (I) and (V):

$$Re = (nx - ny) \times d \qquad \text{Equation (I)}$$

$$3000 \text{ nm} \leq Re \leq 30000 \text{ nm} \qquad \text{Equation (V)}$$

wherein, in Equations (I) and (V), nx is a refractive index of the polarizing plate protective film F1 in an in-plane slow axis direction, ny is a refractive index of the polarizing plate protective film F1 in an in-plane fast axis direction, and d is a thickness of the polarizing plate protective film F1, whose unit is nm.

[7] The liquid crystal display according to [6], the polarizing plate at the front side includes a polarizing plate protective film F1 disposed on a surface of the polarizer at the front side, and the polarizing plate protective film F1 satisfies Equations (VI) and (VII):

$$Nz = (nx - nz)/(nx - ny) \qquad \text{Equation (VI)}$$

$$Nz \leq 2.0 \qquad \text{Equation (VII)}$$

wherein, in Equation (VI), nx is a refractive index of the polarizing plate protective film F1 in an in-plane slow axis direction, ny is a refractive index of the polarizing plate protective film F1 in an in-plane fast axis direction, and nz is a refractive index of the polarizing plate protective film F1 in a thickness direction.

[8] The liquid crystal display according to any one of [1], [6] and [7], wherein the polarizing plate protective film F1 is a polyester-based resin or a polyester-based resin.

[9] The liquid crystal display according to any one of [3] to [8], wherein the polarizing plate protective film F1 has a moisture permeability of 75 g/m$^2$/day or less, provided that the moisture permeability is a value after 24 hours elapse under conditions of 40° C. and 90% RH, obtained by a manner in accordance with JIS Z-0208.

[10] The liquid crystal display according to any one of [1] to [9], wherein the polarizing plate at the front side includes a polarizing plate protective film F2 disposed on a surface of a polarizer at a liquid crystal cell side, the polarizing plate protective film F2 is a thermoplastic resin film, and a thermoplastic resin included in the thermoplastic resin film is a (meth) acrylic resin, a polycarbonate-based resin, a polystyrene-based resin, a cyclic polyolefin-based resin, a glutaric anhydride-based resin, a glutarimide-based resin, a cellulous-based resin, and a mixed resin of multiple kinds of resins selected therefrom.

[11] The liquid crystal display according to any one of [1] to [10], wherein in a polarizing plate installed at the rear side of the liquid crystal cell, a difference of a moisture content of the polarizing plate just after a time under a condition (A) elapses and a moisture content of the polarizing plate just after a time under a condition (B) elapses is 0.01% or more and 3.0% or less:

Condition (A): Left alone for 48 hours under an environment of 60° C. and the relative humidity of 90%, and
Condition (B): Left alone for 6 hours under an environment of 25° C. and the relative humidity of 10% after being left alone for 48 hours under an environment of 60° C. and the relative humidity of 90%.

[12] The liquid crystal display according to any one of [1] to [11], wherein in a polarizing plate at the rear side of the liquid crystal cell, a difference of a moisture content of the polarizing plate just after a time under a condition (C) elapses and a moisture content of the polarizing plate just after a time under a condition (D) elapses is 0.01% or more and 3.0% or less:

Condition (C): Left alone for 120 hours under an environment of 60° C. and the relative humidity of 90%, and
Condition (D): Left alone for 6 hours under an environment of 25° C. and the relative humidity of 10% after being left alone for 120 hours under an environment of 60° C. and the relative humidity of 90%.

[13] The liquid crystal display according to [11] or [12], wherein the polarizing plate at the rear side includes a polarizing plate protective film F4 on a surface of a polarizer at a backlight side, and the polarizing plate protective film F4 has a moisture permeability of 200 g/m$^2$/day or less and includes a thermoplastic resin film and a low moisture-permeable layer laminated on the thermoplastic resin film, provided that the moisture permeability is a value after 24 hours elapse under conditions of 40° C. and 90% RH, obtained by a manner in accordance with JIS Z-0208.

[14] The liquid crystal display according to [13], wherein at least one low moisture-permeable layer in the polarizing plate protective film F4 satisfies Equation (1):

$$A/B \leq 0.9 \qquad \text{Equation (1)}$$

wherein, in Equation (1), A represents a moisture permeability of a film in which the at least one low moisture-permeable layer is laminated on the thermoplastic resin film, and B represents a moisture permeability of the thermoplastic resin film, provided that the moisture permeability is a value after 24 hours elapse at 40° C. and a relative humidity of 90%, obtained by a manner in accordance with JIS Z-0208.

[15] The liquid crystal display according to [13] or [14], wherein a thermoplastic resin included in the thermoplastic resin film is a (meth) acrylic resin, an olefin-based resin, a cellulous-based resin, a polycarbonate-based resin, a polystyrene-based resin, a polyester-based resin, and a mixed resin of multiple kinds of resins selected therefrom.

[16] The liquid crystal display according to [11] or [12], wherein the polarizing plate at the rear side includes a polarizing plate protective film F4 disposed on a surface of a polarizer at the rear side, and the polarizing plate protective film F4 satisfies Equations (I) and (V):

$$Re=(nx-ny) \leq d \qquad \text{Equation (I)}$$

$$3000 \text{ nm} \leq Re \leq 30000 \text{ nm} \qquad \text{Equation (V)}$$

wherein nx is a refractive index of the polarizing plate protective film F4 in an in-plane slow axis direction, ny is a refractive index of the polarizing plate protective film F4 in an in-plane fast axis direction, and d is a thickness of the polarizing plate protective film F4, whose unit is nm.

[17] The liquid crystal display according to [16], wherein the polarizing plate at the rear side includes a polarizing plate protective film F4 disposed on a surface of a polarizer at the rear side, and the polarizing plate protective film F4 satisfies Equations (VI) and (VII):

$$Nz=(nx-nz)/(nx-ny) \qquad \text{Equation (VI)}$$

$$Nz \leq 2.0 \qquad \text{Equation (VII)}$$

wherein, in Equation (VI), nx is a refractive index of the polarizing plate protective film F4 in an in-plane slow axis direction, ny is a refractive index of the polarizing plate protective film F4 in an in-plane fast axis direction, and nz is a refractive index of the polarizing plate protective film F4 in a thickness direction.

[18] The liquid crystal display according to any one of [11], [12], [16] and [17], wherein the polarizing plate protective film F4 is a polyester-based resin or a polycarbonate-based resin.

[19] The liquid crystal display according to any one of [13] to [18], wherein the polarizing plate protective film F4 has a moisture permeability of 75 g/m$^2$/day or less, provided that, the moisture permeability is a value after 24 hours elapse under conditions of 40° C. and 90% RH, obtained by a manner in accordance with JIS Z-0208.

[20] The liquid crystal display according to any one of [11] to [19], wherein the polarizing plate at the rear side includes a polarizing plate protective film F3 disposed on a surface of a polarizer at a liquid crystal cell side, the polarizing plate protective film F3 is a thermoplastic resin film, and a thermoplastic resin included in the thermoplastic resin film is a (meth) acrylic resin, a polycarbonate-based resin, a polystyrene-based resin, a cyclic polyolefin-based resin, a glutaric anhydride-based resin, a glutarimide-based resin, a cellulous-based resin, and a mixed resin of multiple kinds of resins selected therefrom.

[21] The liquid crystal display according to any one of [1] to [20], wherein the glass substrate of the liquid crystal cell has a thickness of 0.5 mm or less.

There may be provided a liquid crystal display, in particular, a liquid crystal display that can resolve a problem in warp unevenness (light leakage at four corners of the panel) based on bending of the panel which occurs during turn-on after storage under a high-humidity environment, which is actualized as the large-sized liquid crystal display in which the thickness of a glass substrate constituting a liquid crystal cell is 0.5 mm or less. As a result, a liquid crystal display which may be used all over the world.

BRIEF DESCRIPTION OF DRAWINGS

FIG. 1 is a schematic diagram illustrating a layer configuration of an example of a liquid crystal display device of the present invention.

DETAILED DESCRIPTION OF EXEMPLARY EMBODIMENTS

In the present specification, a numerical range represented by using "~" denotes a range including numerical values described before and after "~" as a lower limit and an upper limit. In addition, in the present specification, the description "(meth)acrylate" means "at least one of acrylate and methacrylate". "(meth)acrylate resin", "(meth)acrylate", "(meth) acryloyl", and the like are the same.

In the description of the present embodiment, unless otherwise described, "polarizing plate" is used to include both a long polarizing plate and a polarizing plate cut into size suitable for incorporation into a display device. Further, "cutting" mentioned herein also includes "punching", "clipping" and the like.

In addition, a "slow axis" means the direction in which a refractive index is the largest, and unless otherwise described, a measurement wavelength of the refractive index is a value in a visible light region ($\lambda$=590 nm).

Further, in the present specification, it is analyzed that values, in regard to value ranges, and qualitative expressions (for example, expressions such as "equivalent", and "equal") indicating optical characteristics of respective members such as an optical film and a liquid crystal layer indicate values, value ranges, and properties including a generally permitted error in regard to the liquid crystal display or a member used therefor.

In addition, in the present specification, in describing a layout between respective axial directions or an angle of a cross angle, "parallel", "orthogonal", "0°", "90°", and the like without indicating the range mean "substantially parallel", "substantially orthogonal", "substantially 0°", and "substantially 90°" and are not strict. Within a range to achieve respective objects, a slight deviation is permitted. For example, "parallel" "0°" means that the cross angle is substantially 0°, −10° to 10°, preferably −5° to 5°, and more preferably −3° to 3°. "Orthogonal" "90°" means that the cross angle is substantially 90°, 80° to 100°, preferably 85° to 95°, and more preferably 87° to 93°.

[Liquid Crystal Display of Present Invention]

The liquid crystal display of the present invention includes a liquid crystal cell in which a liquid crystal layer is installed between two glass substrates; and polarizing plates installed on both surfaces of the corresponding liquid crystal cell; and a backlight installed at a rear side (non-visual side) of the corresponding liquid crystal cell. In the polarizing plate installed at a front side (visual side) of the liquid crystal cell, a difference of a moisture content of the polarizing plate just after a time at Condition (A) given below elapses and a moisture content of the polarizing plate just after a time at Condition (B) given below elapses is 0.01% or more and 3.0% or less.

[Condition (A): Left alone for 48 hours under an environment of 60° C. and a relative humidity of 90%]

[Condition (B): Left alone for 6 hours under an environment of 25° C. and a relative humidity of 10% after being left alone for 48 hours under an environment of 60° C. and the relative humidity of 90%]

In order to verify the difference in detail, the liquid crystal display needs to be left alone under a high-temperature and high-humidity environment.

In the polarizing plate installed at the front side (visual side) of the liquid crystal cell, a difference of a moisture content of the polarizing plate just after a time at Condition (C) given below elapses and a moisture content of the polarizing plate just after a time at Condition (D) given below elapses is preferably 0.01% or more and 3.0% or less.

[Condition (C): Left alone for 120 hours under an environment of 60° C. and the relative humidity of 90%]

[Condition (D): Left alone for 6 hours under an environment of 25° C. and the relative humidity of 10% after being left alone for 120 hours under an environment of 60° C. and the relative humidity of 90%]

A longitudinal direction of the liquid crystal display or the panel may correspond to an absorption-axis direction of the front polarizing plate and a transmission-axis direction of the rear polarizing plate.

The longitudinal bending of the panel is suppressed by decreasing a difference (D−H) between contractile force D in the absorption-axis direction of the front polarizing plate and contractile force H in the transmission-axis direction of the rear polarizing plate is decreased to suppress the occurrence of the warp unevenness.

The front polarizing plate of the liquid crystal display which directly contacts an exterior of a case is easily influenced by an external environment compared with the rear polarizing plate in the case. When the liquid crystal display is left alone after a time elapses under a low humidity after the high-temperature high-humidity environment time elapses, even though both the front polarizing plate and the rear polarizing plate are hydrated after the high-temperature high-humidity environment time elapses, since the front polarizing plate is more rapidly humidity-controlled, the moisture contents of the front polarizing plate and the rear polarizing plate are different from each other, and as a result, the contractile force difference occurs. Therefore, the panel is bent.

Herein, when the difference between the contractile force of the front polarizing plate and the contractile force of the rear polarizing plate is decreased, it is preferable that the change in moisture content of the front polarizing plate is decreased or the change in moisture content of the rear polarizing plate is increased, but it is difficult to increase the change in moisture content of the rear polarizing plate in designing the polarizing plate by considering that an environmental change in the case is slower than a change in the external environment and it is preferable to decrease the change in moisture content of the front polarizing plate.

That is, the present invention has a hydration speed so as for the polarizing plate to be hydrated under Condition (A) and the front polarizing plate which is low at a dehydration speed of the polarizing plate is used under Condition (B), and as a result, the difference of the moisture content of the front polarizing plate between Condition (A) and Condition (B) is decreased and the bending of the panel is suppressed to enhance the warp unevenness.

In the liquid crystal display of the present invention, the polarizing plate is used as the front polarizing plate, in which the difference of the moisture content of the polarizing plate just after the time at Condition (A) elapses and the moisture content of the polarizing plate just after the time at Condition (B) elapses is 0.01% or more and 3.0% or less, but further, the polarizing plate is more preferably used in both the front polarizing plate and the rear polarizing plate.

The reason is that the change in moisture content of the front polarizing plate is small, but the moisture content of the rear polarizing plate is changed, and as a result, both the changes in moisture content of the front and rear polarizing plates are suppressed, thereby decreasing the contractile force difference.

The thickness of the glass substrate of the liquid crystal panel of the liquid crystal display of the present invention is preferably 0.7 mm or less, more preferably 0.5 mm or less, and even more preferably 0.3 mm or less.

As the thickness of the glass substrate is small, the bending of the panel by the contractile force of the polarizing plate becomes remarkable, and as a result, the present invention becomes more effective.

The liquid crystal panel of the liquid crystal display of the present invention preferably has a size of 32 inches or more. As the panel has a larger size, the bending of an end becomes remarkable, and as a result, the present invention becomes more effective.

Further, the bending of the panel is suppressed by using a low moisture permeability film, and as a result, the contact between the cell and the backlight member may be suppressed and circular unevenness which is unevenness caused due to the contact between the cell and the backlight member may be enhanced.

When the liquid crystal display of the present invention is used under a condition in which a temperature change and a humidity change are large (for example, a high-temperature high-humidity area, and the like), the liquid crystal display becomes more effective.

(Configuration of General Liquid Crystal Display)

The liquid crystal display is configured to include a liquid crystal cell formed by immersing liquid crystals between two electrode substrates, two polarizing plates disposed at both sides, and at least one optical compensatory films is disposed between the corresponding liquid crystal cell and the corresponding polarizing plate.

The liquid crystal layer of the liquid crystal cell is generally formed by filling the liquid crystals in a space formed by inserting a spacer between two substrates. A transparent electrode layer as a transparent film including a conductive material is formed on the substrate. Further, a gas barrier layer, a hardcoat layer or an under coat layer (base coating layer) (used for adhesion of the transparent electrode layer) may be installed in the liquid crystal cell. The layer is generally installed on the substrate. The substrate of the liquid crystal cell generally has a thickness of 50 µm to 2 mm (Kind of Liquid Crystal Display)

The liquid crystal display of the present invention may be used for the liquid crystal cell in various display modes. Various display modes are proposed, such as TN (Twisted Nematic), IPS (In-Plane Switching), FLC (Ferroelectric Liquid Crystal), AFLC (Anti-ferroelectric Liquid Crystal), OCB (Optically Compensatory Bend), STN (Super Twisted Nematic), VA (Vertically Aligned), ECB (Electrically Controlled Birefringence), and HAN (Hybrid Aligned Nematic). Further, a display mode is also proposed, in which the display modes are aligned and partitioned. The optical film of the present invention is effective even in the liquid crystal display in any display mode. Further, the optical film is effective even in any of transmission type, reflection type, and semitransmission type liquid crystal displays devices.

In particular, the optical film is preferably used in the transmission type TN mode, IPS or FFS mode, and VA mode liquid crystal displays, more preferably used in the IPS or FFS mode and VA mode, and even more preferably used in the IPS or FFS mode.

[Polarizing Plate]

In the front polarizing plate of the liquid crystal display of the present invention, the difference of the moisture content of the polarizing plate just after the time at Condition (A) elapses and the moisture content of the polarizing plate just after the time at Condition (B) elapses is 0.01% or more and 3.0% or less, more preferably, the moisture content is 0.05% or more and less than 2.5%, even more preferably 0.05% or more and less than 1.5%, particularly preferably 0.05% or more and less than 1.0%, and most preferably 0.05% or more and less than 0.5%.

Further, in the front polarizing plate of the liquid crystal display of the present invention, the difference of the moisture content of the polarizing plate just after the time at Condition (C) elapses and the moisture content of the polarizing plate just after the time at Condition (D) elapses is 0.01% or more and 3.0% or less, more preferably, the moisture content is 0.05% or more and less than 2.5%, even more preferably 0.05% or more and less than 1.5%, particularly preferably 0.05% or more and less than 1.0%, and most preferably 0.05% or more and less than 0.5%.

Even in the rear polarizing plate, the difference of the moisture content of the polarizing plate just after the time at Condition (C) elapses and the moisture content of the polarizing plate just after the time at Condition (D) elapses is preferably 0.01% or more and 3.0% or less.

Herein, the change in moisture content is less than 0.01% when the polarizing plate made of a specific material and having a specific configuration or in the case where cost or versatility and performance are not sufficient such as the case in which the film thickness of the polarizer is extremely smaller and a sufficient polarizing plate characteristic may not be exhibited.

Further, in the present invention, the moisture content of the polarizing plate is measured just after humidity control after the time elapses under a specific temperature/humidity environment and the polarizing plate is peeled off in the substrate while a polarizing plate protective film disposed at the liquid crystal cell side of the polarizing plate, which contacts the substrate that prevents water from passing, such as a glass plate.

The reason is that the amount of water that enters the polarizing plate through the polarizing plate protective film at the front side (visual side) of the polarizer in the case of the front (visual-side) polarizing plate and a polarizing plate protective film at a backlight side of the polarizer in the case the rear (non-visual side) polarizing plate.

The measurement of the moisture content performed through humidity control only in the polarizing plate is not sufficient as a determination method of the panel bending and warp-unevenness levels because the water enters the polarizing plate even from the polarizing plate protective film disposed at the liquid crystal cell of the polarizer in an actual panel.

The time just after the time elapses under Conditions (A) and (C) indicates a time within 10 minutes after extracting the polarizing plate from the environment in which 60° C. and the relative humidity of 90% to the environment in which 25° C. and the relative humidity of 60% and the moisture content is measured by inserting the measurement sample member into the airtight container. Further, the time just after the time elapses under Conditions (B) and (D) indicates a time within 10 minutes from a predetermined time under the environment in which 25° C. and the relative humidity of 10% and the moisture content is measured by inserting the measurement sample member into the airtight container within the time.

The front polarizing plate of the liquid crystal display of the present invention has a polarizing plate protective film F1 disposed on the surface of the front side (visual side) of the polarizer and the polarizing plate protective film F1 preferably has a thermoplastic resin film and a low moisture-permeable layer laminated on the corresponding thermoplastic resin film. Further, the front polarizing plate has a polarizing plate protective film F2 disposed on the surface of the liquid crystal cell side of the polarizer and the polarizing plate protective film F2 is preferably the thermoplastic resin film.

The rear polarizing plate of the liquid crystal display of the present invention has a polarizing plate protective film F4 disposed on the surface of the backlight side of the polarizer and the polarizing plate protective film F4 preferably has the thermoplastic resin film and the low moisture-permeable layer laminated on the corresponding thermoplastic resin film. Further, the rear polarizing plate has a polarizing plate protective film F3 disposed on the surface of the liquid crystal cell side of the polarizer and the polarizing plate protective film F3 is preferably the thermoplastic resin film.

The polarizing plate protective film of the present invention will be described below in detail.

The polarizing plate in the present invention may include the polarizer and the polarizing plate protective film laminated in the corresponding polarizer. The polarizing plate in the present invention is also preferably configured by bonding a protective film on one surface of the corresponding polarizing plate and a separate film on an opposite surface of the corresponding polarizing plate.

Both the protective film and the separate film are used for the purpose of protecting the polarizing plate during shipment of the polarizing plate or inspection of the product. In this case, the protective film is attached for the purpose of protecting the surface of the polarizing plate, and the polarizing plate is used on the side opposite to the surface contacting the liquid crystal plate. Further, the separate film is used for the purpose of covering the adhesion layer which is attached to the liquid crystal plate, and used on the side of a surface, which attaches the polarizing plate to the liquid crystal plate.

(Change Rate (%) of Moisture Content of Polarizing Plate)

In terms of controlling the contractile force of the polarizing plate to an appropriate value and suppressing the bending of the panel, a difference in change of the moisture content between an absorption-axis direction (MD direction) of the front polarizing plate and a transmission-axis direction (TD direction) of the rear polarizing plate is preferably small and further, both the changes of the moisture contents are more preferably small.

(Thickness of Polarizing Plate)

In terms of controlling the contractile force of the polarizing plate to the appropriate value, the thickness of the polarizing plate is preferably 170 μm or less, more preferably 160 μm or less, and even more preferably 150 μm. The lower limit is not particularly limited, but is preferably 10 μm or more.

In terms of controlling the contractile force of the polarizing plate to the appropriate value and suppressing the bending of the panel, the thickness of the front polarizing plate is particularly preferably 130 μm or less.

In terms of controlling the contractile force of the polarizing plate to an appropriate value and suppressing the bending of the panel, the thickness of the rear polarizing plate is preferably 1.1 times larger than that of the front polarizing plate.

(Elastic Modulus (GPa) of Polarizing Plate)

In terms of controlling the contractile force of the polarizing plate to the appropriate value and suppressing the bending of the panel, an elastic modulus in the absorption-axis direction of the front polarizing plate is preferably 10 GPa or less, more preferably 9 GPa or less, and further particularly 8 GPa. The lower limit is not particularly limited, but is preferably 2 GPa or more.

In the same terms, the elastic modulus in the transmission-axis direction of the rear polarizing plate is preferably 6 GPa or less, more preferably 5 GPa or less, and further particularly 4 GPa. The lower limit is not particularly limited, but is preferably 1 GPa or more.

(Shape and Configuration)

The shape of the polarizing plate of the present invention includes a polarizing plate with an aspect of a film member cut into a size capable of being inserted into the liquid crystal display and a polarizing plate with an aspect in which the polarizing plate is manufactured to have a long shape by continuous production and is wound up in a roll shape (for example, an aspect of a roll length of 2,500 m or more or 3,900 m or more). In order to manufacture the polarizing plate for a large-screen liquid crystal display, the width of the polarizing plate is preferably 1,470 mm or more.

<Polarizer>

The polarizer used in the polarizing plate of the present invention preferably includes a polyvinyl alcohol-based resin and a dichroic pigment.

(1-1) Polyvinyl Alcohol-Based Resin (Hereinafter, Also Referred to as PVA)

The PVA is preferably a polymer material obtained by saponifying polyvinyl acetate, and may include an ingredient that may be copolymerized with unsaturated carboxylic acids, unsaturated sulfonic acids, olefins, or vinyl acetate such as vinyl ethers. In addition, a modified PVA including an acetoacetyl group, a sulfonic acid group, a carboxyl group, an oxyalkylene group or the like may also be used.

Otherwise, a PVA film including 1,2-glycol bonds in an amount of 1.5 mol % or less as described in Japanese Patent No. 3021494, a PVA film including optical foreign objects having a size of 5 μm or more by 500 or less per 100 cm$^2$ as described in Japanese Patent Application Laid-Open No. 2001-316492, a PVA film exhibiting an unevenness in hot-water cutting temperature of 1.5° C. or lower in the TD direction of the film as described in Japanese Patent Application Laid-Open No. 2002-030163, or a PVA film formed from a solution prepared by mixing 1 part by mass to 100 parts by mass of trivalent to hexavalent polyhydric alcohol such as glycerin or a solution prepared by mixing 15% by mass or more of a plasticizer as described in Japanese Patent Application Laid-Open No. H06-289225 may preferably be used for the polarizing plate of the present invention.

Even among them, as the polyvinyl alcohol-based resin used in the polarizer of the present invention, the polymer material obtained by saponifying the polyvinyl acetate is preferable in terms of manufacturing cost. Further, saponifying the polyvinyl acetate is not particularly limited, but for example, even saponifying is also preferably 90% or more, more preferably 95% or more, and particularly preferably 99% or more.

In the present invention, a weight-average molecular weight of the polyvinyl alcohol-based resin is not particularly limited, but is preferably 100,000 to 300,000, more preferably 140,000 to 260,000, and particularly preferably 150,000 to 200,000.

(1-2) Dichroic Pigment

The polarizer of the present invention preferably includes the dichroic pigment. Herein, the dichroic pigment means a pigment of which light absorbance varies depending on the direction in the specification and includes iodine ions, a diazo-based pigment, a quinone-based pigment, other known dichroic dyes, and the like. As the dichroic dye, a higher iodine ion such as $I_3$-, or $I_5$-, or a dichroic dye may be preferably used.

The higher iodine ion is particularly preferably used in the present invention. The higher iodine ions may be produced by immersing PVA in a solution that is prepared by dissolving iodine in an aqueous solution of potassium iodide and/or an aqueous solution of boric acid and allowing iodine to be adsorbed and oriented by the PVA as described in "Applications of Polarizing Plates", edited by Ryo Nagata, CMC Publishing Co., Ltd. or "Industrial Materials", Vol 28, No. 7, pp. 39 to 45.

(1-3) Film Thickness of Polarizer

In the present invention, as one of a means for setting the contractile force of the polarizing plate to a predetermined value, the contractile force of the polarizing plate may be set to the predetermined value by setting the film thickness of the polarizer. The film thickness of the polarizer in the present invention is preferably 30 μm or less, more preferably 1.5 to 20 μm, even more preferably 3 to 16 μm, and most preferably 4 to 10 μm.

Both the thicknesses of the polarizers used in the front and rear polarizing plates are preferably 30 μm or less.

When the film thickness of the polarizer is larger than 30 μm, the warp unevenness, the light leakage, and the like may be caused in a tendency in which the contractile force of the polarizing plate increases and further, even though the film thickness of the polarizer is excessively small, the light leakage, and the like may be caused.

Further, in particular, in terms of decreasing the difference (D-H) of the contractile force by suppressing the contractile force of the front polarizing plate, the thickness of the polarizer used in the front polarizing plate is preferably smaller than that of the polarizer used in the rear polarizing plate.

[Method for Preparing Polarizer]

A method for preparing the polarizer in the present invention is not particularly limited as a method for preparing the polarizer in the present invention, which includes polyvinyl alcohol and iodine. For example, it is preferable to configure the polarizer by making that the PVA into a film and thereafter, introducing the iodine. The PVA film may be prepared with reference to a method described in [0213] to [0237] of Japanese Patent Application Laid-Open No. 2007-86748, Japanese Patent Publication No. 3342516, Japanese Patent Application Laid-Open Nos. 2001-302817, 2002-144401, and the like.

Even among them, the method for preparing the polarizer in the present invention preferably includes a process of film-forming a polyvinyl alcohol-based resin solution including the polyvinyl alcohol-based resin in a film type, a process of stretching the polyvinyl alcohol-based resin film, and a process of dying the polyvinyl alcohol-based resin film after stretching by the dichroic pigment.

In detail, it is particularly preferable that the method for preparing the polarizer is sequentially performed in the sequence of describing a process of preparing a PVA-based resin solution, a casting process, a swelling process, a dyeing process, a film hardening process, a stretching process and a drying process. Further, during or after the above-described processes, an on-line plane shape inspection process may be included.

(Preparation of PVA-Based Resin Solution)

In the process of preparing the PVA-based resin solution, it is preferable that a PVA-based resin is added while being stirred with water and a stock solution acquired by dissolving the PVA-based resin in water or an organic solvent is prepared. The concentration of the polyvinyl alcohol-based resin in the stock solution is preferably 5% by mass to 20% by mass. A polyvinyl alcohol-based resin wet cake having a moisture content of approximately 40% may be once prepared by dehydrating acquired slurry. Further, in the case of adding additives, for example, a method to put the wet-cake of PVA in a dissolver, add a plasticizer and water thereto, and stir the dissolver while blowing in water steam from the bottom of the dissolver is preferable. An internal resin temperature is preferably achieved by warming the dissolver at 50° C. to 150° C., and the inside of the system may be pressurized.

(Casting)

As the casting process, a method for forming a film by casting a stock solution of the PVA-based resin solution prepared above is generally preferably used. The casting method is not particularly limited, but it is preferable that the heated stock solution of the PVA-based resin solution is supplied to a biaxial extruder and the stock solution is casted from a discharge means (preferably a die and more preferably a T-type slit die) on a support by a gear pump to form the film. In addition, the temperature of the resin solution discharged from the die is not particularly limited.

As the support, a cast drum is preferable, and the diameter, width, rotation speed and surface temperature of the drum are not particularly limited. Even among them, the diameter (R1) of the cast drum is preferably 2000 to 5000 mm, more preferably 2500 to 4500 mm, and particularly preferably 3000 to 3500 mm The width of the cast drum is preferably 2 to 6 m, more preferably 3 to 5 m, and particularly preferable 4 to 5 m.

The rotation speed of the cast drum is preferably 2 to 20 m/minute, more preferably 4 to 12 m/minute, and particularly preferably 5 to 10 m/minute.

The surface temperature of the cast drum is preferably 40 to 140° C., more preferably 60 or 120° C., and particularly preferably 80 to 100° C.

A resin temperature of the T-type slit die outlet is preferably from 40 to 140° C., more preferably 60 to 120° C., and particularly preferably 80 to 100° C.

Thereafter, it is preferable that drying is performed while alternately passing the rear side and surface of the obtained roll through the drying roll. The diameter, width, rotation speed and surface temperature of the drying roll are not particularly limited. Even among them, the diameter (R1) of the cast drum is preferably 200 to 450 mm, more preferably 250 to 400 mm, and particularly preferably 300 to 350 mm Further, the obtained length of the film is not particularly limited, and a long-sized film of which the length is 2000 m or more and preferably 4000 m or more may be used. The width of the film is not particularly limited, however, is preferably 2 to 6 m and more preferably 3 to 5 m.

(Swelling)

The swelling process is preferably performed with only water, but as described in Japanese Patent Application Laid-Open No. 10-153709, in order to stabilize the optical performance and avoid the generation of wrinkles of a polarizing plate substrate in a preparation line, the degree of swelling of the polarizing plate substrate may be managed by allowing a boric acid aqueous solution to swell the polarizing plate substrate.

Furthermore, the temperature and time of the swelling process may be arbitrarily set, but is preferably 10° C. to 60° C. and 5 seconds to 2,000 seconds.

Further, the film may be slightly stretched during the swelling process, and for example, an aspect of stretching the film 1.05 to 1.5 times is preferable and an aspect of stretching the film approximately 1.3 times is more preferable.

(Dyeing)

As the dyeing process, a method described in Japanese Patent Application Laid-Open No. 2002-86554 may be used. Further, as a dyeing method, it is possible to use any means such as immersion, application or spraying of iodine or a dyeing solution. In addition, as described in Japanese Patent Application Laid-Open No. 2002-290025, it is possible to use the concentration of iodine, the temperature of a dye bath, the stretching magnification in the bath and a method for dyeing while stirring a bath solution in the bath.

When the higher iodine ion is used as the dichroic pigment, it is preferable that the dyeing process uses a solution obtained by dissolving iodine in a potassium iodide aqueous solution in iodine in order to obtain a high-contrast polarizing plate. In this case, as a mass ratio of iodine and potassium iodide in the iodine-potassium iodide aqueous solution, an aspect described in Japanese Patent Application Laid-Open No. 2007-086748 may be used.

Furthermore, as described in Japanese Patent Publication No. 3145747, a boron-based compound such as boric acid and borax may be added to a dyeing solution.

(Hardened Film)

In the film hardening process, a crosslinking agent is preferably included by immersion in a crosslinking agent solution or applying the solution. Further, as described in Japanese Patent Application Laid-Open No. H11-52130, the film hardening process may be performed by dividing the process several times.

As the crosslinking agent, the crosslinking agents described in U.S. Reissue Pat. No. 232,897 may be used, and as described in Japanese Patent Publication No. 3357109, polyvalent aldehyde may be used as the crosslinking agent in order to improve the dimensional stability, but boric acids are most preferably used. When boric acid is used as the crosslinking agent used in the film hardening process, a metal ion may be added to the boric acid-potassium iodide aqueous solution. As the metal ion, zinc chloride is preferable, but as described in Japanese Patent Application Laid-Open No. 2000-35512, halogenated zinc such as zinc iodide and zinc salt such as zinc sulfate, and zinc acetate may be used instead of zinc chloride.

In addition, the film may be hardened by preparing a boric acid-potassium iodide aqueous solution to which zinc chloride is added and immersing a PVA film in the solution, and it is possible to use a method described in Japanese Patent Laid-Open No. 2007-086748.

In the present invention, as one of a means for setting the contractile force of the polarizing plate to the predetermined value, the contractile force of the polarizing plate may be set to the predetermined value by appropriately performing a film hardening condition (adjustment of a film hardening time, and the like) of the polarizer.

(Stretching)

The stretching process may preferably use a longitudinal uniaxial stretching mode as described in U.S. Pat. No. 2,454,515, or a tenter mode as described in Japanese Patent Application Laid-Open No. 2002-86554. The preferable stretching magnification is 2 folds to 12 folds and more preferably 3 folds to 10 folds. Furthermore, the method may be preferably performed may be achieved by defining (the film thickness of a polarizer after bonding the protective film/film thickness of a raw fabric)×(the whole stretching magnification)>0.17 as described in Japanese Patent Application Laid-Open No. 2002-040256 as the relationship between the stretching magnification, the thickness of a raw fabric and the thickness of a polarizer, or by defining 0.80 ≤(the width of the polarizer during bonding of the protective film/the width of the polarizer when discharged from the bath at the last time)≤0.95 as described in Japanese Patent Application Laid-Open No. 2002-040247 as the relationship between the width of the polarizer when discharged from the bath at the last time and the width of the polarizer during bonding of the protective film.

In the present invention, as one of the means for setting the contractile force of the polarizing plate to the predetermined value, the contractile force of the polarizing plate may be set to the predetermined value by appropriately adjusting the stretching magnification.

(Drying)

The drying process may use a method known in Japanese Patent Application Laid-Open No. 2002-86554, a preferable temperature range is 30° C. to 100° C. and a preferable drying time is 30 seconds to 60 minutes. Further, a thermal treatment in which discoloration temperature in water is set to 50° C. or higher as described in Japanese Patent Publication No. 3148513, or aging in an atmosphere in which the temperature and relative humidity are controlled as described in Japanese Patent Application Laid-Open No. H07-325215 or Japanese Patent Application Laid-Open No. H07-325218, may also be preferably performed.

(Application-Type Polarizer)

Further, the polarizer having the small film thickness may be formed by a preparation method using an application method described in Japanese Patent Application No. 4691205 or Japanese Patent Application No. 4751481.

It is preferable that a polarizer having a film thickness of 1.5 μm to 20 μm is prepared by the process.

Further, the film thickness may be controlled by a known method, and may be controlled, for example, by setting a die slit width or stretching conditions in the casting process to appropriate values.

[Polarizing Plate Protective Film and Method for Preparing Polarizing Plate Protective Film]

[Polarizing Plate Protective Film]

The polarizing plate protective film of the present invention may have a single layer structure or a laminated structure. A preparation method of the laminated structure may be co-casting, co-extrusion, application, transfer, bonding of a plurality of films, and the like. When the application layer is applied with the thermoplastic resin film, the thermoplastic resin film is also just referred to as a substrate or a substrate film.

The front polarizing plate of the present invention preferably has the polarizing plate protective film F1 having a functional layer on the thermoplastic resin film and more preferably, the rear polarizing plate also has the polarizing plate protective film F4 having the functional layer on the thermoplastic resin film.

The functional layer may include a low moisture-permeable layer, a hardcoating layer, an anti-reflective layer (layers in which a refractive index is adjusted, such as a low refractive index layer, an intermediate refractive index layer, and a high refractive index layer), an antiglare layer, an antistatic layer, an ultraviolet absorption layer and the like.

In the polarizing plate protective films F1 and F4 of the present invention, the functional layer is preferably laminated on the thermoplastic resin film and the functional layer is more preferably the low moisture-permeable layer.

In the polarizing plate protective films F1 and F4 of the present invention as the thermoplastic resin film and the optical film having the low moisture-permeable layer laminated on the corresponding thermoplastic resin film, moisture permeability of the optical film is preferably 200 g/m²/day or less. The polarizing plate protective films F1 and F4 of the present invention as the thermoplastic resin film and the optical film having the low moisture-permeable layer laminated on the corresponding thermoplastic resin film more preferably meet Equation (1).

$$A/B \leq 0.9 \qquad \text{Equation (1):}$$

(In Equation (1), A represents the moisture permeability of the optical film in which the low moisture-permeable layer is laminated on the thermoplastic resin film and B represents the moisture permeability of the thermoplastic resin film. However, the moisture permeability is a value after 24 hours elapse at 40° C. and the relative humidity of 90% by a technique of JIS Z-0208).

By such a configuration, durability is excellent and permeation and attachment and detachment of moisture may be reduced.

The polarizing plate protective films F1 and F4 of the present invention more preferably meet Equation (2) given below, more preferably meet Equation (3) given below, and particularly preferably meet Equation (4) given below.

$$0.01 A/B \leq 0.8 \qquad \text{Equation (2):}$$

$$0.02 \leq A/B \leq 0.6 \qquad \text{Equation (3):}$$

$$0.04 \leq A/B \leq 0.5 \qquad \text{Equation (4):}$$

Definition of A and B in Equations (2) to (4) is the same as definition of A and B in Equation (1).

Since the laminated structure more widely may control mechanical physical properties such as the elastic modulus, and the change in moisture content than the single structure, the laminated structure is preferable in terms of both the physical property and the moisture permeability.

Further, in a first aspect of the preparation method of the polarizing plate protective films F1 and F4 of the present invention as a preparation method of the optical film having the functional layer laminated on the substrate film, which includes a process of forming the substrate film by casting a polymer solution including the thermoplastic resin and the solvent on the support and a process of laminating the functional layer, more preferably, the low moisture-permeable layer on the substrate film through application, the moisture permeability of the optical film is 200 g/m²/day or less and meets Equation (1) given below.

$$A/B \leq 0.9 \qquad \text{Equation (1):}$$

(In Equation (1), A represents the moisture permeability of the optical film in which the low moisture-permeable layer is laminated on the thermoplastic resin film and B represents the moisture permeability of the substrate film. However, the moisture permeability is a value after 24 hours elapse at 40° C. and the relative humidity of 90% by a technique of JIS Z-0208).

Further, in a second aspect of the preparation method of the polarizing plate protective films F1 and F4 of the present invention as a preparation method of the optical film having the functional layer laminated on the substrate film, which includes a process of forming the substrate film by melting and film-forming the thermoplastic resin and a process of laminating the functional layer, more preferably, the low moisture-permeable layer on the substrate film through application, the moisture permeability of the optical film is 200 g/m²/day or less and meets Equation (1) given below.

$$A/B \leq 0.9 \qquad \text{Equation (1):}$$

(In Equation (1), A represents the moisture permeability of the optical film in which the low moisture-permeable layer is laminated on the thermoplastic resin film and B represents the moisture permeability of the substrate film. However, the moisture permeability is a value after 24 hours elapse at 40° C. and the relative humidity of 90% by a technique of JIS Z-0208).

By such a configuration, the polarizing plate protective films F1 and F4 of the present invention may be easily prepared.

Hereinafter, preferable aspects of the polarizing plate protective films F1 and F4 and the preparation method thereof of the present invention will be described.

Characteristics of Polarizing Plate Protective Films F1 and F4

(Film Thicknesses of Polarizing Plate Protective Films F1 and F4)

The film thicknesses (a total film thickness after laminating the low moisture-permeable layer on the substrate film) of the polarizing plate protective films F1 and F4 of the present invention is preferably 5 to 100 μm, more preferably 10 to 80 μm, and particularly preferably 15 to 75 μm.

(Moisture Permeability of Polarizing Plate Protective Films F1 and F4)

The moisture permeability of the polarizing plate protective films F1 and F4 of the present invention is measured under a condition of 40° C. and 90% RH based on JISZ-0208.

The moisture permeability of the optical film of the present invention is 200 g/m²/day or less, preferably 100 g/m²/day or less, more preferably 90 g/m²/day or less, even more preferably 80 g/m²/day or less, still more preferably 75 g/m²/day or less, particularly preferably 50 g/m²/day or less, and most preferably 30 g/m²/day or less. When the moisture permeability is 200 g/m²/day or less, the bending of the liquid crystal cell or display unevenness in black display after a room-temperature environment time, a high-humidity environment time, and high-temperature high-humidity environment time elapse of the liquid crystal display may be suppressed.

As the moisture permeability of the polarizing plate protective films F1 and F4 is low, the difference in moisture content of the polarizing plate decreases.

(Balance of Moisture Permeability of Polarizing Plate Protective Films F1 and F4)

When the polarizing plate is mounted on the liquid crystal display, the balance of the moisture permeability of the polarizing plate protective films F1 and F4 becomes important.

When the moisture permeability of the polarizing plate protective film F4 is 200 g/m²/day or more, the moisture permeability of the polarizing plate protective film F1 of the present invention is 200 g/m²/day or less, preferably 100 g/m²/day or less, more preferably 90 g/m²/day or less, even more preferably 75 g/m²/day or less, and particularly preferably 60 g/m²/day or less. Further, the moisture permeability of the polarizing plate protective film F1 is preferably 30 g/m²/day or more.

When the moisture permeability of the polarizing plate protective film F4 is 200 g/m²/day or more and the moisture permeability of the polarizing plate protective film F1 is less than 30 g/m²/day, the bending of the liquid crystal cell is suppressed, but is different from the case where the moisture permeability of the polarizing plate protective film F1 is 30 g/m²/day or more and the liquid crystal cell is convex from the visual side.

Meanwhile, when the moisture permeability of the polarizing plate protective film F4 is less than 200 g/m²/day, the moisture permeability of the polarizing plate protective film F1 of the present invention is 200 g/m²/day or less, preferably 100 g/m²/day or less, more preferably 90 g/m²/day or less, particularly preferably 75 g/m²/day or less, more particularly preferably 60 g/m²/day or less, and still more particularly preferably 30 g/m²/day or less.

When the moisture permeability is 200 g/m²/day or less, the bending of the liquid crystal cell or the display unevenness in black display after the room-temperature environment time, the high-humidity environment time, and the high-temperature high-humidity environment time of the liquid crystal display elapse may be suppressed.

(Retardation of Polarizing Plate Protective Films F1 and F4)

In the polarizing plate protective films F1 and F4 of the present invention, Re and Rth (defined as Equations (I) and (II) given below) measured in a wavelength of 5900 nm preferably meet Equations (III) and (IV).

$$Re = (nx - ny) \times d \quad \text{Equation (I):}$$

$$Rth = (nx + ny)/2 - nz \times d \quad \text{Equation (II):}$$

$$|Re| \leq 50 \text{ nm} \quad \text{Equation (III):}$$

$$|Rth| \leq 300 \text{ nm} \quad \text{Equation (IV):}$$

Further, as a separate preferable aspect different therefrom, in the polarizing plate protective films F1 and F4 of the present invention, Re (defined by Equation (I) given above) preferably meets Equation (V), further, a Nz value (defined by Equation (VI) given below) more preferably meets Equation (VII), each of Re and Nz most preferably meet both Equations (V) and (VII) and in particular, the polarizing plate protective films F1 and F4 are preferably used in a liquid crystal display using a white light source having a consecutive light emitting spectrum as the backlight.

Herein, the white light source having the consecutive light emitting spectrum is a white light emitting diode, and the like and a white light emitting diode constituted by a blue LED device and a yellow fluorescent substance is particularly preferably used.

$$3000 \text{ nm} \leq Re \leq 30000 \text{ nm} \quad \text{Equation (V):}$$

$$N = (nx - nz)/(nx - ny) \quad \text{Equation (VI):}$$

Herein, Nz=Rth/Re+0.5 and may be acquired by calculation in Re and Rth.

$$Nz \leq 2.0 \quad \text{Equation (VII):}$$

(In Equations (I) to (VII), nx is a refractive index in an in-plane slow axis direction of the film of the polarizing plate protective films F1 and F4, ny is a refractive index in an in-plane fast axis direction of the film of the polarizing plate protective films F1 and F4, nz is a refractive index in a thickness direction of the film of the polarizing plate protective films F1 and F4, and d is a film thickness (nm) of the polarizing plate protective films F1 and F4.)

The Re, Rth, and Nz value of the polarizing plate protective films F1 and F4 of the present invention may be adjusted by the adjustment method of Re and Rth of the thermoplastic resin film which is the substrate film to be described below, a composition or a film thickness of the low moisture-permeable layer, a total film thickness of the polarizing plate protective films F1 and F4 of the present invention, and the like.

Low Moisture-Permeable Layer (Composition of Low Moisture-Permeable Layer)

The low moisture-permeable layer which may be used in the polarizing plate protective films F1 and F4 of the present invention may be formed by any material when the polarizing plate protective films F1 and F4 of the present invention meet Equation (1) given above, but is preferably a layer formed from a composition including a compound having a cyclic aliphatic hydrocarbon group and an unsaturated double bonding group in a molecule or a cyclic polyolefin based resin-containing layer and more preferably the cyclic polyolefin based resin-containing layer in terms of low moisture permeability, preparation adequacy, environmentality, and the like.

The layer formed from the composition including as a primary ingredient the compound having a cyclic aliphatic hydrocarbon group and an unsaturated double bonding group in the molecule will be described.

<Layer Formed from Composition Including as Primary Ingredient Compound Having a Cyclic Aliphatic Hydrocarbon Group and an Unsaturated Double Bonding Group in Molecule>

In the present invention, since the layer formed from the composition including as a primary ingredient the compound having a cyclic aliphatic hydrocarbon group and an unsaturated double bonding group in the molecule grants the low moisture permeability, the corresponding layer has a cyclic aliphatic hydrocarbon group and includes the compound having an unsaturated double bonding group in the molecule and as necessary, may be formed by applying, drying, and hardening a composition including a polymeric initiator, a translucent particle, a fluorine-containing or silicon-based compound, and a solvent directly on the support or another layer interposed therebetween. Hereinafter, each ingredient will be described. Further, the composition or the primary ingredient of the layer represents the composition or an ingredient occupying 50 mass % or more of the layer.

[Compound Having Cyclic Aliphatic Hydrocarbon Group and Unsaturated Double Bonding Group]

The compound having a cyclic aliphatic hydrocarbon group and an unsaturated double bonding group serves as a binder. Further, the compound having a cyclic aliphatic hydrocarbon group and an unsaturated double bonding group may serve as a curing agent, and may improve strength or scratch resistance of a coating film and impart the low moisture permeability simultaneously.

It is possible to realize the low moisture permeability and high surface hardness using the compound. Although not apparent in detail, a hydrophobic cyclic aliphatic hydrocarbon group is introduced and hydrophobized into the low moisture-permeable layer by using the compound having a cyclic aliphatic hydrocarbon group in the molecule, and molecules are prevented from being inserted from the outside, thereby reducing the moisture permeability. Further, the crosslinking point density is increased by having an unsaturated double bonding group in the molecule, thereby limiting a diffusion path of water molecules in the low moisture-permeable layer. It is thought that to increase the crosslinking point density also has an effect of relatively increasing the density of the cyclic aliphatic hydrocarbon group, and the inside of the low moisture-permeable layer is hydrophobized to prevent water molecules from being adsorbed and reduce the moisture permeability.

The number of unsaturated double bonding groups in the molecule is more preferably 2 or more in order to increase the crosslinking point density.

The cyclic aliphatic hydrocarbon group is preferably a group derived from an alicyclic compound having 7 or more carbon atoms, more preferably a group derived from an alicyclic compound having 10 or more carbon atoms, and even more preferably a group derived from an alicyclic compound having 12 or more carbon atoms.

The cyclic aliphatic hydrocarbon group is particularly preferably a group derived from a polycyclic compound such as bicyclic and tricyclic compounds.

More preferably, examples thereof include the central structure of a compound described in the claims of Japanese Patent Application Laid-Open 2006-215096, the central structure of a compound described in Japanese Patent Application Laid-Open No. 2001-10999, the structure of an adamantane derivative, or the like.

The cyclic aliphatic hydrocarbon group (including a linking group) is preferably a group represented by any one of the following Formulas (I) to (V), more preferably a group represented by the following Formulas (I), (II), or (IV), and even more preferably a group represented by the following Formula (I).

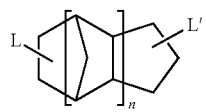
(I)

In Formula (I), each of L and L' independently represents a divalent or higher linking group. n represents integers of 1 to 3.

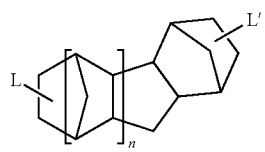
(II)

In Formula (II), each of L and L' independently represents a divalent or higher linking group. n represents an integer of 1 and 2.

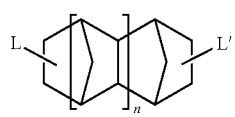
(III)

In Formula (III), each of L and L" independently represents a divalent or higher linking group. n represents an integer of 1 and 2.

(IV)

In Formula (IV), each of L and L' independently represents a divalent or higher linking group and L" represents a hydrogen atom or a divalent or higher linking group.

(V)

In Formula (V), each of L and L' independently represents a divalent or higher linking group.

Specific examples of the cyclic aliphatic hydrocarbon group include norbornyl, tricyclodecanyl, tetracyclodecanyl, pentacyclopentadecanyl, adamantly, diamantanyl and the like.

Examples of the unsaturated double bonding group may include a polymerizable functional group such as a (meth) acryloyl group, a vinyl group, a styryl group, and an allyl group, and among them, a (meth)acryloyl group and —C(O) OCH=CH$_2$ are preferable. Particularly preferably, it is possible to use the following compounds including three or more (meth)acryloyl groups in one molecule.

The compound having a cyclic aliphatic hydrocarbon group and three or more unsaturated double bonding groups in the molecule is composed by bonding the cyclic aliphatic hydrocarbon group and a group having an unsaturated double bonding through the linking group.

Examples of the linking group include a single bond, an alkylene group having from 1 to 6 carbon atoms, which may be substituted, an amide group which may be substituted at the N-position, a carbamoyl group which may be substituted at N-position, an ester group, an oxycarbonyl group, an ether group, and a group obtained by combining these compounds.

These compounds may be easily synthesized by an one-step or two-step reaction of a polyol having a cyclic aliphatic hydrocarbon group, such as diol and triol with carboxylic acid of a compound having a (meth)acryloyl group, a vinyl group, a styryl group, an allyl group and the like, a carboxylic acid derivative, an epoxy derivative, an isocyanate derivative, and the like.

Preferably, the synthesis may be performed by reaction with a polyol having a cyclic aliphatic hydrocarbon group using a compound such as (meth)acrylic acid, (meth)acryloylchloride, (meth)acrylic acid anhydride and (meth)glycidyl acrylate, or a compound described in WO2012/00316A (for example, 1,1-bis(acryloxymethyl)ethyl isocyanate).

Hereinafter, preferable specific examples of the compound having a cyclic aliphatic hydrocarbon group and an unsaturated double bonding group are exhibited, but the present invention is not limited thereto.

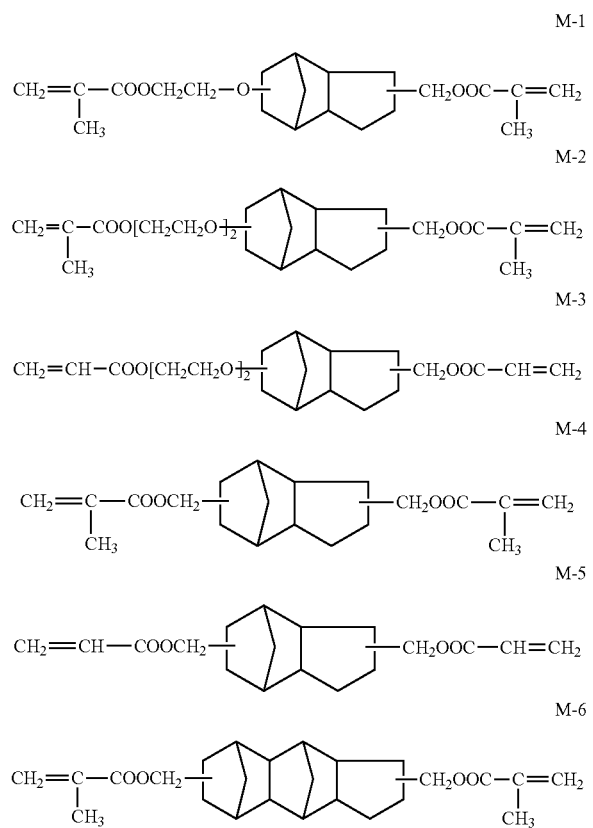

[Polymerization Initiator]

The composition including, as the primary ingredient, a compound having a cyclic aliphatic hydrocarbon group and an unsaturated double bonding group in the molecule preferably includes a polymerization initiator, but as the polymerization initiator, a photopolymerization initiator is preferably used.

Examples of the photopolymerization initiator may include acetophenones, benzoins, benzophenones, phosphine oxides, ketals, anthraquinones, thioxanthones, azo compounds, peroxides, 2,3-dialkyldione compounds, disulfide compounds, fluoroamine compounds, aromatic sulfoniums, lophine dimers, onium salts, borates, active esters, active halogens, inorganic complexes, coumarins and the like. Specific examples, preferable aspects, commercially available products and the like of the photopolymerization initiator are described in paragraph Nos. [0133] to [0151] of Japanese Patent Application Laid-Open No. 2009-098658, and the same may also be used likewise in the present invention.

Various examples are described also in "Saishin UV Koka Gijutsu" (Latest UV Curing Technologies), {Technical Information Institute Co., Ltd.} (1991), p. 159, and "Shi-gaisen Koka System" (Ultraviolet Curing System) written by Kiyomi Kato (1989, published by Sogo Gijutsu Center (United Engineering Center), pp. 65 to 148, and these are useful in the present invention.

As a commercially available light cleavage type photoradical polymerization initiator, "Irgacure 651", "Irgacure 184", "Irgacure 819", "Irgacure 907", "Irgacure 1870" (CGI-403/Irgacure 184=7/3 mixed initiator), "Irgacure 500", "Irgacure 369", "Irgacure 1173", "Irgacure 2959", "Irgacure 4265", "Irgacure 4263", "Irgacure 127", 'OXE01', and the like manufactured by Chiba Specialty Chemical's, Inc.; "Kaya Cure DETX-S", "Kaya Cure BP-100", "Kaya BDMK Cure", "Kaya CTX Cure", "Kaya Cure BMS", "Kaya Cure 2-EAQ" "Kaya Cure ABQ", "Kaya CPTX Cure", "Kaya Cure EPD", "Kaya Cure ITX", "Kaya QTX Cure", "Kaya Cure BTC", "Kaya Cure MCA" and the like manufactured by Nippon Kayaku Co., Ltd.; 'Esacure (KIP100F, KB1, EB3, BP, X33, KT046, KT37, KIP150, TZT)', and the like manufactured by Masa Sato, and combinations thereof may be included as preferable examples.

The content of the photopolymerization initiator in the composition, which includes as a main component a compound having a cyclic aliphatic hydrocarbon group and unsaturated double bond groups in a molecule thereof, which is used in the present invention is preferably 0.5 to 8% by mass and more preferably 1 to 5% by mass, based on the total solid content of the hardcoat layer-forming composition for the reason that the content is set such that a polymerizable compound included in the hardcoat layer-forming composition is polymerized and the initiation point is not excessively increased.

[Solvent]

The composition may include a solvent, which includes as a main component a compound having a cyclic aliphatic hydrocarbon group and unsaturated double bond groups in a molecule thereof, which is used in the present invention. As for the solvent, various solvents may be used in consideration of solubility of the monomer, drying characteristic during the coating, dispersibility of light-transmitting particles and the like. Examples of the organic solvents may include dibutyl ether, dimethoxyethane, diethoxyethane, propylene oxide, 1,4-dioxane, 1,3-dioxolane, 1,3,5-trioxane, tetrahydrofuran, anisole, phenetole, dimethyl carbonate, methyl ethyl carbonate, and diethyl carbonate, acetone, methyl ethyl ketone (MEK), diethyl ketone, dipropyl ketone, diisobutyl ketone, cyclopentanone, cyclohexanone, methylcyclohexanone, ethyl formate, propyl formate, pentyl formate, methyl acetate, ethyl acetate, propyl acetate, methyl propionate, ethyl propionate, γ-butyrolactone, methyl 2-methoxyacetate, methyl 2-ethoxyacetate, ethyl 2-ethoxyacetate, ethyl 2-ethoxypropionate, 2-methoxyethanol, 2-propoxyethanol, 2-butoxyethanol, 1,2-diacetoxyacetone, acetylacetone, diacetone alcohol, methyl acetoacetate, ethyl acetoacetate and the like, methyl alcohol, ethyl alcohol, isopropyl alcohol, n-butyl alcohol, cyclohexyl alcohol, isobutyl acetate, methyl isobutyl ketone (MIBK), 2-octanone, 2-pentanone, 2-hexanone, ethylene glycol ethyl ether, ethylene glycol isopropyl ether, ethylene glycol butyl ether, propylene glycol methyl ether, ethyl carbitol, butyl carbitol, hexane, heptane, octane, cyclohexane, methylcyclohexane, ethylcyclohexane, benzene, toluene, xylene, and the like. The organic solvents may be used either alone or in combination of two or more thereof.

When the thermoplastic resin film is a cellulose acylate film, it is preferred to use at least one of dimethyl carbonate, methyl acetate, ethyl acetate, methyl ethyl ketone, acetyl acetone, and acetone, any of dimethyl carbonate and methyl acetate is more preferred, and methyl acetate is particularly preferred.

The solvent is used such that a solid content concentration of the composition which includes as the main component the compound having a cyclic aliphatic hydrocarbon group and the unsaturated double bond groups in the molecule thereof, which is used in the present invention is preferably 20 to 80% by mass, more preferably 30 to 75% by mass, and even more preferably 40 to 70% by mass.

The cyclic polyolefin-based resin containing layer is described.

(Cyclic Polyolefin-Based Resin Layer)

(a) Cyclic Polyolefin-Based Resin

The cyclic polyolefin-based resin may be used in the low moisture-permeable layer of the present invention. Herein, the cyclic polyolefin-based resin represents a polymer resin having a cyclic olefin structure.

The cyclic polyolefin-based resins preferably used in the present invention will be enumerated.

The polymer having a cyclic olefin structure preferably used in the present invention is the cyclic polyolefin-based resin which is an addition (co)polymer including at least one repeating unit expressed by the following Formula (II) and as necessary, the cyclic polyolefin-based resin which is the addition (co)polymer further including at least one repeating unit expressed by Formula (I). Further, a ring-opening (co)polymer including at least one cyclic repeating unit expressed by Formula (III) may also be appropriately used.

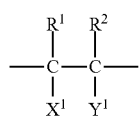

Formula (I)

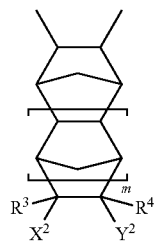

Formula (II)

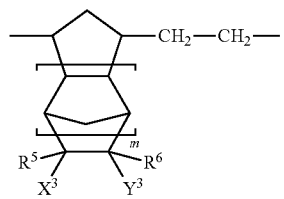

Formula (III)

In Formulas I to III, m represents an integer of 0 to 4. $R^1$ to $R^6$ represent hydrogen atoms or hydrocarbon groups having 1 to 10 carbon atoms, and $X^1$ to $X^3$, $Y^1$ to $Y^3$ represent hydrogen atoms, hydrocarbon groups having 1 to 10 carbon atoms, halogen atoms, hydrocarbon groups having 1 to 10 carbon atoms substituted with halogen atoms, $-(CH_2)_nCOOR^{11}$, $-(CH_2)_nOCOR^{12}$, $-(CH_2)_nNCO$, $-(CH_2)_nNO_2$, $-(CH_2)_nCN$, $-(CH_2)_nCONR^{13}R^{14}$, $-(CH_2)_nNR^{13}R^{14}$, $-(CH_2)_nOZ$, $-(CH_2)-W$, or $(-CO)_2O$, $(-CO)_2NR^{15}$ consisting of $X^1$ and $Y^1$, $X^2$ and $Y^2$, or $X^3$ and $Y^3$. Further, $R^{11}$, $R^{12}$, $R^{13}R^{14}$, and $R^{15}$ represent hydrogen atoms, hydrocarbon groups having 1 to 20 carbon atoms, Z represents a hydrocarbon group or a halogen-substituted hydrocarbon group, W represents $SiR^{16}_pD_{3-p}$ ($R^{16}$ is a hydrocarbon group of 1 to 10 carbon atoms, D represents a halogen atom, $-OCOR^{16}$ or $-OR^{16}$, p represents an integer of 0 to 3, and n represents an integer of 0 to 10.

Further, it is preferred that the norbornene-based polymer hydride may be used, and as disclosed in Japanese Patent Application Laid-Open Nos. H1-240517, H7-196736, S60-26024, S62-19801, 2003-1159767, 2004-309979 or the like, the norbornene-based polymer hydride is prepared by subjecting a polycyclic unsaturated compound to addition polymerization or metathesis ring-opening polymerization and then to hydrogenation. In the norbornene-based polymer used in the present invention, $R^3$ to $R^6$ are preferably hydrogen atoms or $-CH_3$, and more preferably, hydrogen atoms in terms of low moisture permeability. $X^3$ and $Y^3$ are preferably hydrogen atoms, Cl, or $-COOCH_3$, and more preferably, hydrogen atoms in terms of low moisture permeability. Other groups are properly selected. m is preferably 0 or 1.

Further, it is preferred that norbornene-based addition (co)polymers may be used, and the norbornene-based addition (co)polymers are disclosed in Japanese patent Application Laid-Open No. H10-7732, Japanese Patent Publication No. 2002-504184, U.S. Patent Application Publication No. 2004229157, International Publication WO2004/070463, and the like. The norbornene-based addition (co)polymer is obtained by addition-polymerizing norbornene-based polycyclic unsaturated compounds with each other. Further, if necessary, the norbornene-based polycyclic unsaturated compound may be addition-polymerized with ethylene, propylene, butene; a conjugated diene such as butadiene, and isoprene; a non-conjugated diene such as ethylidene norbornene; or a linear diene compound such as acrylonitrile, acrylic acid, methacrylic acid, anhydrous maleic acid, acrylic acid ester, methacrylic acid ester, maleimide, vinyl acetate, vinyl chloride, and the like. Among them, a ethylene copolymer is preferred. The norbornene-based addition (co) polymer may use, for example, TOPAS6013 and the like manufactured by Poly Plastic Co., Ltd., as commercial products.

(b) Organic Solvent

A cyclic polyolefin-based resin-containing layer of the present invention may be prepared by coating. When the cyclic polyolefin-based resin-containing layer is prepared by coating, it is preferred to use a coating composition for forming the cyclic polyolefin-based resin-containing layer including at least cyclic polyolefin-based resin and an organic solvent. The organic solvent that may be used for the coating composition for forming the cyclic polyolefin-based resin-containing layer of the present invention may include a chain-like aliphatic hydrocarbon solvent such as n-pentane, n-hexane, n-heptane, liquid paraffin, mineral spirit; an alicyclic hydrocarbon-based solvent such as cyclopentane, cyclohexane, methyl cyclohexane, dimethylcyclohexane, trimethylcyclohexane, ethylcyclohexane, diethyl cyclohexane, decahydronaphthalene, dicyclo heptane, tricyclodecane, hexahydro-indene, and cyclooctane; a aromatic hydrocarbon solvent such as benzene, toluene, and xylene; a hydrocarbon-based solvent having an alicyclic ring such as indene and tetrahydronaphthalene and an aromatic ring; a nitrogen-containing hydrocarbon solvent such as nitromethane, nitromethane, and acetonitrile; a oxygen-containing hydrocarbon-based solvent such as diethyl ether and tetrahydrofuran; a chloride-based solvent such as dichloromethane and chloroform; a alcohol-based solvent such as methanol, ethanol, isopropanol, n-butyl alcohol, cyclohexyl alcohol, 2-ethyl-1-hexanol, 2-methyl-1-hexanol, 2-methoxyethanol, 2-propoxy ethanol, 2-butoxyethanol, and diacetone alcohol; a carbonate-based solvent such as dimethyl carbonate, diethyl carbonate, diisopropyl carbonate, methyl ethyl carbonate, and methyl n-propyl carbonate; an ester-based solvent such as ethyl formate, propyl formate, pentyl formate, methyl acetate, ethyl acetate, propyl acetate, methyl propionate, ethyl propionate, 2-ethoxy ethyl propionate, methyl acetoacetate, ethyl acetoacetate, 2-methoxy methyl acetate, 2-ethoxy-methyl acetate, and 2-ethoxy ethyl acetate; an ether-based solvent such as ethylene glycol ethyl ether, ethylene glycol isopropyl ether, ethylene glycol butyl ether, propylene glycol methyl ether, dibutyl ether, dimethoxyethane, diethoxyethane, tetrahydrofuran, anisole, and phenetole; a ketone-based solvent such as acetone, 1,2-diacetoxy acetone, acetyl acetone, methyl ethyl ketone, diethyl ketone, dipropyl ketone, diisobutyl ketone, cyclopentanone, cyclohexanone, methyl cyclohexanone, methyl isobutyl ketone, 2-octanone, 2-pentanone, and 2-hexanone; and the like. The organic solvents may be used either alone or in combination of two or more thereof (Configuration and Manufacturing Method of Low Moisture-Permeable Layer)

The low moisture-permeable layer may be formed by a single layer or multi layers. A lamination method of the low moisture-permeable layer is not particularly limited, but it is preferable to prepare the low moisture-permeable layer by co-casting and co-extrusion with the thermoplastic resin film or to laminate the low moisture-permeable layer on the thermoplastic resin film through coating and it is more preferable to laminate the low moisture-permeable layer on the thermoplastic resin film through coating. That is, the polarizing plate protective films F1 and F4 of the present invention is more preferably formed by laminating the low moisture-permeable layer on the substrate film through coating.

(Film Thickness of Low Moisture-Permeable Layer)

The film thickness of the low moisture-permeable layer is preferably 1 to 28 μm, more preferably 2 to 20 μm and particularly preferably 3 to 17 μm.

The low moisture-permeable layer of the optical film of the present invention preferably additionally has a moisture permeability hardcoat layer function, an anti-reflective function, an anti-fouling function, and the like.

[Thermoplastic Resin Film]

The polarizing plate protective film of the present invention preferably includes the thermoplastic resin film.

It is more preferable that the polarizing plate protective films F1 an F4 of the present invention more preferably includes the thermoplastic resin film as the substrate and the functional layer is laminated thereon.

Thereafter, the thermoplastic film used as the substrate of the lamination film is referred to as the substrate film including the thermoplastic resin or also just referred to as the substrate film.

The polarizing plate protective films F2 and F3 of the present invention are preferably the thermoplastic resin film.

[Substrate Film]

The substrate film includes the thermoplastic resin. Thereafter, the substrate film is referred to as the substrate film including the thermoplastic resin or also just referred to as the substrate film.

<Thermoplastic Resin>

The thermoplastic resin which may preferably use the substrate film as the main component will be described below.

Further, the main component of the substrate film is a component which exceeds 50% by mass of the substrate film.

In the substrate film, as an optimal thermoplastic resin, a (meth) acrylic resin, an olefin-based resin, a cellulous-based resin, a polycarbonate-based resin, a polystyrene-based resin, and a polyester-based resin may be used and may be selected from the resins and a mixed resin of the multiple kinds of resins.

Among them, (meth)acrylic-based resin, polycarbonate-based resin, polystyrene-based resin, cyclic polyolefin-based resin, glutaric anhydride-based resin, glutarimide-based resin, and cellulose-based resin are preferred, (meth)acrylic-based resin, cyclic polyolefin-based resin, cellulose acylate, and a mixed resin of cellulose acylate and (meth)acrylic-based resin are more preferred, (meth)acrylic-based resin, cellulose acylate, and a mixed resin of cellulose acylate and (meth)acrylic-based resin are much more preferred, and (meth)acrylic-based resin is particularly preferred.

Furthermore, the (meth)acrylic-based resin is a concept including both methacrylic-based resin and acrylic-based resin and also includes derivatives of acrylate/methacrylate, and particularly (co)polymers of acrylate ester/methacrylate ester.

Further, the (meth)acrylic-based resin includes a (meth) acrylic-based polymer having a ring structure in a main chain thereof other than methacrylic-based resin and acrylic-based resin, and includes a polymer including a lactone ring, an anhydrous maleic acid-based polymer having a anhydrous succinic acid ring, a polymer having an anhydrous glutaric acid ring, and a polymer having a glutarimide ring.

((Meth)Acrylic-Based Polymer)

The repeating structure unit of the (meth)acrylic-based polymer is not particularly limited. It is preferred that the (meth)acrylic-based polymer has a repeating structure unit derived from a (meth)acrylic acid ester monomer as the repeating structure unit.

The (meth)acrylic acid ester is not particularly limited, but examples thereof include acrylic acid ester such as methyl acrylate, ethyl acrylate, n-butyl acrylate, isobutyl acrylate, t-butyl acrylate, cyclohexyl acrylate, and benzyl acrylate; methacrylic acid ester such as methyl methacrylate, ethyl methacrylate, propyl methacrylate, n-butyl methacrylate, isobutyl methacrylate, t-butyl methacrylate, cyclohexyl methacrylate, and benzyl methacrylate; and the like, and these may be used either alone or in combination of two or more thereof. Among them, methyl methacrylate is particularly preferred from the viewpoint of excellent heat resistance and transparency.

When the (meth)acrylic acid ester is used as a main component, the content ratio thereof in the monomer component used in the polymerization process is preferably 50 to 100% by mass, more preferably 70 to 100% by mass, much more preferably 80 to 100% by mass, and particularly preferably 90 to 100% by mass so as to exhibit the effect of the present invention sufficiently.

The glass transition temperature Tg of the resin including as the main component the (meth)acrylic acid ester is preferably within the range of 80 to 120° C.

Furthermore, it is preferred that a weight average molecular weight of the resin including as the main component the (meth)acrylic acid ester is preferably in the range from 50,000 to 500,000.

In order to increase the handling ability by improving flexibility, rubber elastic particles are preferably combined with the (meth)acrylic-based resin. The rubber elastic particles are particles including a rubber elastic body and may be particles composed of the rubber elastic body, multi-layered particles having a layer of the rubber elastic body, and an acrylic-based elastic polymer is preferably used in terms of surface hardness, light resistance, and transparency of the film.

The rubber elastic particles including the acrylic-based elastic polymer may be acquired with reference to Japanese Patent Application Laid-open Nos. 2012-180422, 2012-032773, and 2012-180423.

A number average particle diameter of the rubber elastic particle is preferably in the range of 10 to 300 nm and more preferably in the range of 50 to 250 nm.

In a (meth) acrylic-based resin composition forming the (meth) acrylic-based resin film, the rubber elastic particles of 25 to 45% by mass, which have the number average particle diameter in the range of 10 to 300 nm are preferably combined with a transparent acrylic-based resin.

(Meth)Acrylic-Based Polymer Having Ring Structure in Main Chain

Among the (meth)acrylic-based polymers, preferred is a (meth)acrylic-based polymer having a ring structure in a main chain thereof. The ring structure is introduced into the main chain to increase stiffness of the main chain and improve heat resistance.

In the present invention, among the (meth)acrylic-based polymers having a ring structure in the main chain thereof, preferred is any of a polymer including a lactone ring structure in the main chain thereof, an anhydrous maleic acid-based polymer having a anhydrous succinic acid ring in the main chain thereof, a polymer having an anhydrous glutaric acid ring structure in the main chain thereof, and a polymer having a glutarimide ring structure in the main chain thereof. Among them, more preferred are the polymer including the lactone ring structure in the main chain thereof and the polymer having a glutarimide ring structure in the main chain thereof.

Hereafter, these polymers having a ring structure in the main chain thereof will be sequentially described.

(1) (Meth)Acrylic-Based Polymer having Lactone Ring Structure in Main Chain

The (meth)acrylic-based polymer having a lactone ring structure in the main chain thereof (hereinafter, also referred to as a lactone ring-containing polymer) is not particularly limited as long as the polymer is the (meth)acrylic-based polymer having a lactone ring in the main chain thereof, but the polymer preferably has a lactone ring structure represented by the following Formula (100).

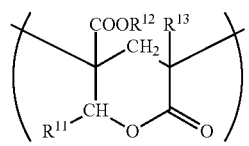

Formula (100)

In Formula (100), each of $R^{11}$, $R^{12}$ and $R^{13}$ independently represents an organic residue having from 1 to 20 hydrogen atom or carbon atoms, and the organic residue may include an oxygen atom.

Here, as the organic residue having 1 to 20 carbon atoms, a methyl group, an ethyl group, an isopropyl group, an n-butyl group, a t-butyl group, and the like are preferred.

The content ratio of the lactone ring structure represented by Formula (100) in the lactone ring-containing polymer structure is preferably 5 to 90% by mass, more preferably 10 to 70% by mass, much more preferably 10 to 60% by mass, and particularly preferably 10 to 50% by mass. The polymer obtained by setting the content ratio of the lactone ring structure as 5% by mass or more tends to have improved heat resistance and surface hardness, and the polymer obtained by setting the content ratio of the lactone ring structure as 90% by mass or less tends to have improved molding processability.

Further, the content ratio of the lactone ring structure may be calculated from the following Equation.

Content ratio of lactone ring (% by mass)=$B \times A \times M_R / M_m$ (In Equation, B is a mass content ratio of the monomer composition used in the copolymerization of the raw material monomer having a structure (hydroxyl group) involved in lactone cyclization, $M_R$ is a formula weight of a generated lactone ring structure unit, $M_m$ is a molecular weight of a raw material monomer having a structure (hydroxyl group) involved in the lactone cyclization, and A is a lactone cyclization ratio.)

Further, the lactone cyclization ratio may be calculated from a weight loss heat weight reduction ratio by de-alcohol reaction up to 300° C. before decompression of the polymer starts from 150° C. before theoretical weight reduction and weight reduction start, for example, when the cyclization reaction is accompanied by the de-alcohol reaction.

A preparing method of the (meth)acrylic-based resin having a lactone ring structure is not particularly limited. Preferably, the (meth)acrylic-based resin having a lactone ring structure is obtained by obtaining a polymer (p) having a hydroxyl group and an ester group in a molecular chain by polymerizing the following predetermined monomers, and then performing a lactone cyclization condensation process of introducing the lactone ring structure to the polymer by heat-treating the obtained polymer (p) in a temperature range of 75° C. to 120° C.

In the polymerization process, the polymer having a hydroxyl group and an ester group in a molecular chain is obtained by polymerizing monomer components including monomers representing the following Formula (101).

Formula (101)

(In the formula, each of $R^1$ and $R^2$ independently represents a hydrogen atom or an organic residue having from 1 to 20 carbon atoms.)

The monomers represented by Formula (101) may include, for example, 2-(hydroxymethyl) methyl acrylate, 2-(hydroxymethyl) ethyl acrylate, 2-(hydroxymethyl) isopropyl acrylate, 2-(hydroxymethyl) n-butyl acrylate, 2-(hydroxymethyl) t-butyl acrylate, and the like. Even among them, 2-(hydroxymethyl) methyl acrylate and 2-(hydroxymethyl) ethyl acrylate are preferred, and 2-(hydroxymethyl) methyl acrylate is particularly preferred from the viewpoint of a high heat-resistance improvement effect. The monomers represented by Formula (101) may be used either alone or in combination of two or more thereof.

The content ratio of the monomer component represented by Formula (101) in the monomer component provided in the polymerization process has a lowerlimit value of a preferred range in terms of the heat resistance, solvent resistance, and the surface hardness, a upperlimit value of a preferred range in terms of molding processability of the obtained polymer, and is preferably 5 to 90% by mass, more preferably 10 to 70% by mass, even more preferably 10 to 60% by mass, and particularly preferably 10 to 50% by mass based on the viewpoints.

The monomer component provided in the polymerization process may include a monomer other than the monomer represented by Formula (1). Although not particularly limited, as the monomer, for example, (meth) acrylic acid ester, a hydroxyl group containing monomer, unsaturated carboxyl acid, and a monomer represented by the following Formula (102) may be preferably used. The monomer other than the monomer represented by Formula (101) may be used either alone or in combination of two or more thereof.

The weight average molecular weight of the lactone ring-containing polymer is preferably 10,000 to 2,000,000, more preferably 20,000 to 1,000,000, and particularly preferably from 50,000 to 500,000.

The mass reduction ratio is preferably 1% or less, more preferably 0.5% or less, and even more preferably 0.3% or less in the range of 150° C. to 300° C. in the dynamic TG measurement of the lactone ring-containing polymer. With respect to the dynamic TG measurement method, it is possible to use a method described in Japanese Patent Application Laid-open No. 2002-138106 A.

Since the lactone ring-containing polymer has high cyclization condensation reaction rate, the dealcoholization reaction rarely occurs during the manufacturing process of molded articles, and thus it is possible to avoid a drawback that bubbles or silver streaks enters into the molded streaks after the molding resulting from the alcohol. Further, since the lactone ring structure is sufficiently introduced into the polymer due to high cyclization condensation reaction rate, the obtained lactone ring-containing polymer has high heat resistance.

When the lactone ring-containing polymer is prepared by a chloroform solution at a concentration of 15% by mass, the coloring degree (YI) is preferably 6 or less, more preferably 3 or less, even more preferably 2 or less, and particularly preferably 1 or less. When the coloring degree (YI) is 6 or less, the lactone ring-containing polymer may be preferably used because it is difficult for problems in that transparency is damaged by colorization and the like to occur.

As for the lactone ring-containing polymer, 5% mass decreasing temperature in the thermogravimetric analysis (TG) is preferably 330° C. or more, more preferably 350° C. or more, and even more preferably 360° C. or more. The 5% mass decreasing temperature in the thermogravimetric analysis (TG) is an index of thermal stability, and when this value is 330° C. or more, sufficient thermal stability tends to be easily exhibited. As for the thermogravimetric analysis, the dynamic TG measurement device may be used.

The glass transition temperature Tg of the lactone ring-containing polymer is preferably from 115° C. to 180° C., more preferably from 120° C. to 170° C., and even more preferably from 125° C. to 160° C.

(2) Maleic Anhydride Based Polymer Having Succinic Anhydride Ring in Main Chain

It is preferable because a succinic anhydride structure in the main chain is formed in a molecular chain (in a main framework of the polymer) of the polymer, and as a result, high heat resistance is imparted to the acrylic resin which is the copolymer and the glass transition temperature Tg also increases.

The glass transition temperature Tg of the maleic anhydride based polymer having a succinic anhydride ring in the main chain is preferably 110° C. to 160° C., more preferably 115° C. to 160° C., and even more preferably 120° C. to 160° C.

Furthermore, it is preferred that the weight average molecular weight of the molecular weight of the maleic anhydride based polymer having a succinic anhydride ring is preferably in the range of 50,000 to 500,000.

The maleic anhydride unit used in copolymerization with the acrylic resin is not particularly limited, but a maleic modified resin described in each of Japanese Patent Application Laid-open Nos. 2008-216586, 2009-052021, 2009-196151, and 2012-504783 may be used as the maleic anhydride unit.

Further, the present invention is not limited thereto.

As commercial products of the maleic modified resin, Delpet 980N prepared by Asahi Kasei Chemicals Ltd. which is a maleic modified MAS resin (methyl methacrylate—acrylonitrile styrene copolymer) may be preferably used.

Further, as a method for preparing the acrylic resin including the maleic anhydride unit, a known method may be used without a particular limit The maleic acid-modified resin is not limited as long as a maleic anhydride unit is included in the obtained polymer, and for example, may include (anhydrous) maleic acid-modified MS resin, (anhydrous) maleic acid-modified MAS resin (methyl methacrylate-acrylonitrile-styrene copolymer), (anhydrous) maleic acid-modified MBS resin, (anhydrous) maleic acid-modified AS resin, (anhydrous) maleic acid-modified AA resin, (anhydrous) maleic acid-modified ABS resin, ethylene-maleic anhydride copolymer, ethylene-(meth)acrylic acid-maleic anhydride copolymer, maleic anhydride grafted polypropylene, and the like.

The maleic anhydride unit is a structure represented by the following Formula (200).

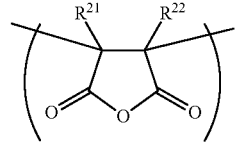

Formula (200)

In Formula (200), each of $R^{21}$ and $R^{22}$ independently represents a hydrogen atom or an organic residue having 1 to 20 carbon atoms.

The organic residue is not particularly limited so long as carbon atoms are 1 to 20, but for example, may include a straight-chain or branched alkyl group, a straight-chain or branched alkylene group, an aryl group, —OAc group, —CN group, and the like. Further, the organic residue may include an oxygen atom. Ac represents an acetyl group.

The carbon number of $R^{21}$ and $R^{22}$ is preferably 1 to 10, and more preferably 1 to 5.

When each of $R^{21}$ and $R^{22}$ represents a hydrogen atom, it is preferred that other copolymer components are included from the viewpoint of adjustment of an intrinsic birefringence. As the ternary or more heat-resistance acrylic resin, for example, preferably, methyl methacrylate-maleic anhydride-styrene copolymer may be used.

(3) Polymer Having Anhydrous Glutaric Acid Ring Structure in Main Chain

The polymer having an anhydrous glutaric acid ring structure in a main chain thereof indicates a polymer having a glutaric acid anhydride unit.

It is preferred that the polymer having a glutaric acid anhydride unit has a glutaric acid anhydride unit (hereinafter, referred to as a glutaric acid anhydride unit) represented by the following Formula (300).

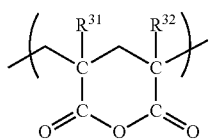

Formula (300)

In Formula (300), each of $R^{31}$ and $R^{32}$ independently represents a hydrogen atom or an organic residue having from 1 to 20 carbon atoms. Further, the organic residue may include an oxygen atom. $R^{31}$ and $R^{32}$ represent, particularly preferably, hydrogen atoms or alkyl groups having from 1 to 5 carbon atoms, which are the same as or different from each other.

It is preferred that the polymer having a glutaric acid anhydride unit is a (meth)acrylic-based polymer including a glutaric acid anhydride unit. It is preferred that the (meth)acrylic-based polymer has a glass transition temperature (Tg) of 120° C. or more from the viewpoint of heat resistance.

The glass transition temperature (Tg) of the polymer having an anhydrous glutaric acid ring structure in a main chain thereof is preferably 110° C. to 160° C., more preferably 115° C. to 160° C., and much more preferably 120° C. to 160° C.

Further, it is preferred that a weight average molecular weight of the polymer having an anhydrous glutaric acid ring structure in a main chain thereof has preferably a range of 50,000 to 500,000.

The content of the glutaric acid anhydride unit for the (meth)acrylic-based polymer is preferably 5 to 50% by mass, and more preferably 10 to 45% by mass. By setting the content to 5% by mass or more, and more preferably 10% by mass or more, it is possible to obtain an effect of enhancing heat resistance, and furthermore, it is also possible to obtain an effect of enhancing weather resistance.

(4) (Meth)Acrylic-Based Polymer Having Glutarimide Ring Structure in Main Chain

The (meth)acrylic-based polymer (hereinafter, referred to as a glutarimide-based resin) having a glutarimide ring structure in a main chain thereof may exhibit preferred characteristic balance in terms of optical characteristics, heat resistance, or the like. It is preferred that the (meth)acrylic-based polymer having a glutarimide ring structure in the main chain thereof includes:

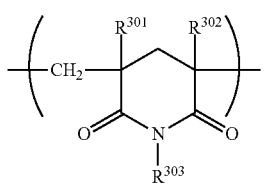

Formula (400)

A glutarimide resin having at least 20% by mass or more of a glutarimide unit (however, in Formula, $R^{301}$, $R^{302}$, and $R^{303}$ are independently hydrogen or an unsubstituted or substituted alkyl group, cycloalkyl group, and aryl group having 1 to 12 carbon atoms) represented by the above Formula (400).

In the preferred glutarimide unit constituting the glutarimide-based resin used in the present invention, $R^{301}$ and $R^{302}$ are hydrogen or a methyl group, and $R^{303}$ is a methyl group or a cyclohexyl group. The glutarimide unit may be a single kind and include a plurality of different kinds of $R^{301}$, $R^{302}$ and $R^{303}$.

The preferred second constituent unit constituting the glutarimide-based resin used in the present invention is a unit composed of acrylic acid ester or methacrylic acid ester. The preferred constituent unit of acrylic acid ester or methacrylic acid ester may include methyl acrylate, ethyl acrylate, methyl methacrylate, methyl methacrylate, and the like. Furthermore, a separate preferred imidizable unit may include N-alkyl methacrylamide such as N-methyl methacrylamide or N-ethyl methacrylamide. These second constituent units may include a single kind or a plurality of kinds.

The content of the glutarimide unit represented by Formula (400) in the glutarimide-based resin is 20% by mass or more based on the total repeating unit of the glutarimide-based resin. The preferred content of the glutarimide unit is 20 to 95% by mass, more preferably 50 to 90% by mass, and even more preferably 60 to 80% by mass. When the range of the glutarimide unit is less than the range, there is a case where heat resistance of the film obtained is insufficient or transparency thereof is impaired. Further, in the case of exceeding the range, heat resistance is unnecessarily increased, so that it becomes difficult to being filmed, there is a case where mechanical strength of the film is extremely vulnerable, and transparency is impaired.

In the glutarimide-based resin, the third constitutional unit may be copolymerized, if necessary. An example of the preferred third constitutional unit may use a constitutional unit obtained by copolymerizing a styrene-based monomer such as styrene, substituted stylene, and α-methylstyrene, an acrylic monomer such as butyl acrylate, a nitrile-based monomer such as acrylonitrile or methacrylonitrile, and a maleimide-based monomer such as maleimide, N-methylmaleimide, N-phenylmaleimide, and N-cyclohexylmaleimide. Among these glutarimide-based resins, the glutarimide unit may be directly copolymerized with an imidizable unit, and the glutarimide unit may be graft-copolymerized with a resin having an imidizable unit. When a third component is added thereto, the content ratio of the third component in the glutarimide-based resin is preferably from 5 mol % to 30 mol % based on the total repeating unit in the glutarimide-based resin.

The glutarimide-based resin is described in U.S. Pat. Nos. 3,284,425 and 4,246,374, Japanese Patent Application Laid-Open No. H2-153904, and the like, and may be obtained by using, as a resin having an imidizable unit, a resin obtained by using methacrylic acid methylester and the like as a main raw material, and imidizing the resin having an imidizable unit by using ammonia or substituted amine. When the glutarimide-based resin is obtained, there is a case where a unit composed of acrylic acid or methacrylic acid or anhydride thereof as a reaction byproduct is introduced into the glutarimide-based resin. The presence of the constitutional unit, particularly, acid anhydride inhibits total light transmittance or haze of the obtained film of the present invention, and thus is not preferred. The content of acrylic acid or methacrylic acid is 0.5 milliequivalent or less per 1 g of the resin, preferably 0.3 milliequivalent or less per 1 g of the resin, and more preferably 0.1 milliequivalent or less per 1 g of the resin. In addition, as seen in Japanese Patent Application Laid-Open No. H02-153904, it is also possible to obtain a glutarimide-based resin through imidization using a resin mainly composed of N-methylacrylamide and methacrylic acid methylester.

The glass transition temperature Tg of the glutar-based resin is preferably 110° C. to 160° C., more preferably from 115° C. to 160° C., and even more preferably 120° C. to 160° C.

Furthermore, it is preferred that the weight average molecular weight of the glutar-based resin is in the range of 50,000 to 500,000.

Method for Manufacturing Substrate Film Having (Meth) Acrylic-Based Polymer as Main Component Hereinafter, a manufacturing method for film-forming a thermoplastic resin having a (meth)acrylic-based polymer as the main component will be described in detail.

In order to forming the substrate film by using the (meth)acrylic-based polymer as the main component, for example, a film raw material is pre-blended by a known blender in the related art, such as an omni mixer, or the like and thereafter, the obtained material is extruded and kneaded. In this case, the mixer used in the extrusion and kneading is not particularly limited, but for example, known mixers in the related art, such as extruders such as a monoaxial extruder, and a biaxial extruder or a pressing kneader may be used.

A method for forming the film may include, for example, known film forming methods in the related art, such as a solution cast method, a met extrusion method, a calendar method, and a compression forming method. The melt extrusion method among the film forming methods is particularly appropriate.

The melt extrusion method may include, for example, a T die method, an inflation method, and the like and a forming temperature in this case may be appropriately controlled according to the glass transition temperature of the film raw material and is not particularly limited, but for example, preferably 150° C. to 350° C. and more preferably 200° C. to 300° C.

When the film is formed by the T die method, a T die is mounted on a front end of the known monoaxial extruder or biaxial extruder and a roll-shaped film may be obtained by winding the film extruded in a film shape. In this case, by appropriately adjusting the temperature of the wound roll, stretch is conducted in an extrusion direction to achieve monoaxial stretching. Further, the film is stretched in a direction vertical to the extrusion direction to perform simultaneous biaxial stretching, sequential biaxial stretching, and the like.

The substrate film having a (meth)acrylic-based polymer as the main component may be either of an unstretched film or a stretching film. The stretching film may be either of a monoaxial stretched film or a biaxial stretched film. The biaxial stretched film may be either of a simultaneous biaxial stretched film or a sequential biaxial stretched film. In the case of biaxial stretching, a mechanical strength is improved, and as a result, film performance is improved. When the (meth)acrylic-based polymer is the (meth)acrylic-based polymer having a ring-shaped structure in the main chain, the thermoplastic resin is additionally mixed, and as a result, an increase of retardation may be suppressed in spite of stretching, thereby obtaining a film maintaining optical isotropy.

The thickness of the substrate film obtained by using the (meth)acrylic-based polymer in the main chain is preferably 5 to 80 μm and more preferably 10 to 40 μm. When the thickness is less 5 μm, the strength of the film deteriorates and when a durability test is performed by bonding the film to other parts, crimping may increase. On the contrary, when the thickness is more than 80 μm, the transparency of the film deteriorates and moisture permeability decreases and when an aqueous adhesive is used to bond the film to other parts, a drying speed of water which is the solvent thereof may decrease.

(Cyclic Polyolefin-Based Resin)

As the thermoplastic resin which may be used in the present invention, the cyclic polyorefin-based resin may be used. Herein, the cyclic polyolefin-based resin represents a polymer resin having a cyclic olefin structure.

The cyclic polyolefin-based resin preferably used in the present invention will be enumerated below.

The polymer having a cyclic olefin structure preferably used in the present invention is the cyclic polyolefin-based resin which is an addition (co)polymer including at least one repeating unit expressed by the following Formula (II) and as necessary, the cyclic polyolefin-based resin which is the addition (co)polymer further including at least one repeating unit expressed by Formula (I). Further, a ring-opening (co)polymer including at least one cyclic repeating unit expressed by Formula (III) may also be appropriately used.

Formula (I)

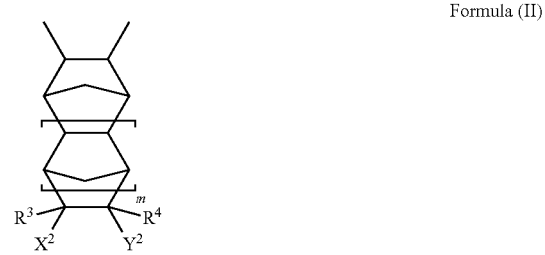

Formula (II)

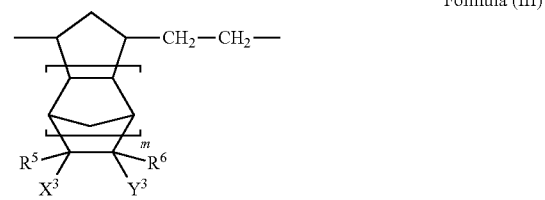

Formula (III)

In Formulas (I) to (III), m represents an integer of 0 to 4. $R^1$ to $R^6$ represent a hydrogen atom or a hydrocarbon group having 1 to 10 carbon atoms, and $X^1$ to $X^3$, $Y^1$ to $Y^3$ represent a hydrogen atom, a hydrocarbon group having 1 to 10 carbon atoms, a halogen atom, a hydrocarbon group having 1 to 10 carbon atoms substituted with halogen atoms, —$(CH_2)_n COOR^{11}$, —$(CH_2)_n OCOR^{12}$, —$(CH_2)_n NCO$, —$(CH_2)_n NO_2$, —$(CH_2)_n CN$, —$(CH_2)_n CONR^{13}R^{14}$, —$(CH_2)_n NR^{13}R^{14}$, —$(CH_2)_n OZ$, —$(CH_2)_n W$, or (—$CO)_2 O$, (—$CO)_2 NR^{15}$ consisting of $X^1$ and $Y^1$, $X^2$ and $Y^2$, or $X^3$ and $Y^3$. Further, $R^{11}$, $R^{12}$, $R^{13}$, $R^{14}$, and $R^{15}$ represent a hydrogen atom, a hydrocarbon group having 1 to 20 carbon atoms, Z represents a hydrocarbon group or a halogen-substituted hydrocarbon group, W represents $SiR^{16}{}_p D_{3-p}$ ($R^{16}$ is a hydrocarbon group of 1 to 10 carbon atoms, D represents a halogen atom, —OCOR$^{16}$ or —OR$^{16}$, p represents an integer of 0 to 3), and n represents an integer of 0 to 10.

Further, it is preferred that the norbornene-based polymer hydride may be used, and as disclosed in Japanese Patent Application Laid-Open Nos. H1-240517, H7-196736, S60-26024, S62-19801, 2003-1159767, 2004-309979 or the like, the norbornene-based polymer hydride is prepared by subjecting a polycyclic unsaturated compound to addition polymerization or metathesis ring-opening polymerization and then to hydrogenation. In the norbornene-based polymer used in the present invention, R$^5$ and R$^6$ are preferably hydrogen atoms or —CH$_3$, and X$^3$ and Y$^3$ are preferably Cl or —COOCH$_3$, and other groups are appropriately selected. As the norbomene-based resin, products under the trade name of Arton G or Arton F from JSR Co., Ltd., are commercially available, and products under the trade name of Zeonor ZF14, Zeonor ZF16, Zeonex 250 or Zeonex 280 from Nippon Zeon Co., Ltd., are commercially available, and thus these products may be used.

Further, norbornene-based addition (co)polymers may be preferably used, and are disclosed in Japanese patent Application Laid-Open No. H10-7732, Japanese Patent Publication No. 2002-504184, U.S. Patent Application Publication No. 2004229157A1, International Publication WO2004/070463A1, and the like. The norbornene-based addition (co)polymer is obtained by addition-polymerizing norbornene-based polycyclic unsaturated compounds with each other. Further, if necessary, the norbornene-based polycyclic unsaturated compound may be addition-polymerized with ethylene, propylene, butene; a conjugated diene such as butadiene, and isoprene; a non-conjugated diene such as ethylidene norbornene; or a linear diene compound such as acrylonitrile, acrylic acid, methacrylic acid, anhydrous maleic acid, acrylic acid ester, methacrylic acid ester, maleimide, vinyl acetate, and vinyl chloride. The norbornene-based addition (co)polymers include those commercially available under the trade name of APEL from Mitsubishi Chemical Inc., including grades having different glass transition temperatures (Tg), for example, APL8008T (Tg 70° C.), APL6013T (Tg 125° C.), APL6015T (Tg 145° C.) or the like. Pellets such as TOPAS8007, TOPAS6013, and TOPAS6015 are commercially available from Poly Plastic Co., Ltd. In addition, Appear3000 is commercially available from Ferrania Company.

In the present invention, the glass transition temperature (Tg) of the cyclic polyolefin-based resin is preferably 110° C. to 200° C., more preferably 115° C. to 190° C., and much more preferably 120° C. to 180° C.

Further, a weight-average molecular weight of the cyclic polyolefin-based resin is preferably in a range of 50,000 to 500,000.

Method for Manufacturing Substrate Film Having Cyclic Olefin-Based Resin as Main Component The substrate film having a cyclic olefin-based resin as the main component may be manufactured in the same manufacturing method as the substrate film the (meth)acrylic-based polymer as the main component and for example, the manufacturing method may include, for example, the known film forming method in the related art, such as the solution cast method, the melt extrusion method, the calendar method, the compression forming method, and the like and the melt extrusion method is particularly appropriate among the film forming methods.

The melt extrusion method may, for example, the T die method, the inflation method, and the like and the forming temperature in this case may be appropriately controlled according to the glass transition temperature of the film raw material.

When the film is formed by the T die method, the T die is mounted on the front end of the known monoaxial extruder or biaxial extruder and the roll-shaped film may be obtained by winding the film extruded in the film shape. In this case, by appropriately adjusting the temperature the wound roll, the stretch is conducted in the extrusion direction to achieve the monoaxial stretching. Further, the film is stretched in the direction vertical to the extrusion direction to perform the simultaneous biaxial stretching, the sequential biaxial stretching, and the like.

(Cellulose-Based Resin)

In the present invention, a cellulose-based resin may be used as a thermoplastic resin. The cellulose-based resin represents a resin including cellulose ester and an acrylic resin.

Examples of the cellulose as a cellulose ester raw material used in the present invention include cotton linter, wood pulp (broad leaf pulp and needle leaf pulp) and the like, and a cellulose ester obtained from any raw material cellulose may be used. In some cases, such cellulose esters may be also used in mixtures thereof. These raw material celluloses may use celluloses disclosed in, for example, Lecture on Plastic Materials (17) Cellulose Resins (Maruzawa and Uda, THE NIKKAN KOGYO SHIMBUN, LTD., published in 1970) or Japan Institute of Invention and Innovation, Journal of Technical Disclosure 2001-1745 (pp. 7 to 8), and the cellulose ester used in the present invention is not particularly limited thereto.

The cellulose ester used in the present invention is preferably ester of cellulose and fatty acid (including aromatic fatty acid), and preferably acylated cellulose acylate in which hydroxyl groups at the 2-, 3-, and 6-positions of a β-1,4-bonded glucose unit constituting cellulose are substituted with acyl groups of the fatty acid.

Examples thereof include alkylcarbonyl ester, alkenylcarbonyl ester, or aromatic carbonyl ester, aromatic alkyl carbonyl ester, and the like, and further, are preferably cellulose ester substituted with an acyl group of two or more kinds of fatty acid. The cellulose ester may further have a substituent.

As an acyl group substituted with the hydroxyl group, an acetyl group having 2 carbon atoms and an acyl group having 3 to 22 carbon atoms may be used.

In the case of mixing and using an acrylic resin, from the viewpoint of compatibility, an acetyl group having 2 carbon atoms and an acyl group having 3 to 7 carbon atoms are preferred.

The total degree of substitution (3 when an acyl group is substituted with three hydroxyl groups at the 2-, 3-, and 6-positions, as a ratio in which an acyl group is substituted with a hydroxyl group in a β-glucose unit of cellulose) of an acyl group in cellulose ester used in the present invention is not particularly limited, but it is preferred that the total degree of substitution of an acyl group is high. To this end, the total degree of substitution of an acyl group is preferably 2.00 to 3.00, more preferably 2.50 to 3.00, and much more preferably 2.50 to 2.90.

In the cellulose ester used in the present invention, as a method for measuring the degree of substitution of an acyl group substituted with the hydroxyl groups of cellulose, a method in accordance with ASTM D-817-91 or an NMR method may be exemplified.

The acyl group substituted with the hydroxyl group of the β-glucose unit of cellulose may be an aliphatic group or an aromatic group, and is not particularly limited. Further, the acyl group substituted with the hydroxyl group may be a single acyl group or two or more kinds of acyl groups. The acyl group-substituted cellulose ester may include cellulose acetate, cellulose propionate, cellulose butylate, cellulose acetate propionate, cellulose acetate butylate, cellulose acetate propionate butylate, cellulose benzoate, and the like.

The polymerization degree of cellulose ester used as the cellulose-based resin is preferably 180 to 700 as the viscosity average polymerization degree, and in cellulose acetate propionate substituted with an acetyl group and a propionyl group, the polymerization degree is more preferably 180 to 550, much more preferably 180 to 400, and particularly preferably 180 to 350. When the polymerization degree is in the range, it is preferred that viscosity of a doping solution including cellulose ester may be suitable for preparing the film by flexibility, and a film having high compatibility with the acrylic resin and high transparency and mechanical strength may be obtained. A viscosity average polymerization degree may be measured by the extreme viscosity method of Uda et al. {Kazuo Uda and Hideo Saito, "Bulletin of The Society of Fiber Science and Technology, Japan", vol. 18, No. 1, pp. 105 to 120 (1962)}. The method is described in detail in Japanese Patent Application Laid-Open No. H9-95538.

A mixed resin of the cellulose acylate-based resin and the acrylic resin is preferred. A mass ratio of the cellulose acylate-based resin and the acrylic resin is preferably 70:30 to 15:85, more preferably 70:30 to 30:70, and much more particularly 49:51 to 30:70.

The acrylic resin used with the cellulose-based resin may be a single polymer of a kind of derivative of (meth)acrylate, a copolymer of two or more kinds of derivatives of (meth) acrylate, or a copolymer of the polymer and the copolymer and other copolymerizable monomers.

A copolymerizable component which is copolymerizable with the derivative of (meth)acrylate may include α,β-unsaturated acids such as acrylic acid and methacrylic acid; unsaturated acids such as unsaturated group-containing divalent carboxylic acids such as maleic acid, fumaric acid, and itaconic acid; aromatic vinyl compounds such as styrene, o-methyl styrene, m-methyl styrene, p-methyl styrene, 2,4-dimethyl styrene, p-ethyl styrene, p-tert-butyl styrene, α-methyl styrene, and α-methyl-p-methyl styrene; α,β-unsaturated nitriles such as acrylonitrile and methacrylonitrile; lactone ring units, glutaric anhydride units, glutarimide units, unsaturated carboxylic acid anhydrides such as maleic anhydride; and maleimides such as maleimide and N-substituted maleimide.

The derivative of the acrylic resin used in combination with the cellulose-based resin and (meth)acrylic acid and other copolymerizable monomers may be described and used in Japanese patent Application Laid-Open No. 2009-122664, Japanese patent Application Laid-Open No. 2009-139661, Japanese patent Application Laid-Open No. 2009-139754, Japanese patent Application Laid-Open No. 2009-294262, International Publication WO2009/054376, and the like. Further, these are not limited to the present invention and may be used either alone or in combination of two or more kinds.

The weight-average molecular weight Mw of the acrylic resin used in combination with the cellulose-based resin is preferably 80,000 or more. When the weight-average molecular weight Mw of the acrylic resin is 80,000 or more, a mechanical strength is high and handling performance while preparing the film is excellent. From the viewpoint of this, the weight-average molecular weight Mw of the acrylic resin is preferably 100,000 or more. Further, from the viewpoint of improvement of compatibility with cellulose ester, the weight-average molecular weight Mw of the acrylic resin is preferably 3,000,000 or less and more preferably 2,000,000 or less.

The acrylic resin used in combination with the cellulose-based resin may use commercially available products. For example, as the acrylic resin, Delpet 60N and 80N (prepared by Asahi Kasei Chemical's Co., Ltd.), Dyer day BR80, BR85, BR88, and BR102 (prepared by Mitsubishi Rayon Co., Ltd.), KT75 (prepared by Denki Chemical Industry Co., Ltd.), and the like may be included or used in combination of two or more kinds.

(Polycarbonate-Based Resin)

As the thermoplastic resin usable in the present invention, polycarbonate-based resins may be used.

(Polystylene-Based Resin)

As the thermoplastic resin usable in the present invention, polystylene-based resins may be used.

(Polyester-Based Resin)

As the thermoplastic resin usable in the present invention, polyester-based resins may be used.

The polyester-based resins are preferably polyethylene terephthalate and polyethylene naphthalate.

(Other Thermoplastic Resins)

The thermoplastic resins usable in the present invention may include other thermoplastic resins other than thermoplastic resins which may be preferably used as a main component of the substrate film.

Other thermoplastic resins are particularly irrelevant to kinds without departing from the spirit of the present invention, but the thermoplastic resin which is thermodynamically compatible with the thermoplastic resin which may be preferably used as the main component of the substrate film is preferred in improving the mechanical strength or a desired physical property.

In particular, in the case of using the (meth)acrylic-based resin as the main component of the substrate film, 0 to 30% by mass of other thermoplastic resins are preferably included in the substrate film, 3 to 20% by mass is more preferably included, and 5 to 15% by mass is particularly preferably included.

The other thermoplastic resins may include, for example, the olefin-based thermoplastic resins such as polyethylene, polypropylene, an ethylene-propylene copolymer, and poly (4-methyl-1-pentene); styrene-based thermoplastic resins such as polystyrene, a styrene-methacrylate methyl copolymer, and an acrylonitrile butadiene-styrene block copolymer, a rubber copolymer such as polybutadiene-based rubber, an ABS resin or ASA resin combined with acrylic rubber, and the like.

Further, in the case of using the (meth)acrylic-based resin as the main component of the substrate film, the other thermoplastic resins preferably use a copolymer including a cyanovinyl-based monomer unit and an aromatic vinyl-based monomer unit.

When the copolymer including the cyanovinyl-based monomer unit and the aromatic vinyl-based monomer unit, in detail, an acrylonitrile styrene-based copolymer is used, a film is obtained, in which the glass transition temperature 120° C. or more, a phase difference per 100 μm in a plane direction is 20 nm or less, and total ray transmittance is 85% or more.

<Moisture Permeability Reduced Compound>

The thermoplastic resin film also preferably includes a moisture permeability reduced compound. A polymer which has low moisture permeability solely is low in solubility as the solvent and has a lot of problems in manufacturing process. Both low moisture permeability and solubility (manufacturing adequacy) become valid by reducing the moisture permeability depending on combination of the polymer and the moisture permeability reduced compound, and as a result, the thermoplastic resin film preferably includes the moisture permeability reduced compound.

In the thermoplastic resin film, the moisture permeability reduced compound is preferably included with an amount of 10 to 100% by mass with respect to the mass of the thermoplastic resin. The amount is more preferably 15 to 90% by mass and even more preferably 20 to 80% by mass.

(Ultraviolet Absorber)

UV absorbers preferably used in the substrate film will be described. The optical film of the present invention including the substrate film is used in a polarizing plate or a member for liquid crystal display, and an UV absorber is preferably used from the viewpoint of preventing deterioration of the polarizing plate or the liquid crystal and the like. UV absorbers, which are excellent in ability to absorb UV light at a wavelength of 370 nm or less and low in absorption of visible light at a wavelength of 400 nm or more in terms of excellent liquid crystal display performance, are preferably used. The UV absorbers may be used either alone or in combination of two or more thereof. Examples thereof may include UV absorbers described in Japanese Patent Application Laid-Open No. 2001-72782 or Japanese Unexamined Patent Application Publication No. 2002-543265. Specific examples of the UV absorbers may include, for example, oxybenzophenone-based compounds, benzotriazole-based compounds, salicylic acid ester-based compounds, benzophenone-based compounds, cyano acrylate-based compounds, nickel complex salt-based compounds, and the like.

Among them, the UV absorbers may include 2-(2'-hydroxy-5'-methylphenyl)benzotriazole, 2-(2'-hydroxy-3'5'-di-tert-butylphenyl)benzotriazole, 2-(2'-hydroxy-3'-tert-butyl-5'-methylphenyl)benzotriazole, 2-(2'-hydroxy-3'5'-di-tert-butylphenyl)-5-chlorobenzotriazole, 2-(2'-hydroxy-3'-(3", 4",5",6"-tetrahydrophthalimidemethyl)-5'-methylphenyl) benzotriazole, 2,2-methylenebis(4-(1,1,3,3-tetramethylbutyl)-6-(2H-benzotriazol-2-yl)phenol), 2-(2'-hydroxy-3'-tert-butyl-5'-methylphenyl)-5-chlorobenzotriazole, 2,4-dihydroxybenzophenone, 2,2'-dihydroxy-4-methoxybenzophenone, 2-hydroxy-4-methoxy-5-sulfobenzophenone, bis(2-methoxy-4-hydroxy-5-benzoylphenylmethane), (2,4-bis-(n-octylthio)-6-(4-hydroxy-3,5-di-tert-butylanilino)-1,3,5-triazine, 2-(2'-hydroxy-3'5'-di-tert-butylphenyl)-5-chlorobenzotriazole, (2(2'-hydroxy-3'5'-di-tert-amylphenyl)-5-chlorobenzotriazole, 2,6-di-tert-butyl-p-cresol, pentaerythrityl-tetrakis[3-(3, 5-di-tert-butyl-4-hydroxyphenyl)propionate], triethyleneglycol-bis[3-(3-tert-butyl-5-methyl-4-hydroxyphenyl) propionate], 1,6-hexanediol-bis[3-(3,5-di-tert-butyl-4-hydroxyphenyl)propionate], 2,4-bis-(n-octylthio)-6-(4-hydroxy-3,5-di-tert-butylanilino)-1,3,5-triazine, 2,2-thio-diethylenebis[3-(3,5-di-tert-butyl-4-hydroxyphenyl) propionate], octadecyl-3-(3,5-di-tert-butyl-4-hydroxyphenyl)propionate, N,N'-hexamethylenebis(3,5-di-tert-butyl-4-hydroxy-hydrocinnamide), 1,3,5-trimethyl-2,4, 6-tris(3,5-di-tert-butyl-4-hydroxybenzyl)benzene, tris-(3,5-di-tert-butyl-4-hydroxybenzyl)-isocianurate, and the like. Particularly preferred examples are (2,4-bis-(n-octylthio)-6-(4-hydroxi-3,5-di-tert-butylanilino)-1,3,5-triazine, 2-(2'-hydroxy-3',5'-di-tert-butylphenyl)-5-chlorobenzotriazole, 2-(2'-hydroxy-3',5'-di-tert-amylphenyl)-5-chlorobenzotriazole, 2,6-di-tert-butyl-p-cresol, pentaerythrityl-tetrakis[3-(3,5-di-tert-butyl-4-hydroxyphenyl)propionate], and triethyleneglycol-bis[3-(3-tert-butyl-5-methyl-4-hydroxyphenyl)propionate].

Further, triazine-based ultraviolet absorbers represented by Formulas described in Re-published patent WO2005/109052 are used, and detailed examples of compounds Nos. 1 to 36 may be preferably used.

<Other Additives>

(Matting Agent Fine Particles)

The substrate film may include fine particles as a matting agent. Examples of the fine particles used as the matting agent may include silicon dioxide, titanium dioxide, aluminum oxide, zirconium oxide, calcium carbonate, talc, clay, calcined kaolin, calcined calcium silicate, hydrated calcium silicate, aluminum silicate, magnesium silicate and calcium phosphate. As the fine particles, those including silicon are preferable in that the haze is low, and silicon dioxide is preferable.

As the fine particles of silicon dioxide, those having a primary average particle diameter of 20 nm or less and an apparent specific gravity of 70 g/L or more are preferable. Those having a small average particle size of primary particles as 5 to 16 nm are more preferred because the haze of the film may be reduced. The apparent specific gravity is preferably 90 to 200 g/L, and more preferably 100 to 200 g/L. A larger apparent specific gravity is preferred because a dispersion with a high concentration may be prepared and thus the haze and the coagulated material are improved.

These fine particles usually form secondary particles with an average particle size of 0.1 to 3.0 μm, and exist as agglomerates of the primary particles in a film and form unevenness of 0.1 to 3.0 μm on the surface of the film. The secondary particle diameter is preferably 0.2 to 1.5 μm, more preferably 0.4 to 1.2 μm, and most preferably 0.6 to 1.1 μm. Particles in a film are observed under a scanning electron microscope and the circumscribed circle diameters of the particles are taken as a particle size of the primary or secondary particles. Further, a total of 200 particles at different sites are observed to take the average value thereof as an average particle size.

As fine particles of silicon dioxide, commercially available products, for example, AEROSIL R972, R972V, R974, R812, 200, 200V, 300, R202, OX50 and TT600 (all manufactured by Nippon Aerosil Co., Ltd.) may be used. As fine particles of zirconium oxide, for example, products under the brand names of AEROSIL R976 and R811 (both manufactured by Nippon Aerosil Co., Ltd.) are commercially available and thus may be used.

Among them, AEROSIL 200V and AEROSIL R972V, which are fine particles of silicon dioxide, are particularly preferred as having an average primary particle size of 20 nm or less and an apparent specific gravity of 70 g/L or more and being highly effective in reducing frictional coefficient of the optical film while maintaining the turbidity of the film low.

(Other Additives)

In addition to the mat particles, various additives (for example, retardation controlling agents, retardation plasticizers, UV absorbers, deterioration inhibitors, release agents, IR absorbers, wavelength dispersion controlling agent, and the like) may be added to the substrate film, and these additives may be either solid or oily. That is, the melting point or boiling point thereof is not particularly limited. Examples thereof include a mixture of a UV absorbing material at 20° C. and another UV absorbing material at 20° C. or more, and the same applies to a mixture of plasticizers. Examples of such mixtures are described in Japanese Patent Application Laid-Open No. 2001-151901, and the like. Further, IR absorbing dyes are described, for example, in Japanese Patent Application Laid-Open No. 2001-194522. In addition, the additives may be added at any time in the manufacturing process of the dope. However, adding the additives may be performed by further including a process for adding additives to the final preparation process in the dope preparation process to prepare the dope solution. Furthermore, the amount of each material added is not particularly limited as long as functions are manifested. Further, when the optical film has a multilayer structure, the kinds or amounts of additives added may differ among each layer. For example, there are descriptions in Japanese Patent Application Laid-Open No. 2001-151902, and the like, but these techniques are known in the related art. For details, materials described in detail in Japan Institute of Invention and Innovation Journal of Technical Disclosure (Technical Publication No. 2001-1745, Mar. 15, 2001, published by Japan Institute of Invention and Innovation), pp. 16 to 22, are preferably used.

A plasticizer which is high in compatibility with the thermoplastic resins (in particular, cellulous ester and acrylic resin) is not easily bled out, has low haze, and is effective in manufacturing a film implementing a liquid crystal display which is excellent in light leakage, front contrast, and luminance.

The substrate film may include the plasticizers. The plasticizers may include phosphoric acid ester-based plasticizers, phthalic acid ester-based plasticizers, polyhydric alcohol ester-based plasticizers, polyhydric carboxylic acid ester-based plasticizers, glycolate-based plasticizers, citric acid ester-based plasticizers, aliphatic acid ester-based plasticizers, carboxylic acid ester-based plasticizers, polyester oligomer-based plasticizers, sugar ester-based plasticizers, ethylenically unsaturated monomer copolymer-based plasticizer, and the like.

The plasticizers are preferably phosphoric acid ester-based plasticizers, glycolate-based plasticizers, polyhydric alcohol ester-based plasticizers, polyester oligomer-based plasticizers, sugar ester-based plasticizers, and ethylenically unsaturated monomer copolymer-based plasticizers, more preferably polyester oligomer-based plasticizers, sugar ester-based plasticizers, and ethylenically unsaturated monomer copolymer-based plasticizers, even more preferably ethylenically unsaturated monomer copolymer-based plasticizer and sugar-ester based plasticizers, and particularly preferably ethylenically unsaturated monomer copolymer-based plasticizer.

<Characteristics of Thermoplastic Resin Film>

(Retardation of Thermoplastic Resin Film)

When the thermoplastic resin film is used as the substrate film of the polarizing plate protective films F1 and F4, Re and Rth (defined as Equations (I') and (II') given below) measured in a wavelength of 590 nm preferably meet Equations (III') and (IV').

The thermoplastic resin film that satisfies Equations (III') and (IV') preferably include (meth)acrylic-based resin (may be the (meth)acrylic-based polymer having a ring structure in the main chain), the cyclic polyolefin-based resin, cellulous acylate, and a mixed resin of cellulous acylate and the (meth)acrylic resin.

$$Re=(nx-ny)\times d \qquad \text{Equation (I')}$$

$$Rth=\{(nx+ny)/2-nz\}\times d \qquad \text{Equation (II')}$$

$$|Re|\leq 50 \text{ nm} \qquad \text{Equation (III')}$$

$$|Rth|\leq 300 \text{ nm} \qquad \text{Equation (IV')}$$

Further, as a separate preferable aspect different therefrom, in the polarizing plate protective films F1 and F4 of the present invention, Re (defined by Equation (I) given above) preferably meets Equation (V'), further, a Nz value (defined by Equation (VI') given below) more preferably meets Equation (VII'), each of Re and Nz most preferably meet both Equations (V) and (VII') and in particular, the polarizing plate protective films F1 and F4 are preferably used in a liquid crystal display using a white light source having a consecutive light emitting spectrum as the backlight.

Herein, the white light source having the consecutive light emitting spectrum is a white light emitting diode, and the like and a white light emitting diode constituted by a blue LED device and a yellow fluorescent substance is particularly preferably used.

The thermoplastic resin film that satisfies Equation (V') or (VII') preferably includes a polyester-based resin or a polycarbonate-based resin and more preferably a polyester-based resin and as the polyester-based resin, polyethylene terephthalate and polyethylene naphthalate are preferred.

$$3000 \text{ nm}\leq Re\leq 30000 \text{ nm} \qquad \text{Equation (V')}$$

$$Nz=(nx-nz)/(nx-ny)=Rth/Re+0.5 \qquad \text{Equation (VI')}$$

Herein, Nz=Rth/Re+0.5 and may be acquired by calculation in Re and Rth.

In (VII') Nz≤2.0 (Equations (I') to (VII'), nx is a refractive index in an in-plane slow axis direction of a film, ny is a refractive index in an in-plane fast axis direction of a film, nz is a refractive index in a thickness direction of a film, and d is a thickness of a film (nm).

When the thermoplastic resin film is used as the polarizing plate protective films F2 and F3 in IPS mode liquid crystal display, Re and Rth (defined similarly to Equations (I') and (II')) measured in the wavelength of 590 nm in the thermoplastic resin film in terms of the display characteristic is preferably 0 nm≤|Re|≤10 nm and |Rth|≤25 nm, more preferably 0 nm≤|Re|≤5 nm and |Rth|≤10 nm, and even more preferably 0 nm≤|Re|≤2 nm and |Rth|≤3 nm When the thermoplastic resin film is used as the polarizing plate protective films F2 and F3 in VA mode liquid crystal display, Re and Rth (defined similarly to Equations (I') and (II')) measured in the wavelength of 590 nm in the thermoplastic resin film in terms of the display characteristic is preferably |Re|≤100 nm and |Rth|≤00 nm, more preferably 25 nm≤|Re|≤100 nm and 50 nm≤|Rth|≤250 nm, and RE is even more preferably 30 nm≤|Re|≤80 nm and particularly preferably 35 nm≤|Re|≤70 nm. Rth is even more particularly 70 nm≤|Rth|≤240 nm and particularly preferably 90 nm≤|Rth|≤230 nm.

In the present specification, Re, Rth, and Nz in a wavelength of λ nm may be measured by the following method.

Re is measured by irradiating with an incident light of of λ nm in wavelength in the normal direction of the film using KOBRA 21ADH (manufactured by Ohji Measurement Co., Ltd.).

Rth is calculated by KOBRA 21 ADH based on a retardation value measured in 3 directions from a sum of the Re, a retardation value measured by irradiating with an incident light of λ nm in wavelength in the direction inclined at an angle of +40° with respect to a direction of the normal line of the film with taking the slow axis in plane (determined by KOBRA 21ADH) as an inclination axis (rotation axis), and a retardation value measured by irradiating with an incident light of λ nm in wavelength in the direction inclined at an angle of −40° with respect to a direction of the normal line of the film with taking the slow axis in plane as an inclination axis (rotation axis). Here, as the assumed value of average refractive index, those described in a thermoplastic handbook (John Wiley & Sons, Inc.) and catalogues of various optical films can be used. The average refractive index of which value is not already known may be measured by an Abbe refractometer. Values of average refractive index of main optical films are illustrated below. The average refractive indexes of the main optical films may be expressed as Cellulose acylate (1.48), cycloolefin thermoplastic (1.52), polycarbonate (1.59), polymethyl methacrylate (1.49) and polystyrene (1.59).

In the measurement of the substrate film, when the thermoplastic resin used in the substrate film is cellulous ester, the retardation is measured by setting the average refractive index of the substrate film to 1.48.

Re and Rth may be adjusted by the kind (when the thermoplastic resin used in the substrate film is cellulosic ester, of the thermoplastic resin used in the thermoplastic resin film, a substitution degree of cellulosic ester), the quantity of the thermoplastic resin and additives, addition of the retardation expressing agent, the film thickness of the film, the stretching direction and stretching rate of the film, and the like.

(Thickness of Thermoplastic Resin Film)

The thickness of the polarizing plate protective film is preferably 5 μm to 100 μm, more preferably 10 μm to 80 μm, particularly preferably 15 μm to 70 μm, and more particularly preferably 20 μm to 60 μm.

In particular, when the thermoplastic resin film is used as the substrate film of the polarizing plate protective films F1 and F4, the film thickness is controlled to the range to reduce the unevenness of the panel accompanied by the environment in which the liquid crystal display is positioned, that is, the temperature/humidity change after laminating the functional layer, in particular, the low moisture-permeable layer.

<The Moisture Permeability of the Thermoplastic Resin Film>

The moisture permeability of the thermoplastic resin film is measured under conditions of 40° C. and 90% RH based on JIS Z-0208.

When the moisture permeability of the substrate film is preferably 800 g/m$^2$/day or less, more preferably 400 g/m$^2$/day or less, even more preferably 200 g/m$^2$/day or less, and more particularly preferably 150 g/m$^2$/day or less.

In particular, when the thermoplastic resin film is used as the substrate film of the polarizing plate protective films F1 and F4, the moisture permeability of the substrate film is controlled to the range to suppress the bending of the liquid crystal cell and the display unevenness in black display after the room-temperature environment time, the high-humidity environment time, and the high-temperature high-humidity environment time elapse of the liquid crystal display with the polarizing plate protective film (the polarizing plate protective film of the present invention) acquired by laminating the functional layer, in particular, the low moisture-permeable layer.

(Oxygen Permeation Coefficient of Thermoplastic Resin Film)

In particular, when the thermoplastic resin film is used as the substrate film of the polarizing plate protective films F1 and F4, diffusion of water in the film is preferably suppressed, that is, a free volume of the film is preferably decreased, in order to reduce the moisture permeability. In general, the free volume of the film is correlated with the oxygen permeation coefficient of the film.

The oxygen permeation coefficient of the substrate film is preferably 100 cc·mm/(m$^2$·day·at m) or less and more preferably 30 cc·mm/(m$^2$·day·at m) or less.

(Haze of Thermoplastic Resin Film)

A total haze value of the thermoplastic resin film is preferably 2.00% or less. When the total haze value is 2.00% or less, transparency of the film is high and it is effective to improve the contrast ratio or luminance of the liquid crystal display. The total haze value is more preferably 1.00% or less, even more preferably 0.50% or less, particularly preferably 0.30% or less, and most preferably 0.20% or less. As the total haze value is smaller, the optical performance is excellent, but when selection of raw materials, preparation management, or a handling ability is also considered, the total haze value is preferably 0.01% or more.

An internal haze value of the thermoplastic resin film is preferably 1.00% or less. The contrast ratio of the liquid crystal display is improved by setting the internal haze value to 1.00% or less to realize an excellent display characteristic. The internal haze value is more preferably 0.50% or less, even more preferably 0.20% or less, particularly preferably 0.10% or less, and most preferably 0.05% or less. The internal haze value is preferably 0.01% or more in terms of the selection of the raw materials or the preparation management.

As the thermoplastic resin film, a thermoplastic resin film having the total haze value of 0.30% or less and the internal haze value of 0.10% or less is preferable.

The total haze value and the internal haze value may be adjusted by the kind and an addition amount of the film material or selection of the additives (in particular, the diameter of the particle, the refractive index, and the addition amount of the matting agent or furthermore, the film preparation condition (a temperature or stretching magnification in stretching).

Measurement of haze may be conducted with a film sample of the present invention having 40 mm×80 mm at 25° C. and 60% RH in accordance with JISK-6714 by using a haze meter (HGM-2DP, manufactured by Suga Test Instruments Co., Ltd.), and the like.

(Elastic Modulus of Thermoplastic Resin Film)

The elastic modulus of the thermoplastic resin film is preferably 1800 to 10000 MPa in the width direction (TD direction).

In the present invention, the TD-direction elastic modulus is set to the range, and as a result, the elastic modulus is preferable in terms of preparation adequacy such as the display unevenness in the black display after the high-humidity environment time and the high-temperature high-humidity environment time elapse, a delivery ability in preparing the film, an end slit property or a fracture difficulty, and the like. When a TD elastic modulus is excessively small, the display unevenness in the black display easily occurs after the high-humidity environment time and the high-temperature high-humidity environment time elapse and further, there is a problem in the preparation adequacy and when the TD elastic modulus is excessively large, film processability deteriorates, and as a result, the TD-direction elastic modulus is more preferably 1800 to 9000 MPa and even more preferably 1800 to 8000 MPa.

Further, a delivery-direction (MD-direction) elastic modulus of the thermoplastic resin film is preferably 1800 to 6000 MPa and more preferably 1800 to 5000 MPa.

Herein, the conveying direction (longitudinal direction) of the film is a conveying direction (MD direction) in preparing the film and a width direction is a direction (TD direction) vertical to the conveying direction in preparing the film.

The elastic modulus of the film may be adjusted by the kind and the addition amount of the thermoplastic resin of the substrate film material or selection of the additives (in particular, the diameter of the particle, the refractive index, and the addition amount of the matting agent) or furthermore, the film preparation condition (stretching magnification, and the like).

The elastic modulus may be acquired by using universal tensile tester "STMT50BP" manufactured by Toyo Baldwin Co., Ltd.) and measuring stress when the sample is stretched by 0.5% tensile strength under the conditions of 23° C., 70% RH, and stretching rate of 10%/min (Glass Transition Temperature Tg of Thermoplastic Resin Film)

The glass transition temperature Tg of the thermoplastic resin film is preferably 100° C. to 200° C. or less and further, preferably 100° C. to 150° C. or less in terms of the preparation adequacy and heat resistance.

The glass transition temperature may be determined by using a differential scanning calorimeter (DSC) as an average value of a temperature at which a base line derived from glass transition of the film when measured at a temperature increasing rate of 10° C./min starts to be modified and a temperature at which the glass goes back to the base line.

Furthermore, measurement of the glass transition temperature may be conducted by using the following dynamic viscoelasticity measuring instrument. A 5 mm×30 mm film sample (not stretched) of the cellulose acylate film of the present invention is humidity controlled at 25° C. and 60% RH for at least 2 hours. Measurement is made with the dynamic viscoelasticity measuring device (Vibron: DVA-225 (manufactured by ITK Co., Ltd) at a distance between grips of 20 mm, at a heating rate of 2° C./min, at a measuring temperature range from 30° C. to 250° C., and at a frequency of 1 Hz. When the storage modulus is plotted on a logarithmic ordinate and temperature (° C.) is plotted on a linear abscissa, a straight line 1 and a straight line 2 exhibiting a steep decrease in storage modulus observed at the phase transition from the solid region to the glass transition region are drawn in the solid region and the glass transition region, respectively. The intersection of the lines 1 and 2 indicates the temperature at which the storage modulus starts to decrease abruptly and the film starts to soften during heating, and at which the film begins to be transferred to the glass transition region. Therefore, this temperature is referred to as the glass transition temperature Tg (dynamic viscoelasticity).

(Knoop Hardness of Thermoplastic Resin Film)

In the polarizing plate protective film used on an outermost surface, surface hardness is preferably high and in this case, as the characteristic of the substrate film, Knoop hardness is preferably high. The Knoop hardness is preferably 100 N/mm$^2$ or more and more preferably 150 N/mm$^2$ or more.

(Equilibrium Water Content of Thermoplastic Resin Film)

The water content (equilibrium water content) of the thermoplastic resin film is preferably 0 to 4% by mass at 25° C. and 80% RH irrespective of film thickness in order to prevent harming the adhesion with an aqueous thermoplastic resin, such as polyvinyl alcohol, and the like when the film is used as a protective film for a polarizing plate. The water content is more preferably 0 to 2.5% by mass and even more preferably 0 to 1.5%. When the equilibrium water content is 4% by mass or less, it is preferable by considering dependency by the change in humidity of the retardation is not excessively large and the display unevenness in the black display is suppressed after the room-temperature environment time, the high-humidity environment time, and the high-temperature high-humidity environment time of the liquid crystal display elapse.

A film sample with a size of 7 mm×35 mm is measured with a moisture measuring apparatus and a sample drying apparatus "CA-03" and "VA-05" (all manufactured by Mitsubishi Chemical Corporation) by the Karl Fischer method as a method for measuring the water content. The measured amount of water (g) is divided by a sample mass (g) to calculate the water content.

When the liquid crystal display of the present invention uses the polarizing plate having the polarizing plate protective film F1 and the polarizing plate protective film F2 as the front side (visual side) polarizing plate or uses the polarizing plate having the polarizing plate protective film F3 and the polarizing plate protective film F4 as the rear side (non-visual side) polarizing plate, a preferable aspect of the equilibrium water contents of the polarizing plate protective films F2 and F3 is disclosed.

Herein, the polarizing plate protective films F2 and F3 are the thermoplastic resin films including a (meta) acrylic-based resin, a polycarbonate-based resin, a polystyrene-series resin, a cyclic polyolefin-series resin, a glutaric anhydride-series resin, a glutaric imide-series resin, a cellulous-series resin, and a mixed resin of the multiple kinds of resins.

As one of the preferred embodiments, thermoplastic resin films are used as the polarizing plate protective films F2 and F3, which are low in water content of the thermoplastic resin film and the equilibrium water content itself which the polarizing plate may include under the high temperature high-humidity environment is decreased to decrease the water contents just after the high temperature high-humidity environment time elapses and just after the time elapses under low humidity after the high temperature high-humidity environment time elapses. The water content of the polarizing plate protective films F2 and F3 in this case at 25° C. and 80% RH is preferably 0% by mass or more and less than 2% by mass.

As the other one of the preferred embodiments, the polarizing plate protective films F2 and F3 are used, which are slight high in water content of the thermoplastic resin film and the equilibrium water content itself which the polarizing plate may include under the high temperature high-humidity environment is actually decreased by an effect of low moisture permeability of the polarizing plate protective films F1 and F4 and the water contents are decreased just after the high temperature high-humidity environment time elapses and just after the time elapses under low humidity after the high temperature high-humidity environment time elapses.

In the case of the embodiment, even when thermoplastic resin films which are slight large are used the polarizing plate protective films F2 and F3, the warp unevenness is reduced, and as a result, it is particularly useful in the case in which the film is limited, such as the case in which the optical compensatory films are used as the polarizing plate protective films F2 and F3, and the like.

The water contents of the polarizing plate protective films F2 and F3 at 25° C. and 80% RH are preferably 2 to 4% by mass, more preferably 2.5 to 4.0% by mass, and even more preferably 2.5 to 3.5%.

(Dimensional Change of Thermoplastic Resin Film)

The cellulose acylate film of the present invention preferably has dimensional stability such that the dimensional changes occurring when the film is left to stand at 60° C. and 90% RH for 24 hours (high humidity condition) and when the film is left to stand at 80° C. and dry environment (5% RH or less) for 24 hours (high temperature condition) are both 0.5% or less. The dimensional change is more preferably 0.3% or less, and even more preferably 0.15% or less.

(Photoelastic Coefficient of Thermoplastic Resin Film)

When the polarizing plate protective film of the present invention is used, there may be a change in birefringence (Re, Rth) due to the stress accompanying the contraction of the polarizer. Such a change in birefringence due to the stress may be determined in terms of photoelastic coefficient, but the range thereof is preferably 15 Br or less, more preferably −3 to 12 Br, and even more preferably 0 to 11 Br.

<Preparation Method of Substrate Film>

A preparation method of the substrate film using a cellulosic resin or a mixed resin of the cellulosic resin and the acrylic resin is available in both a process of forming a polymer film (the substrate film) by casting a polymer solution including the thermoplastic resin and the solvent on the support and a process of forming the substrate film by melting and film-forming the thermoplastic resin, but the preparation method is preferably achieved by casting and film-forming the polymer solution including the thermoplastic resin and the solvent on the support.

Further, the preparation method of the substrate film may include a process of stretching the substrate film (alternatively, polymer film) in at least one of the conveying direction and the width direction of the film.

[Solvent]

A solvent useful in forming doping, which dissolves the thermoplastic resin may be used without a limit.

In the present invention, both a chlorine solvent with a chlorine organic solvent as a primary solvent and a non-chlorine solvent without the chlorine organic solvent may be used as an organic solvent. Two or more kinds of organic solvent may be mixed and used.

(Preparation of Dope)

Dope may be prepared by a general method of performing a treatment at a temperature of 0° C. or higher (normal temperature or high temperature). The preparation of the dope which may be used in the present invention may be performed by using a method and an apparatus for preparing the dope in a typical solvent casting method. Further, in the case of the general method, as the organic solvent, halogenated hydrocarbon (in particular, dichloromethane) and alcohol (in particular, methanol, ethanol, 1-propanol, 2-propanol, 1-butanol, 2-butanol, t-butanol, 1-pentanol, 2-methyl-2-butanol, and cyclohexanol) are preferably used.

It is preferred that a sum amount of the thermoplastic resin of 10 to 40% by mass is preferably adjusted to be included in the polymer solution.

The amount of the thermoplastic resin is even more preferably 10 to 30% by mass. Any additives to be described below may be added in the organic solvent (main solvent).

The solution may be prepared by stirring the thermoplastic resin and the organic solvent at a normal temperature (from 0 to 40° C.). The high-concentration solution may be stirred under pressurization and heating conditions. Specifically, the thermoplastic resin and the organic solvent are put in a pressure vessel and hermetically sealed, and the mixture is stirred under pressure while heating at a temperature of the boiling point of the solvent at a normal temperature or higher and falling within the range where the solvent does not boil.

The heating temperature is usually 40° C. or higher, preferably 60 to 200° C., and even more preferably 80 to 110° C.

(Surface Processing)

The substrate film is subjected to surface processing in some cases to achieve improvement of adhesion of the substrate film and the low moisture-permeable layer or other layers (for example, the polarizer, a primer layer, and a back layer) and for example, a glow discharge treatment, an ultraviolet irradiation treatment, a corona treatment, a flame treatment, and an acid or alkali treatment may be used. The glow discharge treatment described herein may be a low temperature plasma caused under a low pressure gas of $10^{-3}$ to 20 Torr, and further, preferably a plasma treatment under an atmospheric pressure. The plasma excitable gas denotes a gas that may be excited into plasma under the conditions as described above, and includes argon, helium, neon, krypton, xenon, nitrogen, carbon dioxide, freons such as tetrafluoromethane, mixtures thereof, and the like. These gases are described in detail in Japan Institute of Invention and Innovation Journal of Technical Disclosure (Technical Publication No. 2001-1745, Mar. 15, 2001, published by Japan Institute of Invention and Innovation) pp. 30 to 32 and may be preferably used in the present invention.

[Functional Layer]

The polarizing plate protective film of the present invention may have a functional layer.

Further, the polarizing plate protective film of the present invention, in particular, the polarizing plate protective films F1 and F4 may have the low moisture-permeable layer, but further, another functional layer may be laminated on at least one surface. Kinds of other functional layers are not particularly limited, but the kinds of the functional layers may include a hardcoat layer, an antireflective layer (layers in which the refractive index is adjusted, such as a low refractive index layer, an intermediate refractive index layer, and a high refractive index layer), an antiglare layer, an antistatic layer, an ultraviolet absorption layer and the like.

The other functional layer may be constituted by a single layer or multi layers. A lamination method of the other functional layer is not particularly limited, but the other functional layer is preferably applied and installed on the optical film of the present invention after laminating the low moisture-permeable layer.

The other functional layer may be laminated on the low moisture-permeable layer or laminated on a surface on which the low moisture-permeable layer is not laminated. When multiple other functional layers are laminated, one functional layer may be laminated on the low moisture-permeable layer and another functional layer may be laminated on the surface on which the low moisture-permeable layer is not laminated.

The thickness of the other functional layer is more preferably 0.01 to 100 μm, and particularly preferably 0.02 to 50 μm.

The antireflective film on which the anti-reflective layer is laminated as the other functional layer, a hardcoat layer, a forward scattering layer and an antiglare layer are described in [0257] to [0276] of Japanese Patent Application Laid-Open No. 2007-86748, and a functionalized polarizing plate may be prepared based on the description thereof.

Further, a luminance improvement film and another functional optical film may be laminated on the polarizing plate of the present invention.

(Anti-Reflective Layer and Anti-Reflective Film)

As the anti-reflective film, both a film having a reflectance of about 1.5%, in which only the single layer made of a low refractive index material such as a fluorine-based polymer is imparted and a film having a reflectance of 1% or less using multilayered interference of a thin film may be used. In the present invention, a construction, in which a low refractive index layer and at least one layer (that is, the high refractive index layer and the medium refractive index layer) having a refractive index higher than the low refractive index layer are laminated on a transparent support, is preferably used. In addition, anti-reflective films described in Nitto technical report, Vol. 38, No. 1, May 2000, pages 26 to 28, Japanese Patent Application Laid-Open No. 2002-301783 or the like may also be preferably used.

The refractive index of each layer satisfies the following relationship. Refractive index of high refractive index layer>Refractive index of medium refractive index layer>Refractive index of transparent support>Refractive index of low refractive index layer As the transparent support used in the anti-reflective film, the thermoplastic resin film used in the polarizing plate protective film may be preferably used and the transparent support is preferably a transparent film substrate.

The refractive index of the low refractive index layer is preferably from 1.20 to 1.55, and more preferably from 1.30 to 1.50. The low refractive index layer is preferably used as an outermost layer having scratch resistance and antifouling properties. In order to improve the scratch resistance, it is preferably performed to impart slipperiness to the surface by using a material such as a silicon-containing compound including a silicon group, a fluorine-containing compound including fluorine or the like.

As the fluorine-containing compound, compounds described in, for example, [0018] to [0026] of Japanese Patent Application Laid-Open No. H9-222503, [0019] to [0030] of Japanese Patent Application Laid-Open No. 11-38202, [0027] to [0028] of Japanese Patent Application Laid-Open No. 2001-40284, Japanese Patent Application Laid-Open No. 2000-284102 and the like may be preferably used.

The silicon-containing compound is preferably a compound having a polysiloxane structure, but reactive silicones (for example, SILAPLANE (manufactured by Chisso Corporation), polysiloxanes including a silanol group at the both terminals thereof (Japanese Patent Application Laid-Open No. H11-258403) or the like may also be used. An organometallic compound such as silane coupling agents and a silane coupling agent including a specific fluorine-containing hydrocarbon group may be cured by a condensation reaction in the presence of a catalyst (compounds described in Japanese Patent Application Laid-Open Nos. S58-142958, S58-147483 and S58-147484, Japanese Patent Application Laid-Open Nos. H9-157582 and H11-106704, and Japanese Patent Application Laid-Open Nos. 2000-117902, 2001-48590, and 2002-53804, and the like).

In the low refractive index layer, a filler (for example, a low refractive index inorganic compound having an average primary particle size of from 1 nm to 150 nm, such as silicon dioxide (silica), fluorine-containing particles (magnesium fluoride, calcium fluoride, and barium fluoride), organic particles described in [0020] to [0038] of Japanese Patent Application Laid-Open No. 11-3820, and the like), a silane coupling agent, a lubricant, a surfactant, and the like may be preferably included as additives other than the above-described compounds.

Although the low refractive index layer may be formed by a vapor phase method (a vacuum vapor deposition method, a sputtering method, an ion plating method, a plasma CVD method and the like), the low refractive index layer is preferably formed by a coating method in that the layer may be prepared at a low cost. Next, as the coating method, a dip coating method, an air knife coating method, a curtain coating method, a roller coating method, a wire bar coating method, a gravure coating method, a micro gravure method or the like may be preferably used.

The film thickness of the low refractive index layer is preferably 30 to 200 nm, more preferably 50 to 150 nm, and even more preferably 60 to 120 nm.

It is preferable that the medium refractive index layer and the high refractive index layer are each constructed by dispersing a high refractive index inorganic compound superfine particle having an average particle size of not more than 100 nm in a matrix material. As the high refractive index inorganic compound particle, an inorganic compound having a refractive index of 1.65 or more, for example, oxides of Ti, Zn, Sb, Sn, Zr, Ce, Ta, La, In and the like, composition oxides including such a metal atom and the like may be preferably used.

Such a superfine particle may be used in as an aspect of treating the particle surface with a surface treating agent (silane coupling agents and the like: Japanese Patent Application Laid-Open Nos. H11-295503 and H11-153703 and Japanese Patent Application Laid-Open 2000-9908 anionic compounds or organometallic coupling agents: Japanese Patent Application Laid-Open No. 2001-310432, and the like), an aspect of adopting a core-shell structure using the high refractive index particle as a core (Japanese Patent Application Laid-Open No. 2000-166104 and the like), an aspect of using a specific dispersant in combination (for example, Japanese Patent Application Laid-Open No. H11-153703, U.S. Pat. No. 6,210,858B1, Japanese Patent Application Laid-Open No. 2002-2776069 and the like), and the like.

As the matrix material, thermoplastic resins, curable resin films and the like known in the related art may be used, and polyfunctional materials described in Japanese Patent Application Nos. 2000-47004, 2001-315242, 2001-31871, 2001-296401 and the like, or curable films obtained from a metal alkoxide composition described in Japanese Patent Application Laid-Open No. 2001-293818 and the like may also be used.

The refractive index of the high refractive index layer is preferably from 1.70 to 2.20. The thickness of the high refractive index layer is preferably from 5 nm to 10 μm and more preferably from 10 nm to 1 μm.

The refractive index of the medium refractive index layer is adjusted such that the refractive index is a value between the refractive index of the low refractive index layer and the refractive index of the high refractive index layer. The refractive index of the medium refractive index layer is preferably 1.50 to 1.70.

The haze of the anti-reflective film is preferably 5% or less and more preferably 3% or less. Furthermore, the strength of the film is preferably H or more, more preferably 2H or more and most preferably 3H or more by a pencil hardness test in accordance with JIS K5400.

[Hardcoat Layer]

In order to impart a dynamic strength such as scratch resistance and the like, it is preferably performed that the polarizing plate of the present invention is combined with a functional optical film having a hardcoat layer formed on the surface of the transparent support. When the hardcoat layer is applied to the above-described anti-reflective film and used, it is especially preferable to install the hardcoat layer between the transparent support and the high refractive index layer.

It is preferred that the hardcoat layer is formed by a crosslinking reaction of a curable compound by light and/or heat or a polymerization reaction. As a curable functional group, a photopolymerizable functional group is preferred, and as a hydrolyzable functional group-containing organometallic compound, an organic alkoxysilyl compound is preferred. As a specific constituent composition of the hardcoat layer, those described in, for example, Japanese Patent Application Laid-Open Nos. 2002-144913 and 2000-9908, WO 00/46617 pamphlet and the like may be preferably used.

The film thickness of the hardcoat layer is preferably 0.2 µm to 100 µm.

The strength of the hardcoat layer is preferably H or more, more preferably 2H or more and most preferably 3H or more by a pencil hardness test in accordance with JIS K5400. Furthermore, it is preferred that the amount of abrasion of a test specimen before and after the test in the Taber test in accordance with JIS K5400 is as small as possible.

As a material for forming the hardcoat layer, a compound including an ethylenically unsaturated group and a compound including a ring-opening polymerizable group may be used, and these compounds may be used either alone or in combination thereof. Preferred examples of the compound including an ethylenically unsaturated group may include polyacrylates of a polyol such as ethylene glycol diacrylate, trimethylolpropane triacrylate, ditrimethylolpropane tetraacrylate, pentaerythritol triacrylate, pentaerythritol tetraacrylate, dipentaerythritol pentaacrylate, and dipentaerythritol hexaacrylate; epoxy acrylates such as diacrylate of bisphenol A diglycidyl ether, and diacrylate of hexanediol diglycidyl ether; urethane acrylates obtained by a reaction of a polyisocyanate and a hydroxyl group-containing acrylate such as hydroxyethyl acrylate; and the like as a preferred compound. Further, EB-600, EB-40, EB-140, EB-1150, EB-1290K, IRR214, EB-2220, TMPTA, TMPTMA (all of which are manufactured by DAICEL-UCB Company, Ltd.), UV-6300, UV-1700B (all of which are manufactured by Nippon Synthetic Chemical Industry Co., Ltd.), and the like may be included as commercially available compounds.

In addition, preferred examples of the compound including a ring-opening polymerizable group may include glycidyl ethers such as ethylene glycol diglycidyl ether, bisphenol A diglycidyl ether, trimethylolethane triglycidyl ether, trimethylolpropane triglycidyl ether, glycerol triglycidyl ether, triglycidyl trishydroxyethyl isocyanurate, sorbitol tetraglycidyl ether, pentaerythritol tetraglycidyl ether, polyglycidyl ether of a cresol novolak resin, and polyglycidyl ether of a phenol novolak resin; alicyclic epoxys such as CELLOXIDE 2021P, CELLOXIDE 2081, EPOLEAD GT-301, EPOLEAD GT-401 and EHPE3150CE (all of which are manufactured by Daicel Chemical Industries, Ltd.), polycyclohexyl epoxy methyl ether of a phenol novolak resin); oxetanes such as OXT-121, OXT-221, OX-SQ and PNOX-1009 (all of which are manufactured by TOAGOSEI Co., Ltd.); and the like. Besides, polymers of glycidyl (meth)acrylate or copolymers of glycidyl (meth) acrylate and a copolymerizable monomer may be used in the hardcoat layer.

In order to lower hardening and contraction of the hardcoat layer, improve adhesion to a base material, and lower curl of a hardcoat-treated article in the present invention, it is preferably performed that a crosslinked particle, such as an oxide fine particle of silicon, titanium, zirconium, and aluminum, and an organic fine particle, such as a crosslinked particle of polyethylene, polystyrene, a poly(meth)acrylic acid ester, and polydimethylsiloxane, a crosslinked rubber fine particle of SBR, NBR and the like is added to the hardcoat layer. The average particle size of these crosslinked fine particles is preferably 1 nm to 20,000 nm. Furthermore, as the shape of the crosslinked fine particle, spherical, rod-like, acicular, tabular shapes and the like may be used with any particular limitation. The amount of particles added is preferably 60% by volume or less, and more preferably 40% by volume or less of the hardcoat layer after hardening.

When the above-described inorganic particle is added, the inorganic fine particle is generally poor in compatibility with a binder polymer, it is preferably performed that the inorganic fine particle is subjected to a surface treatment with a surface treating agent including a metal, such as silicon, aluminum, and titanium and having a functional group, such as an alkoxide group, a carboxylic acid group, a sulfonic acid group, and a phosphonic acid group.

It is preferred that the hardcoat layer is cured by using heat or active energy rays, among them, it is more preferred to use active energy rays, such as radiations, gamma rays, alpha rays, electron beams, and ultraviolet rays, and in consideration of stability and productivity, it is particularly preferred to use electron beams or ultraviolet rays. In the case of performing curing by heat, the heating temperature is preferably 140° C. or less and more preferably 100° C. or less, in consideration of the heat resistance of the plastic itself.

(Antiglare Layer)

The antiglare layer is used to scatter reflected light and prevent image reflection.

The haze of an optical film having an antiglare function is preferably 3% to 30%, more preferably 5% to 20% and most preferably 7% to 20%.

The antiglare layer is formed for the purpose of imparting, to the film, a hardcoating property for improving the antiglare property caused by surface scattering, and preferably the hardness and the scratch resistance of the film.

The antiglare layer which may be used in the present invention includes the binder and the light-transmitting particles for imparting the antiglare property and the unevenness of the surface is preferably formed by protrusions of the light-transmitting particles or protrusion formed by an aggregate of a plurality of particles.

A detailed example of the light-transmitting particles may preferably include, for example, inorganic compound particles such as silica particles, and TiO2 particles, and resin particles such as acrylic particles, crosslink acrylic particles, polystyrene particles, crosslink styrene particles, melamine resin particles, benzoguanamine resin particles. Among the particles, the crosslink styrene particles, the crosslink acrylic particles, and the silica particles are preferred.

The shape of the light-transmitting particles may adopt a spherical shape or an irregular shape.

It is preferable to adjust the refractive index of the binder according to the refractive index of each light-transmitting particle selected among the above-described particles in terms of controlling the internal haze and the surface haze. The binder according to the light-transmitting particle may include, for example, a binder (the refractive index after curing is 1.55 to 1.70) including 3 functions or more (meth)acrylate monomer as the main component and any one or a combination of both of the light-transmitting particle and the benzoguanamine particle composed of the crosslinking poly(meth)acrylate polymer having a styrene content of 50 to 100% by mass and among them, a combination of the binder and the light-transmitting particle (the refractive index is 1.54 to 1.59) composed of the crosslinking poly(styrene-acrylate) copolymer having a styrene content of 50 to 100 is appropriately exemplified.

Further, in the above-mentioned terms, an absolute value of a difference between the refractive index of the binder and the refractive index of the light-transmitting particle is preferably 0.04 or less. The absolute value of the difference between the refractive index of the binder and the refractive index of the light-transmitting particle is preferably 0.001 to 0.030, more preferably 0.001 to 0.020, and even more preferably from 0.001 to 0.015.

Herein, the refractive index of the binder may be quantitatively evaluated by direct measurement using the Abbe refractometer or by measuring a spectral reflection spectrum or spectral ellipsometry. The refractive index of the light-transmitting particle is measured by measuring turbidity by equally dispersing the light-transmitting particles in the solvent of which the refractive index is changed by changing a mixture ratio of two solvents having different refractive indexes and measuring the refractive index of the solvent when the turbidity is minimum by using the Abbe refractometer.

The content of the light-transmitting particle is preferably 3 to 30% by mass and more preferably 5 to 20% by mass based on the total solid content of the formed antiglare layer in terms of the antiglare property.

The method for forming the antiglare layer may include, for example, a method for forming the antiglare layer by laminating a mat type diluting film having a minute unevenness on the surface thereof, which is disclosed in claim 22 of Japanese Patent Application Laid-open No. H6-16851, a method for forming the antiglare layer by curing contraction of an ionizing radiation curing resin by a difference in ionizing radiation irradiation amount, which is disclosed in Japanese Patent Application Laid-open No. 2000-206317, a method for forming the unevenness on the coating layer by gelling and solidifying light-transmitting fine particles and a light-transmitting resin by reducing a weight ratio of a good solvent to the light-transmitting resin through drying, which is disclosed in claim 6 of Japanese Patent Application Laid-open No. 2000-338310, a method for imparting a surface unevenness by a pressure from the outside, which is disclosed in claim 8 of Japanese Patent Application Laid-open No. 2000-275404, and the like and these known methods may be used.

Further, an aspect in which the light-transmitting particle is included in the support to impart the antiglare function to the support may also be preferably used. As the aspect, the film having the antiglare function disclosed in claim 1 of Japanese Patent Application Laid-open No. 2009-258720 or claim 1 of Japanese Patent Application Laid-open No. 2005-105926 is appropriately exemplified.

As a method for forming unevenness on the film surface, for example, a method for adding a particle to form unevenness on the film surface (for example, Japanese Patent Application Laid-Open 2000-271878 and the like), a method for adding a small amount (from 0.1% by mass to 50% by mass) of a relatively large particle (particle size of 0.05 μm to 2 μm) to form a film having an uneven surface (for example, Japanese Patent Application Laid-Open Nos. 2000-281410, 2000-95893, 2001-100004, 2001-281407 and the like), a method for physically transferring an unevenness shape onto the film surface (for example, an embossing method described in Japanese Patent Application Laid-Open Nos. S63-278839 and H11-183710, Japanese Patent Application Laid-Open No. 2000-275401 and the like); and the like may be preferably used.

(Luminance Improving Film)

The polarizing plate of the present invention may be used in combination with a luminance improving film. The luminance improving film has a function of separating circularly polarized light or linearly polarized light, is disposed between a polarizing plate and a backlight, and backwardly reflects or backwardly scatters the one-sided circularly polarized light or linearly polarized light into the backlight side. When the light having been again reflected from the backlight part partially changes the polarization state and comes again into the luminance improving film and the polarizing plate, the light is partially transmitted and thus, by repeating this process, the rate of use of light is improved and the front luminance is improved by about 1.4 times. As the luminance improving film, an anisotropic reflection mode and an anisotropic scattering mode are known, and all of them may be combined with the polarizing plate in the present invention.

In the anisotropic reflection mode, a luminance improving film in which a uniaxially stretched film and an unstretched film are stacked in a multiple manner to make a difference in the refractive index in the stretching direction large, thereby having anisotropy of the reflectance and transmittance is known, and there is known a multilayered film mode using the principle of a dielectric mirror (described in WO 95/17691, WO 95/17692 and WO 95/17699) or a cholesteric liquid crystal mode (described in European Patent No. 606940A2 and Japanese Patent Application Laid-Open No. 8-271731). In the present invention, DBEF-E, DBEF-D and DBEF-M (all of which are manufactured by 3M Corporation) may be preferably used as the luminance improving film of a multilayered mode using the principle of a dielectric mirror, and NIPOCS (manufactured by Nitto Denko Corporation) may be preferably used as the luminance improving film of a cholesteric liquid crystal mode. With respect to NIPOCS, Nitto technical report, Vol. 38, No. 1, May 2000, pages 19 to 21 and the like may be made herein by reference.

Further, it is also preferred to use the polarizing plate of the present invention in combination with a luminance improving film of an anisotropic scattering mode obtained by blending a positive intrinsic birefringent polymer and a negative intrinsic birefringent polymer and uniaxially stretching the blend as described in WO 97/32223, WO 97/32224, WO 97/32225 and WO 97/32226, and Japanese Patent Application Laid-Open Nos. H9-274108 and H11-174231. As the luminance improving film of an anisotropic scattering mode, DRPF-H (manufactured by 3M Corporation) is preferred.

The polarizing plate protective film of the present invention may be used as the optical compensatory film of the liquid crystal display. In this case, the liquid crystal display is more preferably configured to have a liquid crystal cell including liquid crystal held between two electrode substrates, two polarizing elements disposed on both sides thereof, and at least one optically-compensatory sheet disposed between the liquid crystal cell and the polarizing device. As the liquid crystal display, liquid crystal displays of TN, IPS, FLC, AFLC, OCB, STN, ECB, VA, and HAN modes are preferable and the liquid crystal displays of TN, OCB, IPS, and VA modes are more preferable.

EXAMPLES

Hereinafter, examples of the present invention will be described in detail. The materials, reagents, amounts and ratios of substances, operations, and the like explained in Examples below may appropriately be modified without departing from the spirit of the present invention. Therefore, the scope of the present invention is not limited to the specific examples described below.

Preparative Example 1

Preparation of Thermoplastic Resin Film
<Preparation of Thermoplastic Resin Film 1>

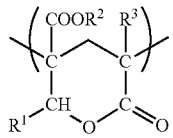

Formula (1)

A pellet of [in Formula (1), $R^1$ is a hydrogen atom and $R^2$ and $R^3$ is a mixture of 90 parts by mass in which a mass ratio of the (meth)acrylic resin copolymer monomer having a lactone ring structure, which is a methyl group=methyl methacrylate/2-(hydroxymethyl)methyl acrylate=8/2, a lactone cyclization rate is approximately 100%, the content ratio of the lactone ring structure is 19.4%, a mass average molecular weight is 133000, a melt flow rate is 6.5 g/10 minutes (240° C., 10 kgf), and Tg is 131° C. and 10 parts by mass of acrylonitrile styrene (AS) resin (Toyo Asan AS AS20 prepared by Toyo Styrene); Tg is 127° C.] was provided to the biaxial extruder and melt-extracted in a sheet type at approximately 280° C. to obtain the (meth)acrylic resin sheet. The unstretched sheet was stretched vertically and horizontally under a temperature condition of 160° C. to obtain the thermoplastic resin film 1 (thickness: 40 μm, in-plane retardation Re: 0.8 nm, thickness-direction retardation Rth: 0.8, and retardation value $(R_{in}/R_{th})$: 1.5 nm).

Preparative Example 2

<Preparation of Thermoplastic Resin Film 2>

An imidized resin was obtained by a method disclosed in [0173] to [0176] of Japanese Patent Application Laid-Open No. 2011-138119. The imidized resin was an acrylic resin which has a glutaric imide ring structure in the main chain and does not have an aromatic vinyl structure.

With respect to the imidized resin (III), an imidization rate, the glass transition temperature, and an acid value were measured. As a result, the imidization rate was 4 mol %, the glass transition temperature was 128° C., and the acid value was 0.40 mmol/g.

[Calculation of Imidization Rate]

$^1$H-NMR of the resin was measured by using $^1$H-NMR BRUKER AvanceIII (400 MHz). The imidization rate was acquired in a peak area A derived from O—$CH_3$ proton of the methyl methacrylate around 3.5 to 3.8 ppm and a peak area B derived from N—$CH_3$ proton of glutaric imide around 3.0 to 3.3 ppm by the following Equation.

$Im\% = B/(A+B) \times 100$

Further, herein, the "imidization rate (Im %)" represents a ratio occupied by the imidecarbonyl group in all carbonyl groups.

The obtained imidized resin (III) of 100 parts by mass and a triazine compound A of 0.10 parts by mass were made into the pellet by using the monoaxial extruder.

By using the pellet, the unstretched film was stretched vertically and horizontally and the film was prepared by the same method under other conditions which were the same as Preparative Example 1.

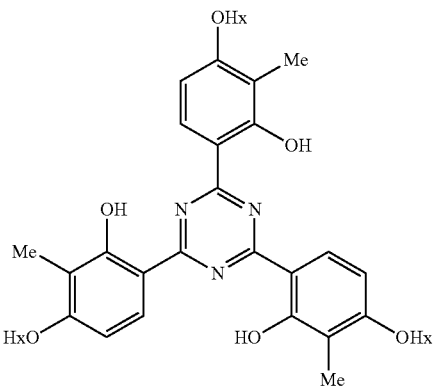

Triazine Compound A (Me represents a methyl group, Hx represents a hexyl group)

The obtained cellulose acylate film has a thickness of 40 μm and a width of 1480 mm Re and Rth was measured and Re was 1.0 nm and Rth was 3.0 nm. This film was used as the thermoplastic resin film 2.

Preparative Example 3

(Manufacture of Optically Compensatory Film 3)

The composition described below was introduced into a mixing tank and stirred while heating to dissolve each component, thereby preparing the dope.

(Cellulose Ester)

Cellulous ester having an acyl group total substitution degree of 2.75, an acetyle substitution degree of 0.19, a propionyl substitution degree of 2.56, and the weight average molecular weight of 200,000 was used.

The cellulose ester was synthesized as follows.

Sulfuric acid (7.8 parts by mass based on 100 parts by mass of cellulose) as a catalyst was added and carboxylic acid that was a raw material of an acyl substituent was added to perform an acylation reaction at 40° C. In this case, the substitution degrees of the acetyl group and the propionyl group were adjusted by adjusting the amount of carboxylic acid. In addition, the mixture was aged after the acylation. Further, low-molecular weight components of the cellulose ester were washed with acetone and removed.

(Composition of Dope 3)

| | |
|---|---|
| Cellulose ester (the acyl group total substitution degree of 2.75, the acetyle substitution degree of 0.19, the propionyl substitution degree of 2.56, and the weight average molecular weight of 200000) | 30.0 parts by mass |
| Acrylic resin (Dyer BR85 prepared by Mitsubishi Rayon Co., Ltd.) | 70.0 parts by mass |
| Tinuvin 328 prepared by Chiba Japan | 1.0 part by mass |
| Methylene chloride | 320 parts by mass |
| Ethanol | 45 parts by mass |

A band casting device was used to evenly cast the prepared dope on an endless band (a casting support) made of stainless from the cast die. At the time when a residual solvent amount in the dope becomes 40% by mass, the dope was peeled off from the cast support as a polymer film and was conveyed without actively stretching with the tenter, and was dried in a drying zone at 130° C.

The obtained thickness of the film was 40 μm. Further, the acquired values of Re and Rth of the thermoplastic resin film 3 were measured by the following method and Re was 1.0 nm and Rth was 5.0 nm. This film was used as the thermoplastic resin film 3.

Preparative Example 4

<Thermoplastic Resin Film 4>

The following composition was put into a mixing tank and stirred while heating to dissolve each component, thereby preparing a cellulose acetate solution (dope).

[Composition of Cellulose Acetate Solution (Dope)]

| | |
|---|---|
| Cellulose acetate (acetyl substitution degree 2.86 and viscosity average polymerization degree 310) | 100 parts by mass |
| Triphenyl phosphate | 8.0 parts by mass |
| Biphenyldiphenyl phosphate | 4.0 parts by mass |
| Tinuvin 328 prepared by Chiba Japan | 1.0 part by mass |
| Tinuvin 326 prepared by Chiba Japan | 0.2 parts by mass |
| Methylene chloride | 369 parts by mass |
| Methanol | 80 parts by mass |
| 1-Butanol | 4 parts by mass |

The obtained dope was heated at 30° C. and casted on a mirror-surface stainless support having a diameter of 3 m through a cast service. The surface temperature of the support was set to −5° C. The space temperature of the entire casting unit was set to 15° C. Moreover, right in front of 50 cm from the end point portion of the casting unit, the cellulose ester film cast and coming while rotated was peeled off from the drum, and then both edges thereof was clipped with a pin tenter. The residual solvent amount of the cellulose ester web right after being peeled off was 70% and the film surface temperature of the cellulose ester web was 5° C.

The cellulose ester web maintained with the pin tenter was conveyed to the drying zone. In the initial drying, dry air at 45° C. was blown. Next, drying was performed for 110° C. for 5 minutes and at 140° C. for 10 minutes.

The obtained thickness of the film was 60 μm. Further, Re and Rth was measured and Re was 1.5 nm and Rth was 40 nm. This film was used as the thermoplastic resin film 4.

Preparative Example 5

<Thermoplastic Resin Film 5>

In preparing the substrate film 4, the thermoplastic resin film 5 was prepared similarly except for casting so that the completed film thickness becomes 40 μm. Re and Rth was measured and Re was 1.4 nm and Rth was 31 nm.

<Thermoplastic Resin Film 6>

(1) Preparation of Cellulous Acylate Resin by Synthesis

Cellulose acylate having an acetyl substitution degree of 2.88 was prepared.

Sulfuric acid (7.8 parts by mass based on 100 parts by mass of cellulose) as a catalyst was added and acetic acid was added to perform an acylation reaction at 40° C.

Thereafter, by adjusting a sulfuric acid catalyst amount, a moisture amount, and a maturation time, a total substitution degree and a 6-th substitution degree were prepared. The degree of substitution of acyl of a cellulose acylate was determined by $^{13}$C-NMR analysis in accordance with the methods described in Tezuka et al., Carbohydr. Res., 273 (1995), pp. 83 to 91.

The maturation temperature was set to 40° C. Further, low-molecular weight components of the cellulose acylate were washed with acetone and removed.

(2) Preparation of Dope (Preparation of Cellulose Acylate Solution 6)

The following composition was put into the mixing tank and stirred to dissolve each component and heated at approximately 90° C. for 10 minutes again and thereafter, filtered with a filter paper having an average hole diameter of 34 μm and a sintered metal filter having an average hole diameter of 10 μm.

Cellulose Acylate Solution 6

| | |
|---|---|
| Cellulose acylate having an acetyl substitution degree of 2.88 | 100.0 parts by mass |
| Methylene chloride | 451.0 parts by mass |
| Methanol | 39.0 parts by mass |

(Preparation of Matting Agent Dispersion Solution)

The following composition including the cellulous acylate solution prepared by the method was put into the disperser and a matting agent dispersion solution was prepared.

Matting Agent Dispersion Solution

| | |
|---|---|
| Matting agent (aerosil R972) | 0.2 parts by mass |
| Methylene chloride | 72.4 parts by mass |
| Methanol | 10.8 parts by mass |
| Cellulose acylate solution 6 | 10.3 parts by mass |

(Preparation of Film-Forming Dope)

The cellulous acylate solution 6 of 100 parts by mass and the matting agent dispersion solution of which inorganic fine particles were 0.20 parts by mass with respect to the cellulous acylate resin were mixed and the film-forming dope was prepared.

(3) Casting

The above-mentioned film-forming dope was cast by using a band stretcher. Further, the band was made of SUS.

(4) Drying

The cast and obtained web (film) was peeled off from the band and thereafter, dried in a tenter device at 100° C. for 20 minutes by using the tenter device that conveys the web while clipping both ends of the web with clips.

Thereafter, the web was conveyed to the drying zone at the drying temperature of 120° C. again.

Furthermore, the drying temperature described herein means the film surface temperature of the film.

(5) Winding

Thereafter, each film was wound after cooling up to a room temperature and the film 6 having a roll width of 1340 mm and a roll length of 2600 mm was obtained (film thickness 40 μm, Re=1 nm, Rth=21 nm).

<Thermoplastic Resin Film 11>

Cellulous acylate film ZRD60 (prepared by Fuji Film Co., Ltd.) which was commercially available was provided and used as the thermoplastic resin film 11. The thickness of the thermoplastic resin film 11 was 60 μm.

<Thermoplastic Resin Film 12>

Cellulous acylate film ZRD40 (prepared by Fuji Film Co., Ltd.) which was commercially available was provided and used as the thermoplastic resin film 12. The thickness of the thermoplastic resin film was 41 μm.

<Thermoplastic Resin Film 13>

(1) Preparation of Cellulous Acylate Resin by Synthesis

The same cellulose acylate resin as the thermoplastic resin film 6 was used.

(2) Preparation Dope (Preparation of Cellulose Acylate Solution 13)

The following composition was put into the mixing tank and stirred to dissolve each component and heated at approximately 90° C. for 10 minutes and thereafter, filtered with a filter paper having an average hole diameter of 34 µm and a sintered metal filter having an average hole diameter of 10 µm.

Cellulose Acylate Solution 13

| | |
|---|---|
| Cellulose acylate having an acetyl substitution degree of 2.88 | 100.0 parts by mass |
| Following additives (polycondensation ester of carboxyl acid and diol) | 15 parts by mass |
| Methylene chloride | 451.0 parts by mass |
| Methanol | 39.0 parts by mass |

Polycondensation ester: Polycondensation ester of adipic acid as dicarboxylic acid and ethylene glycol as diol (adipic acid: Ethylene glycol=100:100 (mol ratio))(terminal: Acetyle group, molecular weight 1000)

(Preparation of Matting Agent Solution)

The following composition including the cellulous acylate solution 13 prepared by the method was put into the disperser and the matting agent dispersion solution was prepared.

Matting Agent Dispersion Solution

| | |
|---|---|
| Matting agent (aerosil R972) | 0.2 parts by mass |
| Methylene chloride | 72.4 parts by mass |
| Methanol | 10.8 parts by mass |
| Cellulose acylate solution 13 | 10.3 parts by mass |

(Preparation of Film-Forming Dope)

The cellulous acylate solution 13 of 100 parts by mass and the matting agent dispersion solution of which inorganic fine particles were 0.20 parts by mass with respect to the cellulous acylate resin were mixed and the film-forming dope was prepared.

(3) Casting

The above-mentioned film-forming dope was cast by using the band caster. Further, the band was made of SUS.

(4) Drying

The cast and obtained web (film) was peeled off from the band and thereafter, dried in the tenter device at 100° C. by using the tenter device that conveys the web while clipping both ends of the web with clips.

Thereafter, the web was conveyed to the drying zone at the drying temperature of 120° C. again.

Furthermore, the drying temperature described herein means the film surface temperature of the film.

(5) Winding

Thereafter, each film was wound after cooling up to the room temperature and the thermoplastic resin film 13 having the roll width of 1340 mm and the roll length of 2600 mm was obtained (film thickness 25 µm, Re=1 nm, Rth=0 nm).

<Thermoplastic Resin Film 14>

A norbornenes-based polymer film "ZEONOR ZF14-060" (prepared by Optes Co., Ltd.) which was commercially available was provided and used as the thermoplastic resin film 14 (film thickness is 60 µm, Re=2 nm, and Rth=3 nm).

<Thermoplastic Resin Film 15>

(Preparation of Cellulose Acylate)

The cellulous acylate was synthesized and a substitution degree thereof was measured by the methods disclosed Japanese Patent Application Laid-open H10-45804 and Japanese Patent Application Laid-open H08-231761. In detail, sulfuric acid (7.8 parts by mass based on 100 parts by mass of cellulose) as a catalyst was added and carboxylic acid that was a raw material of an acyl substituent was added to perform an acylation reaction at 40° C. In this case, the type and the substitution degrees of the acyl group were adjusted by adjusting the type and the amount of carboxylic acid. In addition, the cellulous acylate was aged after the acylation. Further, low-molecular weight components of the cellulose acylate were washed with acetone and removed.

(Preparation of Cellulose Acylate Solution for Low-Substitution Degree Layer)

The following composition was put into the mixing tank and stirred while heating to dissolve each component, thereby preparing the cellulose acetate solution.

| | |
|---|---|
| Cellulose acetate (substitution degree 2.45) | 100.0 parts by mass |
| Following additives (polycondensation ester of carboxyl acid and diol) | 18.5 parts by mass |
| Methylene chloride | 365.5 parts by mass |
| Methanol | 54.6 parts by mass |

(Preparation of Cellulose Acylate Solution for High-Substitution Degree Layer)

The following composition was put into the mixing tank and stirred while heating to dissolve each component, thereby preparing a cellulose acetate solution.

| | |
|---|---|
| Cellulose acetate (substitution degree 2.79) | 100.0 parts by mass |
| Following additives (polycondensation ester of carboxyl acid and diol) | 11.3 parts by mass |
| Silica fine particles R972 (prepared by Nippon Aerosil) | 0.15 parts by mass |
| Methylene chloride | 395.0 parts by mass |
| Methanol | 59.0 parts by mass |

Polycondensation ester: Polycondensation ester of terephthalic acid as dicarboxylic acid, ethylene glycol as diol, and 1,2-propylene glycol (terephthalic acid:Succinic acid:Ethylene glycol 1,2-propylene glycol=55:45:50:50 (Molar ratio))(terminal: acetyl group, molecular weight 800)

(Preparation of Cellulose Acylate Film)

The cellulose acylate solution for the low-substitution degree layer and the cellulose acylate solution for the high-substitution degree layer were cast to become a core layer having a film thickness of 55 µm and Skin A layer and Skin B layer having a film thickness of 2 µm, respectively. The obtained web (film) was peeled off from the band and stretched horizontally by 10% at 140° C. when the residual solvent amount to the total mass of the film was 20 to 5% while being fastened with the clip by using the tenter. Thereafter, the clip was removed from the film and dried at 130° C. for 20 minutes and thereafter, stretched horizontally by 20% at 170° C. by using the tenter again.

The weight after the dehydration was measured and the amount of water absorbed was obtained in accordance with the following Equation:

Residual solvent amount (% by mass)=$\{(M-N)/N\} \times 100$ where M is a mass at any time point of the web and N is a mass when a web with M measured was dried at 120° C. for 2 hr.

The thermoplastic resin film 15 was obtained therefrom (film thickness 59 μm, Re=55 nm, Rth=130 nm)

<Preparation of Stacked Film of Low Moisture-Permeable Layer>

[Preparation of Low Moisture-Permeable Layer Forming Composition]

The low moisture-permeable layer forming composition was prepared as described below.

(Composition of Low Moisture-Permeable Layer Forming Composition B-1)

| | |
|---|---|
| A-DCP (100%): Tricyclodecane dimethanol dimethacrylate [prepared Shin Nakamura Chemical Co., Ltd.] | 97.0 parts by mass |
| Irgacure 907 (100%): Polymerization initiator [prepared by Chiba Specialty Chemicals Co., Ltd.] | 3.0 parts by mass |
| SP-13 | 0.04 g |
| Methylethylketone (MEK) | 81.8 parts by mass |

(Composition of Low Moisture-Permeable Layer Forming Composition B-2)

The following respective components were mixed and put into a glass-made separable flask attached with an agitator and agitated at the room temperature for 5 hrs and thereafter, filtered with a polypropylene-made depth filter having a hole diameter of 5 μm to acquire each composition.

(Preparation of Cyclic Polyolefin-Based Resin Contained Layer Forming Composition)

| | |
|---|---|
| Cyclic polyolefin-based resin TOPAS6013 (prepared by Polyplastics Co., Ltd.) | 100 parts by mass |
| Cyclo hexane | 510 parts by mass |
| Cyclohexanone | 57 parts by mass |

Materials used are shown below.

A-DCP: Tricyclodecane dimethanol dimethacrylate [prepared Shin Nakamura Chemical Co., Ltd.]

Irgacure 907: Polymerization initiator [prepared by Chiba Specialty Chemicals Co., Ltd.] Leveling agent (SP-13):

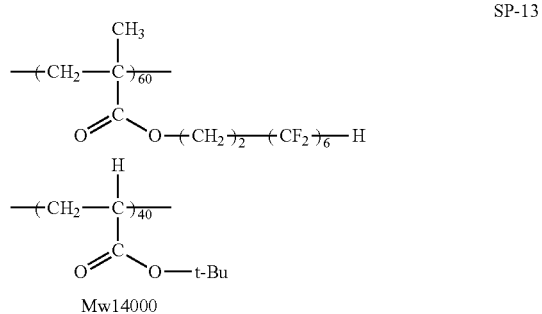

Mw14000

(Preparation of Low Moisture-Permeable Layer Stacked Film 101)

The thermoplastic resin film 1 as the substrate film was wound in the roll shape, the low moisture-permeable layer forming composition B-1 was used, and coated under a condition of a conveyance speed of 30 m/min. by a die coat method using a slot die described in Embodiment 1 of Japanese Patent Application Laid-open No. 2006-122889 to be dried at 60° C. for 150 seconds. Thereafter, again, the UV curing condition was that UV radiation was irradiated at an illuminance of 400 mW/cm² and a radiation dose of 60 mJ/cm² by using an air-cooled metal halide lamp (manufactured by Eye Graphics Co., Ltd.) of 160 W/cm while nitrogen was being purged such that the oxygen concentration become an atmosphere of 0.1% by volume or less. The coating amount was adjusted such that the film thickness of the low moisture-permeable layer was 5 μm.

The obtained optical film was used as the low moisture-permeable layer stacked film 101.

(Preparation of Low Moisture-Permeable Layer Stacked Films 103 to 112)

In preparing the low moisture-permeable layer stacked film 101, the optical films 103, and 107 to 112 were prepared while the film thicknesses of the substrate film, the low moisture-permeable layer forming composition, and the low moisture-permeable layer were set similarly to the low moisture layer stacked film 101 except for those described in the table.

<Preparation of Low Moisture-Permeable Layer Stacked Film 113>

The cyclic polyolefin-based resin container layer forming coating composition B-2 was coated on the thermoplastic resin film 5 by using a gravure coater and thereafter, dried 25° C. for 1 minute and continuously dried at 80° C. for approximately 5 minutes to obtain the low moisture-permeable layer stacked film 113.

<Preparation of Low Moisture-Permeable Layer Stacked Films 114 to 120>

In preparing the low moisture-permeable layer stacked film 113, the optical films 114 to 120 were prepared while the film thicknesses of the substrate film, the low moisture-permeable layer forming composition, and the low moisture-permeable layer were set similarly to the low moisture layer stacked film 113 except for those described in Table 2.

[Evaluation of Thermoplastic Resin Film and Low Moisture-Permeable Layer Stacked Film]

The film thicknesses of the prepared thermoplastic resin film and low moisture-permeable layer stacked film were measured to perform the following physical property measurement and evaluation. The results are shown in the following Table 1 and Table 2.

Further, the film thicknesses of the low moisture-permeable layer before and after the low moisture-permeable layer were measured and the film thickness of the low moisture-permeable layer was acquired from a difference thereof.

(1) Moisture Permeability (Moisture Permeability at 40° C. 90% RH)

A film sample 70 mmφ was humidity-controlled at 40° C. 90% RH for 24 hours and a moisture amount per area (g/m²) was calculated with moisture permeability (=mass after humidity control—mass before humidity control) by using a moisture permeation cup according to JISZ-0208.

(2) Re, Rth

The sample film was humidity-controlled at 25° C. 60% RH for 24 hours and thereafter, the retardation was measured in the wavelength of 590 nm from a direction inclined by 10° pitch at +50° to −50° from a normal line of a film surface with a vertical direction and a slow axis as a pivot axis with respect to the film surface at 25° C. 60% RH by using an auto refractometer (KOBRA-21ADH: prepared by Ohji Measurement Co., Ltd.) and the in-plane retardation value (Re) and the film thickness-direction retardation value (Rth) were calculated.

(3) Equivalent Water Content

The measured amount of water (g) measured by Karl-Fischer's method on a film sample 7 mm×35 mm using a moisture meter and ample drying devices CA-03 and VA-05, which were manufactured by Mitsubishi Chemical Corp. was divided by the sample mass (g) to give a water content.

Thermoplastic Resin Film

TABLE 1

| No. | Film Thickness/μm | Re/nm | Rth/nm |
|---|---|---|---|
| Thermoplastic Resin Film 1 | 40 | 0.8 | 1.5 |
| Thermoplastic Resin Film 2 | 40 | 1.0 | 3.0 |
| Thermoplastic Resin Film 3 | 40 | 1.0 | 5.0 |
| Thermoplastic Resin Film 4 | 60 | 1.5 | 40.0 |
| Thermoplastic Resin Film 5 | 40 | 1.4 | 31.0 |
| Thermoplastic Resin Film 6 | 40 | 1 | 21 |
| Thermoplastic Resin Film 11 | 60 | 2.0 | −2.0 |
| Thermoplastic Resin Film 12 | 41 | 1.0 | −1.0 |
| Thermoplastic Resin Film 13 | 25 | 1.0 | 0.0 |
| Thermoplastic Resin Film 14 | 60 | 2.0 | 3.0 |
| Thermoplastic Resin Film 15 | 59 | 55 | 130 | immersed in a 0.05 mol/L sulfuric acid aqueous solution at 25° C. for 30 sec, and again passed through a washing bath under water flow for 30 sec to make the film be in a neutral state. And then, water removal was repeatedly performed three times with an air knife and dried in a drying zone at 70° C. for a retention time of 15 sec to prepare a saponified film.

2) Preparation of Polarizer

A 20 μm thick polarizer was prepared by adsorbing iodine onto a stretched polyvinyl alcohol film in accordance with Example 1 of Japanese Patent Application Laid-Open No. 2001-141926.

3) Bonding (Manufacturing of Polarizing Plate)

A surface on which the low moisture-permeable layer of the prepared low moisture-permeable layer stacked films 101 and 103 were not stacked was bonded to a corona-processed surface on which the low moisture-permeable layer of the prepared low moisture-permeable layer stacked films 101 and 103 were not stacked by using an acryl adhesive with respect to one surface of the polarizer in which nothing was bonded to both surfaces which were manufactured.

TABLE 2

| | | Only Thermoplastic Resin Film | | Only Low Moisture-Permeable Layer | | Entirety of Low Moisture-Permeable Layer Stacked Film | |
|---|---|---|---|---|---|---|---|
| No. | Thermoplastic Resin Film No. | Film Thickness μm | Moisture Permeability g/m²/day | Low Moisture-Permeable Layer No. | Film Thickness μm | Total Film Thickness μm | Moisture Permeability g/m²/day |
| Low Moisture Permeability Layer Stacked Film 101 | Thermoplastic Resin Film 1 | 40 | 100 | B-1 | 5 | 45 | 72 |
| Low Moisture Permeability Layer Stacked Film 103 | Thermoplastic Resin Film 2 | 40 | 75 | B-1 | 5 | 45 | 59 |
| Low Moisture Permeability Layer Stacked Film 107 | Thermoplastic Resin Film 3 | 40 | 400 | B-1 | 5 | 45 | 160 |
| Low Moisture Permeability Layer Stacked Film 108 | Thermoplastic Resin Film 4 | 60 | 533 | B-1 | 5 | 65 | 178 |
| Low Moisture Permeability Layer Stacked Film 109 | Thermoplastic Resin Film 5 | 40 | 800 | B-1 | 5 | 45 | 200 |
| Low Moisture Permeability Layer Stacked Film 111 | Thermoplastic Resin Film 5 | 40 | 800 | B-1 | 7 | 47 | 148 |
| Low Moisture Permeability Layer Stacked Film 112 | Thermoplastic Resin Film 5 | 40 | 800 | B-1 | 14 | 54 | 87 |
| Low Moisture Permeability Layer Stacked Film 113 | Thermoplastic Resin Film 5 | 40 | 800 | B-2 | 2 | 42 | 67 |
| Low Moisture Permeability Layer Stacked Film 114 | Thermoplastic Resin Film 5 | 40 | 800 | B-2 | 3 | 43 | 56 |
| Low Moisture Permeability Layer Stacked Film 115 | Thermoplastic Resin Film 5 | 40 | 800 | B-2 | 4 | 44 | 49 |
| Low Moisture Permeability Layer Stacked Film 116 | Thermoplastic Resin Film 5 | 40 | 800 | B-2 | 6 | 46 | 35 |
| Low Moisture Permeability Layer Stacked Film 117 | Thermoplastic Resin Film 5 | 40 | 800 | B-2 | 7 | 47 | 30 |
| Low Moisture Permeability Layer Stacked Film 118 | Thermoplastic Resin Film 5 | 40 | 800 | B-2 | 11 | 51 | 16 |
| Low Moisture Permeability Layer Stacked Film 119 | Thermoplastic Resin Film 5 | 40 | 800 | B-2 | 15 | 55 | 11 |
| Low Moisture Permeability Layer Stacked Film 120 | Thermoplastic Resin Film 5 | 40 | 800 | B-2 | 16 | 56 | 10 |

<Manufacturing of Polarizing Plate>

1) Saponification of Film

Commercially available cellulose acylate films (Fuji Tack TD60, Fuji Tack TD40 prepared by Fuji Film Corporation) and thermoplastic resin films 3 to 13, and 15 and functional stacked films 107 to 120 were immersed in a 1.5 mol/L NaOH aqueous solution (saponification liquid) which was temperature-controlled at 55° C. for 2 minutes, and then A surface on which the low moisture-permeable layer of the prepared low moisture-permeable layer stacked film 117 was stacked was bonded to a corona-processed surface on which the low moisture-permeable layer of the low moisture-permeable layer stacked film 117 was stacked by using the acryl adhesive with respect to one surface of the polarizer in which nothing was bonded to both surfaces which were manufactured.

The commercially available saponified cellulose acylate films TD 60 and TD40, the thermoplastic resin film 6, and the low moisture-permeable layer stacked films 107 to 109, and 111 to 120 were attached to one side of the polarizer in which nothing was bonded to the manufactured both surfaces by using a polyvinyl alcoholic adhesive and bonded after being dried at 70° C. for 10 minutes or more.

The prepared thermoplastic resin films 1 and 14 were corona-processed and bonded to the other side surface of a polarizer in which a substrate side of the film was bonded to one manufactured side surface by using the acryl adhesive to manufacture polarizing plates 253 and 254.

The saponified thermoplastic resin films 11 to 13, and 15 were attached to the other side of the manufactured polarizer by using the polyvinyl alcoholic adhesive, and bonded after being dried at 70° C. for 10 minutes or more to manufacture polarizing plates 201 to 215, 251 and 252, 271 and 272, and 291 and 292.

The saponified thermoplastic resin film 12 was attached to the other side surface of the polarizer in which the low moisture-permeable layer was bonded to one manufactured side surface by using the polyvinyl alcoholic adhesive and dried at 70° C. for 10 minutes or more to manufacture polarizing plate 220.

At this time, the films were disposed such that the longitudinal direction of the roll of the fabricated polarizer was in parallel with the longitudinal direction of the thermoplastic resin film and the low moisture-permeable layer stacked film. Further, the films were disposed such that the longitudinal direction of the roll of the polarizer was parallel with the longitudinal direction of the roll of the cellulose acylate films TD60 and TD40.

With respect to the obtained polarizing plate, which side of the polarizing plate protective films bonded to both surfaces of the polarizer was set to the polarizing plate protective films F1 and F4 opposite to the liquid crystal cell with respect to the polarizer and which side was set to the polarizing plate protective films F2 and F3 at the liquid crystal cell side with respect to the polarizer were determined.

[Evaluation of Polarizing Plate]

The film thickness of the manufactured polarizing plate was measured and the following physical property measurement and evaluation were performed. The measurement and evaluation results are shown in the following Table 3 and Table 4.

4) Difference in Water Content after Drying Condition Time Elapses Just after Thermo and after Thermo (Sample Provision)

The obtained polarizing plate was humidity-controlled at 25 C 60% RH for 7 days and thereafter, a sample of 50 mm×50 mm was cut and the obtained polarizing plate was attached to the glass plate one by one with the adhesive interposed so that the polarizing plate protective films F2 and F3 becomes a glass plate side. As the glass plate, a glass plate having a thickness of 1.1 mm, which was manufactured by Corning Corporation, was used. In this state, the polarizing plate was humidity-controlled for 7 days again.

(Measurement of Water Content Difference 1)

Thereafter, just after a time elapsed while the polarizing plate bonded to the glass plate was put under the following condition (A), a polarizing plate sample of 10 mm×10 mm from the center was peeled off and cut from glass to perform the water content measurement.

Further, just after a time elapsed while the polarizing plate bonded to the glass plate was put under the following condition (B), the polarizing plate sample of 10 mm×10 mm from the center was peeled off and cut from glass to perform the water content measurement.

A difference between the water content of the polarizing plate just after the condition (A) and the water content of the polarizing plate just after the condition (B) was calculated as the water content difference.

Condition (A): Left alone for 48 hours under an environment of 60° C. and the relative humidity of 90%1

Condition (B): Left alone for 6 hours under an environment of 25° C. and the relative humidity of 10% after being left alone for 48 hours under an environment of 60° C. and the relative humidity of 90%1

(Water content difference0=(water content just after condition($A$))–(water content just after condition ($B$))

The measured amount of water (g) measured by Karl-Fischer's method on the sample 10 mm×10 mm using the moisture meter and sample drying devices CA-03 and VA-05, which were manufactured by Mitsubishi Chemical Corp. was divided by the sample mass (g) within 10 minutes after extracting the polarizing plate just after thermo in the environment at 25° C. 60% RH under the condition (A) and 10 minutes after being left alone for 6 hours in the environment at 25° C. 10% RH under the condition (B) to give the water content.

Herein, since the water content varies as the time elapses; the sample was put into Karl-Fischer's sample bottle and sealed within 3 minutes after cutting.

(Measurement of Water Content Difference 2)

As a more strict evaluation test, just after a time elapsed while the polarizing plate bonded to the glass plate was put under the following condition (C), the polarizing plate sample of 10 mm×10 mm from the center was peeled off and cut from glass to perform the water content measurement.

Further, just after a time elapsed while the polarizing plate bonded to the glass plate was put under the following condition (D), the polarizing plate sample of 10 mm×10 mm from the center was peeled off and cut from glass to perform the water content measurement.

A difference between the water content of the polarizing plate just after the condition (C) and the water content of the polarizing plate just after the condition (D) was calculated as the water content difference.

Condition (C): Left alone for 120 hours under an environment of 60° C. and the relative humidity of 90%]

Condition (D): Left alone for 6 hours under an environment of 25° C. and the relative humidity of 10% after being left alone for 120 hours under an environment of 60° C. and the relative humidity of 90%]

(Water content difference0=(water content just after condition ($C$))–(water content just after condition ($D$))

The measured amount of water (g) measured by Karl-Fischer's method on the sample 10 mm×10 mm using the moisture meter and sample drying devices CA-03 and VA-05, which were manufactured by Mitsubishi Chemical Corp. was divided by the sample mass (g) within 10 minutes after extracting the polarizing plate just after thermo in the environment at 25° C. 60% RH under the condition (C) and 10 minutes after being left alone for 6 hours in the environment at 25° C. 10% RH under the condition (D) to give the water content.

Herein, since the water content varies as the time elapses, the sample was put into Karl-Fischer's sample bottle and sealed within 3 minutes after cutting.

TABLE 3

| Polarizing Plate No. | Polarizing Plate Protective Film F1, F4 Side | Polarizing Plate Protective Film F2, F3 Side | Water Content Difference after Leaving Alone 48 H/% | Water Content Difference after Leaving Alone 120 H/% |
|---|---|---|---|---|
| Polarizing Plate 201 | Low Moisture-Permeable Layer Stacked Film 101 | Thermoplastic Resin Film 12 | 2.7 | 2.7 |
| Polarizing Plate 202 | Low Moisture-Permeable Layer Stacked Film 103 | Thermoplastic Resin Film 12 | 1.3 | 2.0 |
| Polarizing Plate 203 | Low Moisture-Permeable Layer Stacked Film 107 | Thermoplastic Resin Film 12 | 2.3 | 2.5 |
| Polarizing Plate 204 | Low Moisture-Permeable Layer Stacked Film 108 | Thermoplastic Resin Film 12 | 2.5 | 2.7 |
| Polarizing Plate 205 | Low Moisture-Permeable Layer Stacked Film 109 | Thermoplastic Resin Film 12 | 2.9 | 3.0 |
| Polarizing Plate 206 | Low Moisture-Permeable Layer Stacked Film 111 | Thermoplastic Resin Film 12 | 2.5 | 2.9 |
| Polarizing Plate 207 | Low Moisture-Permeable Layer Stacked Film 112 | Thermoplastic Resin Film 12 | 1.5 | 2.3 |
| Polarizing Plate 208 | Low Moisture-Permeable Layer Stacked Film 113 | Thermoplastic Resin Film 12 | 1.1 | 2.1 |
| Polarizing Plate 209 | Low Moisture-Permeable Layer Stacked Film 114 | Thermoplastic Resin Film 12 | 1 | 1.9 |
| Polarizing Plate 210 | Low Moisture-Permeable Layer Stacked Film 115 | Thermoplastic Resin Film 12 | 1 | 1.8 |
| Polarizing Plate 211 | Low Moisture-Permeable Layer Stacked Film 116 | Thermoplastic Resin Film 12 | 1 | 1.2 |
| Polarizing Plate 212 | Low Moisture-Permeable Layer Stacked Film 117 | Thermoplastic Resin Film 12 | 0.9 | 1.8 |
| Polarizing Plate 213 | Low Moisture-Permeable Layer Stacked Film 118 | Thermoplastic Resin Film 12 | 0.9 | 1.8 |
| Polarizing Plate 214 | Low Moisture-Permeable Layer Stacked Film 119 | Thermoplastic Resin Film 12 | 0.8 | 1.5 |
| Polarizing Plate 215 | Low Moisture-Permeable Layer Stacked Film 120 | Thermoplastic Resin Film 12 | 0.8 | 1.5 |
| Polarizing Plate 251 | Low Moisture-Permeable Layer Stacked Film 113 | Thermoplastic Resin Film 11 | 1.2 | 2.3 |
| Polarizing Plate 252 | Low Moisture-Permeable Layer Stacked Film 113 | Thermoplastic Resin Film 13 | 1 | 1.9 |
| Polarizing Plate 253 | Low Moisture-Permeable Layer Stacked Film 113 | Thermoplastic Resin Film 14 | 1 | 1.8 |
| Polarizing Plate 254 | Low Moisture-Permeable Layer Stacked Film 113 | Thermoplastic Resin Film 1 | 1.1 | 2.1 |
| Polarizing Plate 271 | Low Moisture-Permeable Layer Stacked Film 101 | Thermoplastic Resin Film 15 | 1.4 | 2.6 |
| Polarizing Plate 272 | Low Moisture-Permeable Layer Stacked Film 113 | Thermoplastic Resin Film 15 | 1.2 | 2.1 |
| Polarizing Plate 291 | Thermoplastic Resin Film 6 | Thermoplastic Resin Film 12 | 3.7 | 3.7 |
| Polarizing Plate 292 | Thermoplastic Resin Film 6 | Thermoplastic Resin Film 15 | 3.7 | 3.7 |
| Polarizing Plate 220 | Low Moisture-Permeable Layer Stacked Film 117 | Thermoplastic Resin Film 12 | 1.2 | 2.1 |

TABLE 4

| Polarizing Plate No. | Polarizing Plate Protective Film F1, F4 Side | Polarizing Plate Protective Film F2, F3 Side |
|---|---|---|
| Polarizing Plate A1 | TD60 | Thermoplastic Resin Film 12 |
| Polarizing Plate A2 | TD40 | Thermoplastic Resin Film 12 |
| Polarizing Plate B | TD40 | Thermoplastic Resin Film 15 |

[Evaluation of Panel 1]

<Mounting on IPS Panel>

Two polarizing plates of a commercially available IPS-type liquid crystal television (42LS5600 manufactured by LG, Inc.) were peeled off, and the above-described polarizing plates 201 to 215, 220, 251 to 254, and 291 as a front-side polarizing plate on the front side and the above-described polarizing plates A1 and A2 as a rear-side polarizing plate on the rear side were adhered with each one sheet to the front side and the rear side through an adhesive such that the polarizing plate protective films F2 and F3 each become the liquid crystal cell side. The crossed Nichol was disposed such that the absorption axis of the polarizing plate on the front side was in the longitudinal direction (crosswise direction) and the transmission axis of the polarizing plate on the rear side was in the longitudinal direction (crosswise direction). The thickness of glass used in the liquid crystal cell was 0.5 mm Thus, liquid crystal displays 501 to 521 and 535 were obtained.

The display characteristics were excellent.

<Mounting on VA Panel>

Two polarizing plates of a commercially available VA-type liquid crystal television (39E61HR manufactured by Skyworth) were peeled off, and the above-described polarizing plates 271 and 272, and 292 as a front-side polarizing plate on the front side and the above-described polarizing plate B as a rear-side polarizing plate on the rear side were adhered with each one sheet to the front side and the rear side through the adhesive such that the polarizing plate protective films F2 and F3 each become the liquid crystal cell side. The crossed Nichol was disposed such that the absorption axis of the polarizing plate on the front side was in the longitudinal direction (crosswise direction) and the transmission axis of the polarizing plate on the rear side was in the longitudinal direction (crosswise direction). The thickness of glass used in the liquid crystal cell was 0.5 mm Thus, liquid crystal displays 522 to 524 were obtained.

The display characteristics were excellent.

[Warp Unevenness Evaluation]

The liquid crystal displays thus fabricated were subjected to thermo treatment at 60° C. and 90% relative humidity for 48 hours and then left to stand at 25° C. and 60% relative humidity for 2 hours, then the backlights of the liquid crystal displays were turned on, and light leakage at four corners of the panel was evaluated by photographing a black display screen from a screen front with a luminance measurement camera "ProMetric" (manufactured by Radiant Imaging Corporation) and based on a difference between average luminance of the entire screen and luminance at a portion where the light leakage was large at four corners after 5 hours and after 10 hours after the light was turned on.

Unevenness of the IPS panel and unevenness of the VA panel were compared with each other in the panel of the same liquid crystal mode.

Further, instead of thermo at 60° C. 90% RH for 48 hours, the same evaluation had been performed with respect to even thermo at 50° C. 80% RH for 72 hours, but the evaluation results of the light leakage amount or the warp unevenness were the same as those in thermo at 60° C. 90% RH for 48 hours.

~Evaluation Index~

A: Light leakage at four corners of the panel was not viewed (the light leakage of the panel was the same as that before thermo was input)

B: The light leakage was slightly viewed at one or two corners among four corners of the panel, but may be permitted.

C: The light leakage was slight at three and four corners of four corners of the panel, but may be permitted.

D: The light leakage was large at four corners of the panel, and as a result, the light leakage may not be permitted.

The IPS panel and the VA panel were different from each other in method in which unevenness was viewed depending on the panel and the VA panel was larger than the IPS panel in terms of an area of a light leakage region at four corners of the panel in addition to the indexes, and as a result, "−" is attached to the evaluation indexes. For example, B− is worse than B, but better than C.

The polarizing plate used in the liquid crystal display and the results are shown in Table 5.

sheet to the front side (visual side) and the rear side (non-visual side) through an adhesive such that the polarizing plate protective film sides F2 and F3 become liquid crystal cell sides, respectively. The crossed Nichol was disposed so that the absorption axis of the polarizing plate on the front side was in the longitudinal direction (crosswise direction) and the transmission axis of the polarizing plate on the rear side was in the longitudinal direction (crosswise direction). The thickness of glass used in the liquid crystal cell was 0.5 mm Thus, liquid crystal displays 601 to 620, 622, and 624 were obtained.

TABLE 5

| Liquid Crystal Display No. | Front-side (Visual-side) Polarizing Plate | Rear-side (Non-visual-side) Polarizing Plate | panel | 48-HR Thermo Warp Unevenness | 120-HR Thermo Warp Unevenness |
|---|---|---|---|---|---|
| Example | | | | | |
| Liquid Crystal Display501 | Polarizing Plate 201 | Polarizing Plate A2 | IPS | B | B |
| Liquid Crystal Display502 | Polarizing Plate 202 | Polarizing Plate A2 | IPS | A | A |
| Liquid Crystal Display503 | Polarizing Plate 203 | Polarizing Plate A2 | IPS | C | C |
| Liquid Crystal Display504 | Polarizing Plate 204 | Polarizing Plate A2 | IPS | C | C |
| Liquid Crystal Display505 | Polarizing Plate 205 | Polarizing Plate A2 | IPS | C | C |
| Liquid Crystal Display506 | Polarizing Plate 206 | Polarizing Plate A2 | IPS | C | B |
| Liquid Crystal Display507 | Polarizing Plate 207 | Polarizing Plate A2 | IPS | B | B |
| Liquid Crystal Display508 | Polarizing Plate 208 | Polarizing Plate A2 | IPS | B | B |
| Liquid Crystal Display509 | Polarizing Plate 209 | Polarizing Plate A2 | IPS | A | A |
| Liquid Crystal Display510 | Polarizing Plate 210 | Polarizing Plate A2 | IPS | A | A |
| Liquid Crystal Display511 | Polarizing Plate 211 | Polarizing Plate A2 | IPS | B | A |
| Liquid Crystal Display512 | Polarizing Plate 212 | Polarizing Plate A2 | IPS | B | B |
| Liquid Crystal Display513 | Polarizing Plate 213 | Polarizing Plate A2 | IPS | B | B |
| Liquid Crystal Display514 | Polarizing Plate 214 | Polarizing Plate A2 | IPS | B | B |
| Liquid Crystal Display515 | Polarizing Plate 215 | Polarizing Plate A2 | IPS | B | B |
| Liquid Crystal Display516 | Polarizing Plate 251 | Polarizing Plate A2 | IPS | B | B |
| Liquid Crystal Display517 | Polarizing Plate 252 | Polarizing Plate A2 | IPS | B | B |
| Liquid Crystal Display518 | Polarizing Plate 253 | Polarizing Plate A2 | IPS | A | A |
| Liquid Crystal Display519 | Polarizing Plate 254 | Polarizing Plate A2 | IPS | B | B |
| Liquid Crystal Display520 | Polarizing Plate 208 | Polarizing Plate A1 | IPS | B | B |
| Comparative Example | | | | | |
| Liquid Crystal Display521 | Polarizing Plate 291 | Polarizing Plate A2 | IPS | D | D |
| Example | | | | | |
| Liquid Crystal Display522 | Polarizing Plate 271 | Polarizing Plate B | VA | B− | B− |
| Liquid Crystal Display523 | Polarizing Plate 272 | Polarizing Plate B | VA | B− | B− |
| Comparative Example | | | | | |
| Liquid Crystal Display524 | Polarizing Plate 292 | Polarizing Plate B | VA | D | D |
| Example | | | | | |
| Liquid Crystal Display535 | Polarizing Plate 220 | Polarizing Plate A2 | IPS | A | A |

Further, in liquid crystal displays 516 to 519, the polarizing plate protective film F2 and the polarizing plate protective film F3 were different films, but the results of the test using the film of the present invention and the test using the commercially available cellulose acylate film TD60 were the same as each other.

In the liquid crystal display 535, even in the liquid crystal display using as the front-side (visual-side) polarizing plate the polarizing plate bonded with the polarizer so that the low moisture-permeable layer of the polarizing plate protective film F1 becomes the polarizer side, it can be seen that the effect of the present invention may be acquired.

(Evaluation 2 of Panel)
<Mounting on IPS Panel>
Two polarizing plates of a commercially available IPS-type liquid crystal television (42LS5600 manufactured by LG, Inc.) were peeled off, and the polarizing plates 206 to 209, 212 to 214, 220, and 291 were adhered with each one <Mounting on VA Panel>
Two polarizing plates of a commercially available VA-type liquid crystal television (39E61HR manufactured by Skyworth) were peeled off, and the polarizing plates 272 and 292 were adhered with each one sheet to the front side (viewing side) and the rear side (non-viewing side) through an adhesive such that the polarizing plate protective film sides F2 and F3 become liquid crystal cell sides, respectively. The crossed Nichol was disposed such that the absorption axis of the polarizing plate on the front side was in the longitudinal direction (crosswise direction) and the transmission axis of the polarizing plate on the rear side was in the longitudinal direction (crosswise direction). The thickness of glass used in the liquid crystal cell was 0.5 mm Thus, liquid crystal displays 621 and 623 were obtained.
[Evaluation of Warp Unevenness]
The warp unevenness was evaluated by the same method described above.

The polarizing plates used in the liquid crystal display and results are shown in Table 6.

TABLE 6

| Liquid Crystal Display No. | Polarizing Plate on Front Side (Visual Side) | Polarizing Plate on Rear Side (Non-visual Side) | Panel | 48-HR Thermo Warp Unevenness | 48-HR Thermo Circular Unevenness | 120-HR Thermo Warp Unevenness | 120-HR Thermo Circular Unevenness |
|---|---|---|---|---|---|---|---|
| Example | | | | | | | |
| Liquid Crystal Display 601 | Polarizing Plate 214 | Polarizing Plate 214 | IPS | A | A | A | A |
| Liquid Crystal Display 602 | Polarizing Plate 214 | Polarizing Plate 213 | IPS | A | A | A | A |
| Liquid Crystal Display 603 | Polarizing Plate 213 | Polarizing Plate 213 | IPS | A | A | A | A |
| Liquid Crystal Display 604 | Polarizing Plate 208 | Polarizing Plate 206 | IPS | A | C | B | C |
| Liquid Crystal Display 605 | Polarizing Plate 208 | Polarizing Plate 207 | IPS | B | C | B | C |
| Liquid Crystal Display 606 | Polarizing Plate 208 | Polarizing Plate 208 | IPS | B | B | B | B |
| Liquid Crystal Display 607 | Polarizing Plate 208 | Polarizing Plate 209 | IPS | C | B | B | B |
| Liquid Crystal Display 608 | Polarizing Plate 209 | Polarizing Plate 206 | IPS | B | C | A | C |
| Liquid Crystal Display 609 | Polarizing Plate 209 | Polarizing Plate 207 | IPS | B | C | A | C |
| Liquid Crystal Display 610 | Polarizing Plate 209 | Polarizing Plate 208 | IPS | B | B | A | B |
| Liquid Crystal Display 611 | Polarizing Plate 209 | Polarizing Plate 209 | IPS | B | B | B | B |
| Liquid Crystal Display 612 | Polarizing Plate 212 | Polarizing Plate 206 | IPS | B | C | B | C |
| Liquid Crystal Display 613 | Polarizing Plate 212 | Polarizing Plate 207 | IPS | A | C | B | C |
| Liquid Crystal Display 614 | Polarizing Plate 212 | Polarizing Plate 208 | IPS | A | B | B | B |
| Liquid Crystal Display 615 | Polarizing Plate 212 | Polarizing Plate 209 | IPS | A | B | B | B |
| Liquid Crystal Display 616 | Polarizing Plate 213 | Polarizing Plate 207 | IPS | B | C | B | C |
| Liquid Crystal Display 617 | Polarizing Plate 213 | Polarizing Plate 208 | IPS | B | B | B | B |
| Liquid Crystal Display 618 | Polarizing Plate 213 | Polarizing Plate 209 | IPS | B | B | B | B |
| Liquid Crystal Display 619 | Polarizing Plate 209 | Polarizing Plate 214 | IPS | B | A | B | A |
| Liquid Crystal Display 620 | Polarizing Plate 212 | Polarizing Plate 212 | IPS | A | A | A | A |
| Liquid Crystal Display 621 | Polarizing Plate 272 | Polarizing Plate 272 | VA | B- | B | B- | B |
| Comparative Example | | | | | | | |
| Liquid Crystal Display 622 | Polarizing Plate 291 | Polarizing Plate 291 | IPS | D | D | D | D |
| Liquid Crystal Display 623 | Polarizing Plate 292 | Polarizing Plate 292 | VA | D | D | D | D |
| Example | | | | | | | |
| Liquid Crystal Display 624 | Polarizing Plate 220 | Polarizing Plate 220 | IPS | A | A | A | A |

Here, when a polarizing plate having a small difference in the percentage of water content between just after thermo and after a dry condition time elapses after thermo was set to the polarizing plate on the front side and the polarizing plate protective film F1 was disposed and used at the viewing side rather than the polarizer, it was seen that light leakage of the panel was decreased.

Further, when a polarizing plate having a small difference in the percentage of water content between just after thermo and after a dry condition time elapses after thermo was set to the polarizing plates on the front side and the rear side, the polarizing plate protective film F1 was disposed and used at the viewing side rather than the polarizer, and the polarizing plate protective film F4 was disposed and used at the rear side rather than the polarizer, it was seen that light leakage of the panel was further decreased.

[Evaluation of Circular Unevenness of Liquid Crystal Display]

After the liquid crystal panel mounted with the prepared polarizing plate was lighted on under an environment of 60° C. and relative humidity of 90% for 48 hours or 120 hours, and thereafter, under an environment of 25° C. and relative humidity of 60% for 48 hours, the unevenness was observed from the panel front side. A to C are available levels.

A: There was no circular light leakage generated on the panel.

B: The circular light leakage was shown on the panel, but the light leakage was very weak.

C: The circular light leakage was shown on the panel, but the boundary was unclear and thus the light leakage was not viewed.

D: The circular light leakage was shown on the panel and the boundary was clear, and thus a light leakage portion and a non-light leakage portion may be clearly viewed.

In the liquid crystal display 624, even in the liquid crystal display in which the polarizing plates attached with the polarizers were used as the front side (viewing side) and the polarizing plates on the rear side (non-viewing side) so that low permeable layers of the polarizing plate protective films F1 and F4 were polarizer sides, it could be seen that the effects of the present invention were obtained.

<Thermoplastic Resin Film 21>

<Synthesis of Raw Material Resin>

Polyethylene terephthalate was synthesized by a general method. This was used as polyester A.

<Preparation of Polyester Film>

A chip material of polyester A was dried at the percentage of water content of 50 ppm or less in a Henschel mixer and a paddle dryer, an ultraviolet absorber (the following compound (1)) was put into the raw material polyester A in a chip form, and then blended with the chip of polyester A again. With respect to the entire polyester, the ultraviolet absorber was adjusted to be an amount of 0.4% by mass. The chip material was dried at the water content of 50 ppm or less in a Henschel mixer and a paddle dryer, and then, melt in an extruder by setting a heater temperature of 280° C. to 300° C. The melt polyester was ejected on a chiller roll static-applied from a die part to obtain an amorphous base. The amorphous base was extended in a TD direction by adjusting a magnification in a range of 3.0 to 5.0 times to obtain a polyester film of 100 μm. The weeping of the ultraviolet absorber of the obtained polyester film was not observed. The film was set as a thermoplastic resin film 21. A ground axis direction of the film was a vertical direction of the film length direction in a range of ±5°. A MD modulus and a TD modulus of the film were 2900 MPa and 7100 MPa, respectively.

Compound (1)

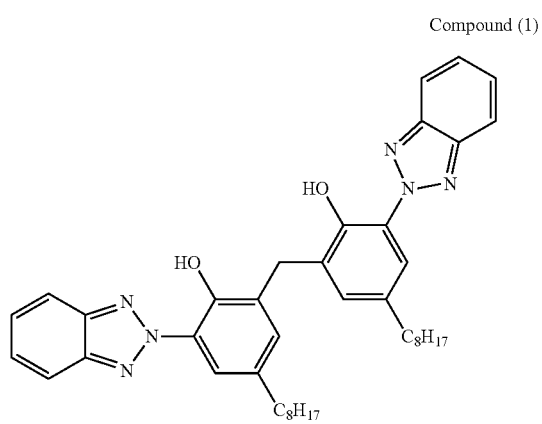

<Thermoplastic Resin Film 22>

In the thermoplastic resin film 21, except that the extending magnification was changed, the same conditions were set to obtain a polyester film of 100 μm. The film was set as a thermoplastic resin film 22. A ground axis direction of the film was a vertical direction of the film length direction in a range of ±5°.

<Thermoplastic Resin Films 23 to 25>

In the thermoplastic resin film 21, except that the extending method was a biaxial extending and the extending magnification was changed, the same conditions were set to obtain a polyester film of 100 μm. The film was set as thermoplastic resin films 23 to 25. A ground axis direction of the film was a vertical direction of the film length direction in a range of ±5°.

<Thermoplastic Resin Film 26>

In the thermoplastic resin film 21, except that the extending magnification was changed, the same conditions were set to obtain a polyester film of 50 μm. The film was set as a thermoplastic resin film 26. A ground axis direction of the film was a vertical direction of the film length direction in a range of ±5°.

<Hardcoat Layer Laminating Film 21>

(Preparation of Coating Solution for Hardcoat Layer)

The following composition was put into a mixing tank and stirred to prepare a coating solution for a hardcoat layer.

Trimethylolpropane triacrylate (TMPTA, manufactured from Nippon Kayaku Co., Ltd.) of 750.0 parts by mass, the weight average molecular weight 15,000 Poly (glycidyl methacrylate) of 270.0 parts by mass, methyl ethyl ketone of 730.0 parts by mass, cyclohexanone of 500.0 parts by mass, a photopolymerization initiator (Irgacure 184, manufactured from Nippon Ciba-Geigy Co., Ltd.) of 50.0 parts by mass were added and stirred. The mixture was filtered through a polypropylene-made filter having a pore size of 0.4 μm to prepare Coating Solution 1 for a hardcoat layer.

[Manufacture of Hardcoat Layer]

The Coating Solution 1 for a hardcoat layer was coated on the prepared thermoplastic resin film 21 by a Gravure coater. The solution was dried at 100° C., and then the coated layer was cured through irradiation with an ultraviolet ray at illuminance of 400 mW/cm² and an irradiation dose of 300 mJ/cm² by using an air-cooled metal halide lamp (manufactured by Eye Graphics Co., Ltd.) of 160 W/cm while purging the system with nitrogen to give an atmosphere having an oxygen concentration of 1.0 vol % or less, thereby forming a hardcoated layer having a thickness of 8 μm. The film was set as a hardcoated layer laminated film 21.

<Hardcoat Layer Laminated Films 22 to 26>

In the hardcoat layer laminated film 21, except that the thermoplastic resin films 22 to 26 were used instead of the thermoplastic resin film 21, the same conditions were set to prepare the hardcoat layer laminated films 22 to 26.

[Evaluation of Thermoplastic Resin Films and Hardcoat Layer Laminated Films]

With respect to the prepared thermoplastic resin films and hardcoat layer laminated films, like the thermoplastic resin film 1, film thicknesses and physical properties were measured. The results are shown in the following Table 7.

Here, an Nz value was obtained from a measured result obtained from an automatic double refractometer (KOBRA-21 ADH, manufactured by Oji Instrumentation Co., Ltd.).

TABLE 7

| No. | Film Thickness/μm | Re/nm | Rth/nm | Nz | Permeability/ g/m²·day |
|---|---|---|---|---|---|
| Thermoplastic Resin Film 21 | 100 | 13000 | 12000 | 1.4 | 12 |
| Thermoplastic Resin Film 22 | 100 | 13000 | 9000 | 1.2 | 15 |
| Thermoplastic Resin Film 23 | 100 | 13000 | 18000 | 1.9 | 11 |
| Thermoplastic Resin Film 24 | 100 | 5000 | 7000 | 1.9 | 13 |
| Thermoplastic Resin Film 25 | 100 | 18000 | 23000 | 1.8 | 10 |
| Thermoplastic Resin Film 26 | 50 | 5500 | 5000 | 1.4 | 30 |
| Hardcoat Layer Laminated Film 21 | 108 | 13000 | 12000 | 1.4 | 12 |
| Hardcoat Layer Laminated Film 22 | 108 | 13000 | 9000 | 1.2 | 14 |
| Hardcoat Layer Laminated Film 23 | 108 | 13000 | 18000 | 1.9 | 11 |
| Hardcoat Layer Laminated Film 24 | 108 | 5000 | 7000 | 1.9 | 13 |
| Hardcoat Layer Laminated Film 25 | 108 | 18000 | 23000 | 1.8 | 10 |
| Hardcoat Layer Laminated Film 26 | 58 | 6000 | 6000 | 1.5 | 29 |

(Preparation of Polarizing Plate)

1) Preparation of Polarizer

A polarizer having a thickness 20 μm was prepared by absorbing iodine on an extended polyvinyl alcohol film in accordance with Example 1 of Japanese Patent Application Laid-Open No. 2001-141926.

2) Adhesion (Preparation of Polarizing Plate)

On one polarizing surface of the prepared polarizer, the thermoplastic resin films 21 to 26 were attached by using an acryl adhesive after performing a corona treatment on an attachment surface, and subsequently, on the other polarizing surface of the prepared polarizer, equally, the thermoplastic resin films 1, 2, and 14 were attached after performing a corona treatment on an attachment surface so as to have combinations of Table 8 to prepare polarizing plates 701 to 708.

Further, on one polarizing surface of the prepared polarizer, the hardcoat layer laminated films 21 to 26 were attached by using an acryl adhesive after performing a corona treatment on a surface on which the hardcoat layer was not laminated, and subsequently, on the other polarizing surface of the prepared polarizer, equally, the thermoplastic resin films 1, 2, and 14 were attached after performing a corona treatment on an attachment surface so as to have combinations of Table 8 to prepare polarizing plates 709 to 716.

The polarizing plates 701 to 716 were prepared in this manner. At this time, the films were disposed such that the longitudinal direction of the roll of the prepared polarizer was in parallel with the longitudinal directions of the thermoplastic resin films and the hardcoat layer laminated films.

With respect to the obtained polarizing films, it was determined that any one of the polarizing plate protective films attached on both sides of the polarizer was set as the polarizing plate protective films F1 and F4 at the opposite side to the liquid crystal cell, and the other one was set as the polarizing plate protective films F2 and F3 of the liquid crystal cell.

[Evaluation of Polarizing Plate]

With respect to the prepared polarizing plate, physical properties were measured and evaluated in the same manner. The configurations and evaluation results of the polarizing plates are shown in the following Table 8.

TABLE 8

| Polarizing Plate No. | Polarizing Plate Protective Film F1, F4 Side | Polarizing Plate Protective Film F2, F3 Side | Difference in the percentage of water content after leaving 48 H/% | Difference in the percentage of water content after leaving 120 H/% |
|---|---|---|---|---|
| Polarizing Plate 701 | Thermoplastic Resin Film 21 | Thermoplastic Resin Film 1 | 0.8 | 1.4 |
| Polarizing Plate 702 | Thermoplastic Resin Film 21 | Thermoplastic Resin Film 2 | 0.8 | 1.4 |
| Polarizing Plate 703 | Thermoplastic Resin Film 21 | Thermoplastic Resin Film 14 | 0.8 | 1.3 |
| Polarizing Plate 704 | Thermoplastic Resin Film 22 | Thermoplastic Resin Film 1 | 0.8 | 1.4 |
| Polarizing Plate 705 | Thermoplastic Resin Film 23 | Thermoplastic Resin Film 1 | 0.8 | 1.4 |
| Polarizing Plate 706 | Thermoplastic Resin Film 24 | Thermoplastic Resin Film 1 | 0.8 | 1.4 |
| Polarizing Plate 707 | Thermoplastic Resin Film 25 | Thermoplastic Resin Film 1 | 0.8 | 1.4 |
| Polarizing Plate 708 | Thermoplastic Resin Film 26 | Thermoplastic Resin Film 1 | 0.9 | 1.5 |
| Polarizing Plate 709 | Hardcoat Layer Laminated Film 21 | Thermoplastic Resin Film 1 | 0.8 | 1.4 |
| Polarizing Plate 710 | Hardcoat Layer Laminated Film 21 | Thermoplastic Resin Film 2 | 0.8 | 1.4 |
| Polarizing Plate 711 | Hardcoat Layer Laminated Film 21 | Thermoplastic Resin Film 14 | 0.8 | 1.3 |
| Polarizing Plate 712 | Hardcoat Layer Laminated Film 22 | Thermoplastic Resin Film 1 | 0.8 | 1.4 |
| Polarizing Plate 713 | Hardcoat Layer Laminated Film 23 | Thermoplastic Resin Film 1 | 0.8 | 1.4 |
| Polarizing Plate 714 | Hardcoat Layer Laminated Film 24 | Thermoplastic Resin Film 1 | 0.8 | 1.4 |
| Polarizing Plate 715 | Hardcoat Layer Laminated Film 25 | Thermoplastic Resin Film 1 | 0.8 | 1.4 |
| Polarizing Plate 716 | Hardcoat Layer Laminated Film 26 | Thermoplastic Resin Film 1 | 0.9 | 1.5 |

<Mounting 1 on IPS Panel>

In a commercially available IPS-type liquid crystal display, a liquid crystal panel was extracted, two polarizing plates of were peeled off, and the polarizing plates 709 and 716 were adhered with each one sheet to the front side (visual side) and the polarizing plate A2 was attached on the rear side (non-visual side) through an adhesive so that the polarizing plate protective film sides F2 and F3 become liquid crystal cell sides, respectively. The crossed Nichol was disposed such that the absorption axis of the polarizing plate on the front side was in the longitudinal direction (crosswise direction) and the transmission axis of the polarizing plate on the rear side was in the longitudinal direction (crosswise direction). The thickness of glass used in the liquid crystal cell was 0.5 mm. Further, as a backlight source, a white LED was used.

With respect to the prepared liquid crystal displays 801 to 808, interference pattern type (rainbow type) unevenness while white was displayed was measured by the following method and interference pattern type unevenness of a light leakage portion while black was displayed was evaluated.

[Evaluation of Interference Pattern Type Unevenness in White Display]

The interference pattern type unevenness of the liquid crystal display manufactured as above in white display was evaluated with eyes of a plurality of observers.

~Evaluation Index~

A: The interference pattern type unevenness was not almost observed.

B: The interference pattern type unevenness was weak, but observed enough to be viewed.

C: The interference pattern type unevenness was observed, but was within a permitted level.

D: The interference pattern type unevenness was distinctly observed and may not be permitted.

[Evaluation of Unevenness at Four Corners after Thermo Test]

The liquid crystal displays 101 to 120 thus fabricated were subjected to thermo treatment at 60° C. and 90% relative humidity for 48 hours or 120 hours and then left to stand at 25° C. and 60% relative humidity for 2 hours, then the backlights of the liquid crystal displays were turned on, and light leakage and rainbow unevenness at the corner 4 of the panel were evaluated after 5 hours and after 10 hours after the light was turned on.

~Evaluation Index~

A: Light leakage at four corners of the panel was not viewed and the interference stripe-type unevenness was not verified (the light leakage of the panel was the same as that before thermo was input)

B: The light leakage at four corners of the panel was slightly viewed and the interference stripe-type unevenness was not verified.

C: The light leakage at four corners of the panel was slightly viewed and the interference stripe-type unevenness was within the permitted level.

D: The light leakage was large at four corners of the panel, and as a result, the light leakage may not be permitted and/or the interference pattern type unevenness was distinctly verified, and as a result, the interference pattern type unevenness may not be permitted. Further, instead of thermo at 60° C. 90% RH for 48 hours, the same evaluation had been performed with respect to even thermo at 50° C. 80% RH for 72 hours, but the evaluation results of the light leakage amount or the warp unevenness were the same as those in thermo at 60° C. 90% RH for 48 hours.

The interference pattern type unevenness was shown when light incident in the polarizing plate having a polymer film with high birefringence, in detail, Re of 500 nm or more and less than 3000 n as the protective film in an inclination direction from the backlight source when being observed from the visual side and in particular, was remarkable in a liquid crystal display having a light source such as a cold-cathode tube as the backlight.

Herein, when the white light source having a consecutive light emitting spectrum was used as the backlight source, in the polarizing plate protective films F1 and F4, Re is preferably 3000 to 30000 nm, more preferably 4000 to 20000 nm, even more preferably 5000 to 18000 nm, and particularly preferably 6000 to 15000 nm The interference pattern type unevenness may be reduced by setting the Nz value indicating the relationship between the Re and the Rth to an appropriate value and the Nz value is preferably 2.0 or less, more preferably 1.0 to 2.0, and even more preferably 1.0 to 1.5 in terms of the reduction effect of the interference pattern type unevenness and the manufacturing adequacy.

Since the interference pattern type unevenness occurs by the incident light, the interference pattern type unevenness was generally observed in the white display.

Further, in the case of using the polarizing plate having the polymer film having high birefringence as the protective film on the front side, the interference pattern type unevenness was not observed at light leakage portions at four corners observed by measuring the warp unevenness and an impression as if the unevenness was more highlighted may be given to the observer. Therefore, in the case of using the polymer film having high birefringence, the warp-unevenness also needs to be measured based on an influence by the interference pattern type unevenness and the measurement was performed as measurement of unevenness at four corners after thermo.

The polarizing plate used in the liquid crystal display and the results are shown in Table 9.

TABLE 9

| Liquid Crystal Display No. | Front-side (Visual-side) Polarizing Plate | Rear-side (Non-visual-side) Polarizing Plate | Panel | Interference Pattern Type Unevenness in White Display | Unevenness at Four Corners after 48-HR Thermo | Unevenness at Four Corners after 120-HR Thermo | |
|---|---|---|---|---|---|---|---|
| Liquid Crystal Display 521 | Polarizing Plate 291 | Polarizing Plate A2 | IPS | A | D (However, No Interference Pattern Type) | D (However, No Interference Pattern Type) | Comparative Example |
| Liquid Crystal Display 801 | Polarizing Plate 709 | Polarizing Plate A2 | IPS | A | B | B | Example |
| Liquid Crystal Display 802 | Polarizing Plate 710 | Polarizing Plate A2 | IPS | A | B | B | Example |
| Liquid Crystal Display 803 | Polarizing Plate 711 | Polarizing Plate A2 | IPS | A | B | B | Example |
| Liquid Crystal Display 804 | Polarizing Plate 712 | Polarizing Plate A2 | IPS | A | B | B | Example |
| Liquid Crystal Display 805 | Polarizing Plate 713 | Polarizing Plate A2 | IPS | B | B | B | Example |
| Liquid Crystal Display 806 | Polarizing Plate 714 | Polarizing Plate A2 | IPS | B | B | B | Example |
| Liquid Crystal Display 807 | Polarizing Plate 715 | Polarizing Plate A2 | IPS | B | B | B | Example |
| Liquid Crystal Display 808 | Polarizing Plate 716 | Polarizing Plate A2 | IPS | B | B | B | Example |

<Mounting on IPS Panel 2>

Two polarizing plates of a commercially available IPS-type liquid crystal display were peeled off, and the above-described polarizing plates 709 to 716 on the front side and the above-described polarizing plates 701 to 708 on the rear side were adhered with each one sheet to the front side and the rear side through the adhesive such that the polarizing plate protective films F2 and F3 were each on the liquid crystal cell side. The crossed Nichol was disposed such that the absorption axis of the polarizing plate on the front side was in the longitudinal direction (crosswise direction) and the transmission axis of the polarizing plate on the rear side was in the longitudinal direction (crosswise direction). The thickness of glass used in the liquid crystal cell was 0.5 mm. Further, as the backlight source, a white LED was used.

With respect to the liquid crystal displays 901 to 908 manufactured as above, the interference pattern type unevenness measurement in the white display, and the evaluation of the unevenness at four corners after the thermo test, and the evaluation of the circular unevenness were performed by the following method.

The polarizing plate used in the liquid crystal display and the results are shown in Table 10.

TABLE 10

| Liquid Crystal Display No. | Front-side (Visual-side) Polarizing Plate | Rear-side (Non-visual-side) Polarizing Plate | Panel | Interference Pattern Type Unevenness in White Display | 48-HR Thermo Unevenness at Four Corners after Thermo | 48-HR Thermo Circular Unevenness | 120-HR Thermo Unevenness at Four Corners after Thermo | 120-HR Thermo Circular Unevenness | |
|---|---|---|---|---|---|---|---|---|---|
| Liquid Crystal Display 521 | Polarizing Plate 291 | Polarizing Plate A2 | IPS | A | D (However, No Interference Pattern Type) | D | D (However, No Interference Pattern Type) | D | Comparative Example |
| Liquid Crystal Display 801 | Polarizing Plate 709 | Polarizing Plate A2 | IPS | A | B | B | B | B | Example |
| Liquid Crystal Display 901 | Polarizing Plate 709 | Polarizing Plate 701 | IPS | A | A | A | A | A | Example |
| Liquid Crystal Display 902 | Polarizing Plate 710 | Polarizing Plate 702 | IPS | A | A | A | A | A | Example |
| Liquid Crystal Display 903 | Polarizing Plate 711 | Polarizing Plate 703 | IPS | A | A | A | A | A | Example |
| Liquid Crystal Display 904 | Polarizing Plate 712 | Polarizing Plate 704 | IPS | A | A | A | A | A | Example |
| Liquid Crystal Display 905 | Polarizing Plate 713 | Polarizing Plate 705 | IPS | B | A | A | A | A | Example |
| Liquid Crystal Display 906 | Polarizing Plate 714 | Polarizing Plate 706 | IPS | B | A | A | A | A | Example |
| Liquid Crystal Display 907 | Polarizing Plate 715 | Polarizing Plate 707 | IPS | B | A | A | A | A | Example |
| Liquid Crystal Display 908 | Polarizing Plate 716 | Polarizing Plate 708 | IPS | B | A | A | A | A | Example |

The liquid crystal display of the present invention can resolve occurrence of the warp unevenness based on bending of the panel which occurs during turn-on after conservation under the high-humidity environment.

Although the present invention has been described with reference to detailed and specific embodiments thereof, it is obvious to those skilled in the art that various changes or modifications may be made without departing from the spirit and scope of the present invention.

This application is based on Japanese Patent Application No. 2012-227510 filed on Oct. 12, 2012, Japanese Patent Application No. 2013-21838 filed on Feb. 6, 2013, and Japanese Patent Application No. 2013-049449 on Mar. 12, 2013, the entire contents of which are incorporated herein by reference.

What is claimed is:

1. A liquid crystal display comprising:
a liquid crystal cell in which a liquid crystal layer is installed between two glass substrates;
polarizing plates on both surfaces of the liquid crystal cell; and
a backlight at a rear side of the liquid crystal cell, which is a non-visual side,
wherein in a polarizing plate at a front side of the liquid crystal cell, which is a visual side, a difference in a moisture content of the polarizing plate at the front side just after a time under a condition (A) elapses and a moisture content of the polarizing plate at the front side just after a time under a condition (B) elapses is 0.01% or more and 3.0% or less, wherein
Condition (A): Left alone for 48 hours under an environment of 60° C. and the relative humidity of 90%, and
Condition (B): Left alone for 6 hours under an environment of 25° C. and the relative humidity of 10% after being left alone for 48 hours under an environment of 60° C. and the relative humidity of 90%,
wherein the polarizing plate at the front side includes a polarizing plate protective film F1 disposed on a surface of a polarizer at the front side, and
the polarizing plate protective film F1 satisfies Equations (I) and (V):

$$Re = (nx - ny) \times d \qquad \text{Equation (I)}$$

$$3000 \text{ nm} \leq Re \leq 30000 \text{ nm} \qquad \text{Equation (V)}$$

wherein, in Equations (I) and (V), nx is a refractive index of the polarizing plate protective film F1 in an in-plane slow axis direction,
ny is a refractive index of the polarizing plate protective film F1 in an in-plane fast axis direction, and
d is a thickness of the polarizing plate protective film F1, whose unit is nm, and
wherein the polarizing plate at the front side includes a polarizing plate protective film F1 disposed on a surface of the polarizer at the front side, and wherein the polarizing plate protective film F1 satisfies Equations (VI) and (VII):

$$Nz=(nx-nz)/(nx-ny) \quad \text{Equation (VI)}$$

$$Nz \leq 2.0 \quad \text{Equation (VII)}$$

wherein, in Equation (VI), nx is a refractive index of the polarizing plate protective film F1 in an in-plane slow axis direction,
ny is a refractive index of the polarizing plate protective film F1 in an in-plane fast axis direction, and
nz is a refractive index of the polarizing plate protective film F1 in a thickness direction.

2. The liquid crystal display according to claim 1,
wherein in the polarizing plate at the front side of the liquid crystal cell, which is the visual side, a difference in a moisture content of the polarizing plate at the front side just after a time under a condition (C) elapses and a moisture content of the polarizing plate at the front side just after a time under a condition (D) elapses is 0.01% or more and 3.0% or less, wherein
Condition (C): Left alone for 120 hours under an environment of 60° C. and the relative humidity of 90%, and
Condition (D): Left alone for 6 hours under an environment of 25° C. and the relative humidity of 10% after being left alone for 120 hours under an environment of 60° C. and the relative humidity of 90%.

3. The liquid crystal display according to claim 1,
wherein the polarizing plate at the front side includes a polarizing plate protective film F1 disposed on a surface of a polarizer at the front side, and
the polarizing plate protective film F1 has a moisture permeability of 200 g/m²/day or less and includes a thermoplastic resin film and a low moisture-permeable layer laminated on the thermoplastic resin film, provided that the moisture permeability is a value after 24 hours elapse under conditions of 40° C. and 90% RH, obtained by a manner in accordance with JIS Z-0208.

4. The liquid crystal display according to claim 3,
wherein at least one low moisture-permeable layer in the polarizing plate protective film F1 satisfies Equation (1):

$$A/B \leq 0.9 \quad \text{Equation (1)}$$

wherein, in Equation (1), A represents a moisture permeability of a film in which the at least one low moisture-permeable layer is laminated on the thermoplastic resin film, and
B represents a moisture permeability of the thermoplastic resin film, provided that moisture permeability is a value after 24 hours elapse under conditions of 40° C. and 90% RH, obtained by a manner in accordance with JIS Z-0208.

5. The liquid crystal display according to claim 3,
wherein a thermoplastic resin included in the thermoplastic resin film is a (meth) acrylic resin, an olefin-based resin, a cellulous-based resin, a polycarbonate-based resin, a polystyrene-based resin, a polyester-based resin, and a mixed resin of multiple kinds of resins selected therefrom.

6. The liquid crystal display according to claim 1,
wherein the polarizing plate protective film F1 is a polyester-based resin or a polyester-based resin.

7. The liquid crystal display according to claim 3,
wherein the polarizing plate protective film F1 has a moisture permeability of 75 g/m²/day or less, provided that the moisture permeability is a value after 24 hours elapse under conditions of 40° C. and 90% RH, obtained by a manner in accordance with JIS Z-0208.

8. The liquid crystal display according to claim 1,
wherein the polarizing plate at the front side includes a polarizing plate protective film F2 disposed on a surface of a polarizer at a liquid crystal cell side,
the polarizing plate protective film F2 is a thermoplastic resin film, and
a thermoplastic resin included in the thermoplastic resin film is a (meth) acrylic resin, a polycarbonate-based resin, a polystyrene-based resin, a cyclic polyolefin-based resin, a glutaric anhydride-based resin, a glutarimide-based resin, a cellulous-based resin, and a mixed resin of multiple kinds of resins selected therefrom.

9. The liquid crystal display according to claim 1,
wherein in a polarizing plate installed at the rear side of the liquid crystal cell, a difference of a moisture content of the polarizing plate just after a time under a condition (A) elapses and a moisture content of the polarizing plate just after a time under a condition (B) elapses is 0.01% or more and 3.0% or less:
Condition (A): Left alone for 48 hours under an environment of 60° C. and the relative humidity of 90%, and
Condition (B): Left alone for 6 hours under an environment of 25° C. and the relative humidity of 10% after being left alone for 48 hours under an environment of 60° C. and the relative humidity of 90%.

10. The liquid crystal display according to claim 1,
wherein in a polarizing plate at the rear side of the liquid crystal cell, a difference of a moisture content of the polarizing plate just after a time under a condition (C) elapses and a moisture content of the polarizing plate just after a time under a condition (D) elapses is 0.01% or more and 3.0% or less:
Condition (C): Left alone for 120 hours under an environment of 60° C. and the relative humidity of 90%, and
Condition (D): Left alone for 6 hours under an environment of 25° C. and the relative humidity of 10% after being left alone for 120 hours under an environment of 60° C. and the relative humidity of 90%.

11. The liquid crystal display according to claim 9,
wherein the polarizing plate at the rear side includes a polarizing plate protective film F4 on a surface of a polarizer at a backlight side, and
the polarizing plate protective film F4 has a moisture permeability of 200 g/m²/day or less and includes a thermoplastic resin film and a low moisture-permeable layer laminated on the thermoplastic resin film, provided that the moisture permeability is a value after 24 hours elapse under conditions of 40° C. and 90% RH, obtained by a manner in accordance with JIS Z-0208.

12. The liquid crystal display according to claim 11,
wherein at least one low moisture-permeable layer in the polarizing plate protective film F4 satisfies Equation (1):

$$A/B \leq 0.9 \quad \text{Equation (1)}$$

wherein, in Equation (1), A represents a moisture permeability of a film in which the at least one low moisture-permeable layer is laminated on the thermoplastic resin film, and
B represents a moisture permeability of the thermoplastic resin film, provided that the moisture permeability is a value after 24 hours elapse at 40° C. and a relative humidity of 90%, obtained by a manner in accordance with JIS Z-0208.

13. The liquid crystal display according to claim 11, wherein a thermoplastic resin included in the thermoplastic resin film is a (meth) acrylic resin, an olefin-based resin, a cellulous-based resin, a polycarbonate-based resin, a polystyrene-based resin, a polyester-based resin, and a mixed resin of multiple kinds of resins selected therefrom.

14. The liquid crystal display according to claim 9, wherein the polarizing plate at the rear side includes a polarizing plate protective film F4 disposed on a surface of a polarizer at the rear side, and
the polarizing plate protective film F4 satisfies Equations (I) and (V):

$$Re=(nx-ny) \leq d \qquad \text{Equation (I)}$$

$$3000 \text{ nm} \leq Re \leq 30000 \text{ nm} \qquad \text{Equation (V)}$$

wherein nx is a refractive index of the polarizing plate protective film F4 in an in-plane slow axis direction,
ny is a refractive index of the polarizing plate protective film F4 in an in-plane fast axis direction, and
d is a thickness of the polarizing plate protective film F4, whose unit is nm.

15. The liquid crystal display according to claim 9, wherein the polarizing plate protective film F4 is a polyester-based resin or a polycarbonate-based resin.

16. The liquid crystal display according to claim 11, wherein the polarizing plate protective film F4 has a moisture permeability of 75 g/m²/day or less, provided that, the moisture permeability is a value after 24 hours elapse under conditions of 40° C. and 90% RH, obtained by a manner in accordance with JIS Z-0208.

17. The liquid crystal display according to claim 9, wherein the polarizing plate at the rear side includes a polarizing plate protective film F3 disposed on a surface of a polarizer at a liquid crystal cell side,
the polarizing plate protective film F3 is a thermoplastic resin film, and
a thermoplastic resin included in the thermoplastic resin film is a (meth) acrylic resin, a polycarbonate-based resin, a polystyrene-based resin, a cyclic polyolefin-based resin, a glutaric anhydride-based resin, a glutarimide-based resin, a cellulous-based resin, and a mixed resin of multiple kinds of resins selected therefrom.

18. The liquid crystal display according to claim 1, wherein the glass substrate of the liquid crystal cell has a thickness of 0.5 mm or less.

19. A liquid crystal display comprising:
a liquid crystal cell in which a liquid crystal layer is installed between two glass substrates;
polarizing plates on both surfaces of the liquid crystal cell; and
a backlight at a rear side of the liquid crystal cell, which is a non-visual side,
wherein in a polarizing plate at a front side of the liquid crystal cell, which is a visual side, a difference in a moisture content of the polarizing plate at the front side just after a time under a condition (A) elapses and a moisture content of the polarizing plate at the front side just after a time under a condition (B) elapses is 0.01% or more and 3.0% or less, wherein
Condition (A): Left alone for 48 hours under an environment of 60° C. and the relative humidity of 90%, and
Condition (B): Left alone for 6 hours under an environment of 25° C. and the relative humidity of 10% after being left alone for 48 hours under an environment of 60° C. and the relative humidity of 90%,
wherein in a polarizing plate installed at the rear side of the liquid crystal cell, a difference of a moisture content of the polarizing plate just after a time under a condition (A) elapses and a moisture content of the polarizing plate just after a time under a condition (B) elapses is 0.01% or more and 3.0% or less:
Condition (A): Left alone for 48 hours under an environment of 60° C. and the relative humidity of 90%, and
Condition (B): Left alone for 6 hours under an environment of 25° C. and the relative humidity of 10% after being left alone for 48 hours under an environment of 60° C. and the relative humidity of 90%,
wherein the polarizing plate at the rear side includes a polarizing plate protective film F4 disposed on a surface of a polarizer at the rear side, and
the polarizing plate protective film F4 satisfies Equations (I) and (V):

$$Re=(nx-ny) \leq d \qquad \text{Equation (I)}$$

$$3000 \text{ nm} \leq Re \leq 30000 \text{ nm} \qquad \text{Equation (V)}$$

wherein nx is a refractive index of the polarizing plate protective film F4 in an in-plane slow axis direction,
ny is a refractive index of the polarizing plate protective film F4 in an in-plane fast axis direction, and
d is a thickness of the polarizing plate protective film F4, whose unit is nm,
wherein the polarizing plate at the rear side includes a polarizing plate protective film F4 disposed on a surface of a polarizer at the rear side, and
the polarizing plate protective film F4 satisfies Equations (VI) and (VII):

$$Nz=(nx-nz)/(nx-ny) \qquad \text{Equation (VI)}$$

$$Nz \leq 2.0 \qquad \text{Equation (VII)}$$

wherein, in Equation (VI), nx is a refractive index of the polarizing plate protective film F4 in an in-plane slow axis direction,
ny is a refractive index of the polarizing plate protective film F4 in an in-plane fast axis direction, and
nz is a refractive index of the polarizing plate protective film F4 in a thickness direction.

* * * * *